(12) United States Patent
Galitsky

(10) Patent No.: US 11,586,827 B2
(45) Date of Patent: Feb. 21, 2023

(54) GENERATING DESIRED DISCOURSE STRUCTURE FROM AN ARBITRARY TEXT

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 169 days.

(21) Appl. No.: 16/789,849

(22) Filed: Feb. 13, 2020

(65) Prior Publication Data
US 2020/0184155 A1 Jun. 11, 2020

Related U.S. Application Data

(63) Continuation-in-part of application No. 15/975,683, filed on May 9, 2018, now Pat. No. 10,796,102.
(Continued)

(51) Int. Cl.
*G06F 40/30* (2020.01)
*G06F 40/35* (2020.01)
(Continued)

(52) U.S. Cl.
CPC ............ *G06F 40/35* (2020.01); *G06F 16/953* (2019.01); *G06F 40/117* (2020.01);
(Continued)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755;
(Continued)

(56) References Cited

U.S. PATENT DOCUMENTS 5,495,605 A * 2/1996 Cadot ............... G06F 16/24542
6,112,168 A 8/2000 Corston et al.
(Continued)

FOREIGN PATENT DOCUMENTS

WO 2015089822 A1 6/2015

OTHER PUBLICATIONS

Yao et al. (Semantics-Based Question Generation and Implementation), 2012, Dialogue and Discourse 3(2), pp. 11-42 (Year: 2012).*
(Continued)

*Primary Examiner* — Lamont M Spooner
(74) *Attorney, Agent, or Firm* — Kilpatrick Townsend & Stockton LLP

(57) ABSTRACT

Systems, devices, and methods of the present disclosure use discourse analysis and other techniques to form questions and answers from text. The questions and answers can be used for different applications, including providing a virtual dialogue or generating training data for machine-learning models. For example, a dialogue application generates a discourse tree that represents text and identifies a question from a satellite elementary discourse unit of the discourse tree. The dialogue application annotates the text by inserting the generated question and labeling the satellite elementary discourse unit as an answer.

18 Claims, 22 Drawing Sheets

Related U.S. Application Data

(60) Provisional application No. 62/832,986, filed on Apr. 12, 2019, provisional application No. 62/504,377, filed on May 10, 2017.

(51) Int. Cl.

| | | |
|---|---|---|
| *G06F 40/117* | (2020.01) | |
| *G06F 16/953* | (2019.01) | |
| *G06F 40/205* | (2020.01) | |
| *G06F 40/279* | (2020.01) | |
| *G06F 40/253* | (2020.01) | |

(52) U.S. Cl.
CPC ......... *G06F 40/205* (2020.01); *G06F 40/253* (2020.01); *G06F 40/279* (2020.01)

(58) Field of Classification Search
CPC .. G06F 17/276; G06F 17/2765; G06F 17/277; G06F 17/2775; G06F 17/278; G06F 17/2785; G06F 17/2795; G06F 40/211; G06F 40/253; G06F 40/268; G06F 40/284; G06F 40/30
USPC .................................................. 704/1, 9, 10
See application file for complete search history.

(56) References Cited

U.S. PATENT DOCUMENTS

| | | | |
|---|---|---|---|
| 6,181,909 B1 | 1/2001 | Burstein et al. | |
| 6,675,159 B1 | 1/2004 | Lin et al. | |
| 6,731,307 B1 | 5/2004 | Strubbe et al. | |
| 7,152,031 B1* | 12/2006 | Jensen | G06K 9/6215 |
| | | | 707/999.005 |
| 7,359,860 B1* | 4/2008 | Miller | G10L 15/22 |
| | | | 379/88.05 |
| 7,519,529 B1 | 4/2009 | Horvitz | |
| 7,551,552 B2* | 6/2009 | Dunagan | H04L 41/06 |
| | | | 370/242 |
| 7,840,556 B1* | 11/2010 | Dayal | G06F 16/2453 |
| | | | 707/999.003 |
| 9,037,464 B1 | 5/2015 | Mikolov et al. | |
| 9,292,490 B2* | 3/2016 | Kimelfeld | G06F 40/289 |
| 9,449,080 B1 | 9/2016 | Zhang | |
| 9,559,993 B2 | 1/2017 | Palakovich et al. | |
| 9,582,501 B1* | 2/2017 | Salmon | G06F 40/30 |
| 9,817,721 B1* | 11/2017 | Youngworth | G06F 11/2092 |
| 10,019,716 B1 | 7/2018 | Ainslie et al. | |
| 10,175,865 B2* | 1/2019 | Beaver | G06F 40/30 |
| 10,289,974 B1* | 5/2019 | Ouimette | G06F 3/048 |
| 10,545,648 B2* | 1/2020 | Beaver | G06F 3/04842 |
| 10,599,885 B2 | 3/2020 | Galitsky | |
| 10,679,011 B2 | 6/2020 | Galitsky | |
| 10,796,099 B2 | 10/2020 | Galitsky et al. | |
| 10,796,102 B2 | 10/2020 | Galitsky | |
| 10,817,670 B2 | 10/2020 | Galitsky | |
| 10,853,581 B2 | 12/2020 | Galitsky | |
| 11,023,684 B1* | 6/2021 | Flor | G06F 40/253 |
| 11,100,144 B2 | 8/2021 | Galitsky | |
| 2001/0007987 A1* | 7/2001 | Igata | G06F 16/93 |
| 2001/0053968 A1 | 12/2001 | Galitsky et al. | |
| 2002/0040292 A1* | 4/2002 | Marcu | G06F 40/253 |
| | | | 704/7 |
| 2002/0046018 A1* | 4/2002 | Marcu | G06F 40/44 |
| | | | 704/9 |
| 2003/0138758 A1* | 7/2003 | Burstein | G09B 11/00 |
| | | | 434/167 |
| 2004/0044519 A1* | 3/2004 | Polanyi | G06F 40/35 |
| | | | 707/E17.058 |
| 2004/0148170 A1 | 7/2004 | Acero et al. | |
| 2005/0086592 A1* | 4/2005 | Polanyi | G06F 16/345 |
| | | | 707/E17.094 |
| 2005/0108001 A1 | 5/2005 | Aarskog | |
| 2007/0073533 A1* | 3/2007 | Thione | G06F 40/35 |
| | | | 704/9 |
| 2007/0136284 A1* | 6/2007 | Cobb | G06F 40/131 |
| 2007/0192306 A1* | 8/2007 | Papakonstantinou | |
| | | | G06F 16/951 |
| | | | 707/999.005 |
| 2007/0294229 A1 | 12/2007 | Au | |
| 2008/0172409 A1 | 7/2008 | Botros et al. | |
| 2008/0228467 A1* | 9/2008 | Womack | G06F 40/211 |
| | | | 704/9 |
| 2009/0089252 A1 | 4/2009 | Galitsky et al. | |
| 2009/0100053 A1* | 4/2009 | Boschee | G06F 16/334 |
| 2009/0248399 A1* | 10/2009 | Au | G06F 40/237 |
| | | | 704/9 |
| 2009/0282019 A1 | 11/2009 | Galitsky et al. | |
| 2010/0169359 A1* | 7/2010 | Barrett | G06F 16/313 |
| | | | 707/769 |
| 2011/0119049 A1* | 5/2011 | Ylonen | G06F 40/211 |
| | | | 704/9 |
| 2011/0153673 A1* | 6/2011 | Boschee | G06F 16/334 |
| | | | 707/E17.098 |
| 2012/0041950 A1 | 2/2012 | Koll et al. | |
| 2012/0078902 A1 | 3/2012 | Duboue et al. | |
| 2012/0246578 A1* | 9/2012 | Baldwin | G06Q 50/01 |
| | | | 715/753 |
| 2013/0046757 A1* | 2/2013 | Salvetti | G06F 16/957 |
| | | | 707/723 |
| 2013/0151347 A1* | 6/2013 | Baldwin | G06Q 30/0201 |
| | | | 715/810 |
| 2013/0204611 A1* | 8/2013 | Tsuchida | G06F 40/40 |
| | | | 704/9 |
| 2014/0040288 A1 | 2/2014 | Galitsky | |
| 2014/0122083 A1 | 5/2014 | Xiaojiang | |
| 2014/0136188 A1* | 5/2014 | Wroczynski | G06F 40/284 |
| | | | 704/9 |
| 2015/0039295 A1* | 2/2015 | Soschen | G06F 40/205 |
| | | | 704/9 |
| 2015/0046492 A1* | 2/2015 | Balachandran | G06F 8/36 |
| | | | 707/772 |
| 2015/0051900 A1 | 2/2015 | Kimelfeld et al. | |
| 2015/0134325 A1* | 5/2015 | Skiba | H04M 3/5233 |
| | | | 704/9 |
| 2015/0149461 A1* | 5/2015 | Aguilar Lemarroy | G06F 16/35 |
| | | | 707/737 |
| 2015/0161512 A1* | 6/2015 | Byron | G06F 16/24578 |
| | | | 706/12 |
| 2016/0034457 A1* | 2/2016 | Bradley | G06F 16/24578 |
| | | | 707/749 |
| 2016/0055240 A1 | 2/2016 | Tur et al. | |
| 2016/0071517 A1* | 3/2016 | Beaver | G06F 40/35 |
| | | | 704/9 |
| 2016/0085743 A1* | 3/2016 | Haley | G06F 40/30 |
| | | | 704/9 |
| 2016/0086601 A1 | 3/2016 | Chotimongkol et al. | |
| 2016/0099892 A1 | 4/2016 | Palakovich et al. | |
| 2016/0232152 A1* | 8/2016 | Mahamood | G06F 40/186 |
| 2016/0245779 A1 | 8/2016 | Khalaj Amineh et al. | |
| 2016/0246779 A1* | 8/2016 | Ho | G06F 40/30 |
| 2016/0247068 A1* | 8/2016 | Lin | G06F 40/40 |
| 2016/0283491 A1* | 9/2016 | Lu | G06F 16/3322 |
| 2016/0328667 A1* | 11/2016 | Macciola | G06Q 10/0633 |
| 2017/0032053 A1* | 2/2017 | LeTourneau | G06F 16/322 |
| 2017/0104829 A1* | 4/2017 | Degroat | H04L 67/146 |
| 2017/0116982 A1 | 4/2017 | Gelfenbeyn et al. | |
| 2017/0177675 A1* | 6/2017 | Beller | G06N 3/004 |
| 2017/0228368 A1* | 8/2017 | Carter | G06F 40/284 |
| 2017/0277993 A1* | 9/2017 | Beaver | G06Q 30/0201 |
| 2017/0286390 A1 | 10/2017 | Yashpe et al. | |
| 2018/0121062 A1* | 5/2018 | Beaver | G06F 40/30 |
| 2018/0181648 A1* | 6/2018 | Chen | G06F 16/951 |
| 2018/0189385 A1* | 7/2018 | Sun | G06F 40/205 |
| 2018/0260472 A1* | 9/2018 | Kelsey | G09B 7/02 |
| 2018/0314689 A1* | 11/2018 | Wang | G10L 15/1822 |
| 2018/0365228 A1 | 12/2018 | Galitsky | |
| 2018/0365593 A1 | 12/2018 | Galitsky | |
| 2018/0373701 A1 | 12/2018 | Mcateer et al. | |
| 2019/0005027 A1 | 1/2019 | He et al. | |
| 2019/0033957 A1* | 1/2019 | Shionozaki | G06F 3/011 |
| 2019/0057157 A1 | 2/2019 | Mandal et al. | |

(56) References Cited

U.S. PATENT DOCUMENTS

| | | | |
|---|---|---|---|
| 2019/0103111 A1 | 4/2019 | Tiwari et al. | |
| 2019/0138190 A1* | 5/2019 | Beaver | G06F 40/35 |
| 2019/0163756 A1 | 5/2019 | Bull et al. | |
| 2019/0354544 A1 | 11/2019 | Hertz et al. | |
| 2019/0377605 A1* | 12/2019 | Joseph | G06F 9/5011 |
| 2020/0099790 A1* | 3/2020 | Ma | G06N 3/08 |
| 2020/0117858 A1* | 4/2020 | Freeman | H04L 51/02 |
| 2020/0301589 A1* | 9/2020 | Buzzard | G06F 3/0617 |
| 2021/0020165 A1* | 1/2021 | Scodary | H04M 3/523 |
| 2021/0027799 A1* | 1/2021 | Scodary | G06F 16/683 |
| 2021/0029248 A1* | 1/2021 | Scodary | G06K 9/6253 |

OTHER PUBLICATIONS

Title={Two practical rhetorical structure theory parsers}, author={Surdeanu, Mihai and Hicks, Tom and Valenzuela-Esc{\'a}rcega, Marco A}, booktitle={Proceedings of the 2015 conference of the North American chapter of the association for computational linguistics: Demonstrations}, pp. 1-5, 2015 (Year: 2015).*

Title={Fully automated generation of question-answer pairs for scripted virtual instruction}, author={Kuyten et al.}, booktitle={International Conference on Intelligent Virtual Agents}, pp. 1-14, pp. 1-14, year={2012}, organization={Springer} (Year: 2012).*

Title={Automatic generation and insertion of assessment items in online video courses}, author={Krishna et al.}, booktitle={Proceedings of the 20th International Conference on Intelligent User Interfaces Companion}, pp. 1-4, 2015 (Year: 2015).*

U.S. Appl. No. 16/240,232, Final Office Action, dated Oct. 21, 2021, 13 pages.

Indian Appln. No. IN202047007447, "First Examination Report", dated Sep. 9, 2021, 6 pages.

U.S. Appl. No. 16/010,123, Non-Final Office Action, dated Feb. 8, 2021, 30 pages.

U.S. Appl. No. 16/240,232, Non-Final Office Action, dated Apr. 9, 2021, 13 pages.

Mathkour, "A Novel Rhetorical Structure Approach for Classifying Arabic Security Documents", International Journal of Computer Theory and Engineering, vol. 1, No. 3, Aug. 2009, pp. 195-200.

International Application No. PCT/US2019/031580, International Preliminary Report on Patentability, dated Nov. 19, 2020, 8 pages.

U.S. Appl. No. 15/975,685, Notice of Allowance, dated Jul. 24, 2020, 17 pages.

U.S. Appl. No. 16/010,141, Final Office Action, dated Jul. 30, 2020, 14 pages.

U.S. Appl. No. 16/260,930, Non-Final Office Action, dated Aug. 12, 2020, 9 pages.

Banchs, "Movie-DiC: a Movie Dialogue Corpus for Research and Development", Proceedings of the 50th Annual Meeting of the Association for Computational Linguistics, vol. 2, Jul. 2012, pp. 203-207.

Du et al., "Learning to Ask: Neural Question Generation for Reading Comprehension", Proceedings of the 55th Annual Meeting of the Association for Computational Linguistics, vol. 1, Apr. 29, 2017, 11 pages.

Heilman et al., "Good Question! Statistical Ranking for Question Generation", Human Language Technologies: The 2010 Annual Conference of the North American Chapter of the Association for Computational Linguistics, Jun. 2010, pp. 609-617.

Jasinskaja et al., "Rhetorical Relations", Aug. 13, 2015, pp. 1-23.

Kumar et al., "A Framework for Automatic Question Generation from Text using Deep Reinforcement Learning", Proceedings of the 2019 IJCAI Workshop SCAI: The 4th International Workshop on Search-Oriented Conversational AI, Aug. 3, 2019, 7 pages.

Liu et al., "How Not to Evaluate Your Dialogue System: an Empirical Study of Unsupervised Evaluation Metrics for Dialogue Response Generation", Proceedings of the Conference on Empirical Methods in Natural Language Processing, Jan. 3, 2017, 15 pages.

Nakamura et al., "Another Diversity-Promoting Objective Function for Neural Dialogue Generation", Association for the Advancement of Artificial Intelligence, Nov. 21, 2018, 8 pages.

Novikova et al., "Why We Need New Evaluation Metrics for NLG", Proceedings of the 2017 Conference on Empirical Methods in Natural Language Processing, Sep. 7-11, 2017, pp. 2241-2252.

Papineni et al., "BLEU: A Method for Automatic Evaluation of Machine Translation", Proceedings of the 40th Annual Meeting on Association for Computational Linguistics, Jul. 2002, pp. 311-318.

International Application No. PCT/US2019/015696, International Preliminary Report on Patentability, dated Aug. 13, 2020, 8 pages.

Serban et al., "A Hierarchical Latent Variable Encoder-Decoder Model for Generating Dialogues", Proceedings of the Thirty-First Association for the Advancement of Artificial Intelligence Conference on Artificial Intelligence, Jun. 14, 2016, 15 pages.

Serban et al., "Building End-To-End Dialogue Systems Using Generative Hierarchical Neural Network Models", Proceedings of the Thirtieth Association for the Advancement of Artificial Intelligence Conference on Artificial Intelligence, Apr. 6, 2016, 8 pages.

Serban et al., "Generating Factoid Questions with Recurrent Neural Networks: The 30M Factoid Question-Answer Corpus", Proceedings of the 54th Annual Meeting of the Association for Computational Linguistics, vol. 1, May 29, 2016, 13 pages.

Wang et al., "A Joint Model for Question Answering and Question Generation", Learning to Generate Natural Language Workshop, ICML, Jun. 5, 2017, 7 pages.

Yuan et al., "Machine Comprehension by Text-to-Text Neural Question Generation", Proceedings of the 2nd Workshop on Representation Learning for Natural Language Processing, Aug. 3, 2017, pp. 15-25.

2009 Annual Study: Global Cost of a Data Breach, Ponemon Institute, LLC, PGP, Apr. 2010, 36 pages.

Airenti et al., "Conversation and behavior games in the pragmatics of dialogue," Cognitive Science, 17:197-256, 1993.

Allen and Perrault, "Analyzing Intention in Utterances," Artificial Intelligence, 15(3):143-178, 1980.

Bengio et al., A Neural Probabilistic Language Model, J. Mach. Learn. Res., 3:1137-1155, 2003.

Blaylock, "Managing Communicative Intentions in Dialogue Using a Collaborative Problem Solving Model," The University of Rochester Computer Science Dept., Apr. 2002, 56 pages.

Blaylock et al., "Managing communicative intentions with collaborative problem solving,". In Current and New Directions in Discourse and Dialogue, pp. 63-84, 2003.

Boyer et al., MJRTY—A Fast Majority Vote Algorithm, Chapter 5, Automated Reasoning, 1991, pp. 105-117.

Carlson and Marcu, "Discourse Tagging Reference Manual," Sep. 2001, 87 pages, retrieved from https//www.isi.edu/~marcu/discourse/taqging-ref-manual.pdf.

Chali et al., Complex Question Answering: Unsupervised Learning Approaches and Experiments, Journal of Artificial Intelligence Research, vol. 35, May 2009, pp. 1-47.

Chen, "Understanding Mental States in Natural Language", Proceedings of the 8th International Conference on Computational Semantics, Jan. 2009, pp. 61-72.

Cohen and Levesque, "Intention is choice with commitment," Artificial Intelligence, 42: 213-261, 1990.

Cohen, Enron Email Dataset. https://www.cs.cmu.edu/~./enron/ Last downloaded Jul. 10, 2016, 1 page.

Collins et al., "New Ranking Algorithms for Parsing and Tagging: Kernels Over Discrete Structures, and The Voted Perceptron", Proceedings of the 40th Annual Meeting of the Association for Computational Linguistics (ACL), Philadelphia, Jul. 2002, pp. 263-270.

CrimeRussia, "Shadow Chairman of Investigative Committee." Retrieved from http://en.crimerussia.ru/corruption/shadow-chairman-of-the-investigative-committee, Aug. 2016, 5 pages.

Cristea et al., "Veins theory: A model of global discourse cohesion and coherence," In C. Boitet & P. Whitelock (Eds.), 17th international conference on Computational linguistics, 1:281-285, 1998.

Croft et al., Search Engines—Information Retrieval in Practice, Pearson Education, 2010, 542 pages.

(56) References Cited

OTHER PUBLICATIONS

Data Loss Prevention, Trend Micro, Available online at: http://www.trendmicro.co.in/cloud-content/us/pdfs/business/datasheets/ds_data-loss-prevention.pdf, 2010, 2 pages.

Data Loss Prevention Products & Services, Symantec, Available online at: http://www.symantec.com/business/theme.jsp?themeid=vontu, 1995-2018, 6 pages.

De Boni, "Using logical relevance for question answering," Journal of Applied Logic, 5(1):92-103, Mar. 2007.

De Mori et al., Spoken Language Understanding, IEEE Signal Processing Magazine, vol. 25, Issue 3, May 2008, pp. 50-58.

Dijkstra, "Programming Considered as a Human Activity," Proc. IFIP Congress, 1965, 1 page.

Ebrahim, "NLP Tutorial Using Python NLTK (Simple Examples)", DZone.com, Available Online at, URL: https://dzone.com/articles/nlp-tutorial-using-python-nltk-simple-examples, (Last Accessed Feb. 1, 2019), Sep. 24, 2017, pp. 1-10.

Endres-Niggemeyer, "Summarizing Text for Intelligent Communication," *Dagstuhl Seminar Report* 79, 30.12-17.12.93 (9350), 1995, 36 pages.

Exploring Dialog Management for Bots, Chatbots Magazine, Available on Internet at: https://chatbotsmagazine.com/exploring-dialog-management-for-bots-cbb8665a2fd3, Jul. 11, 2016, 7 pages.

Feng, "RST-Style Discourse Parsing and Its Applications in Discourse Analysis," University of Toronto, 2015, 189 pages.

Feng et al., Distributional Footprints of Deceptive Product Reviews, Proceedings of the Sixth International AAAI Conference on Weblogs and Social Media, The AAAI Press, 2012, pp. 98-105.

Feng et al., Syntactic Stylometry for Deception Detection, In ACL 12, Proceedings of the 50th Annual Meeting of the Association for Computational Linguistics, Jul. 8-14, 2012, pp. 171-175.

Feng and Hirst, "Classifying Arguments by Scheme." In Proceedings of the 49th Annual Meeting of the Association for Computational Linguistics, 987-996, 2011.

Feng and Hirst, "A linear-time bottom-up discourse parser with constraints and post-editing." In Proceedings of the $52^{nd}$ Annual Meeting of the Association for Computational Linguistics, pp. 511-521, Jun. 23-25, 2014.

Ferraiolo et al., Role-Based Access Controls, Proceedings of the 15th NIST-NSA National Computer Security Conference, Oct. 13-16, 1992, pp. 554-563.

Finn, A Question Writing Algorithm, Journal of Reading Behavior, VII, vol. 4, 1975, pp. 341-367.

Fornaciari et al., Identifying Fake Amazon Reviews as Learning from Crowds, In Proceedings of the 14th Conference of the European Chapter of the Association for Computational Linguistics, Apr. 26-30, 2014, pp. 279-287.

Galitsky et al., Concept-Based Learning of Human Behavior for Customer Relationship Management, Information Sciences, vol. 181, No. 10, May 15, 2011, pp. 2016-2035.

Galitsky et al., Improving Text Retrieval Efficiency with Pattern Structures on Parse Thickets, Formal Concept Analysis Meets Information Retrieval, ECIR, 2013, 16 pages.

Galitsky, "Discovering Rhetorical Agreement between a Request and Response", Dialogue & Discourse, vol. 8, No. 2, Dec. 2017, pp. 167-205.

Galitsky et al., Inferring the Semantic Properties of Sentences by Mining Syntactic Parse Trees, Data & Knowledge Engineering, vols. 81-82, Nov.-Dec. 2012, 44 pages.

Galitsky et al., Learning Communicative Actions of Conflicting Human Agents, Journal of Experimental & Theoretical Artificial Intelligence, vol. 20, No. 4, Dec. 2008, pp. 277-317.

Galitsky, Learning Noisy Discourse Trees, Computational Linguistics and Intellectual Technologies, Proceedings of the International Conference Dialogue 2017. Available online at: http://www.dialog-21.ru/media/3911/galitskyb.pdf, May 31-Jun. 3, 2017, 14 pages.

Galitsky, Learning Parse Structure of Paragraphs and its Applications in Search, Engineering Applications of Artificial Intelligence, vol. 32, Jun. 2014, pp. 160-184.

Galitsky, Machine Learning of Syntactic Parse Trees for Search and Classification of Text, Engineering Applications of Artificial Intelligence, vol. 26, No. 3, Mar. 2013, pp. 1072-1091.

Galitsky, Natural Language Question Answering System, Technique of Semantic Headers, Advanced Knowledge International, vol. 2, 2003, 333 pages.

Galitsky et al., Parse Thicket Representations for Answering Multi-Sentence Search, International Conference on Conceptual Structures, 2013, 13 pages.

Galitsky et al., "Finding Maximal Common Sub-parse Thickets for Multi-sentence Search", Graph Structures for Knowledge Representation and Reasoning, 2014, pp. 39-57.

Galitsky et al., "Text Classification Based on Deep Textual Parsing", Available online at: http://ceur-ws.org/Vol-1886/paper_8.pdf, 2011, pp. 1-9.

Galitsky et al., "Rhetoric Map of an Answer to Compound Queries." In Proceedings of the 53rd Annual Meeting of the Association for Computational Linguistics and the $7^{th}$ International Joint Conference of Natural Language Processing, pp. 681-686, Jul. 26-31, 2015.

Galitsky et al., "Improving Trust in Automation of Social Promotion," Association for the Advancement of Artificial Intelligence, 2014, 8 pages.

Galitsky, et al., "Text Integrity Assessment: Sentiment Profile vs Rhetoric Structure." CICLing-2015, Springer International Publishing, pp. 126-139, 2015.

Galitsky, "Using extended tree kernels to recognize metalanguage in text," Studies in Computational Intelligence, Feb. 2017, 26 pages.

Galitsky et al., "Text Classification into Abstract Classes Based on Discourse Structure," Proceedings of Recent Advances in Natural Language Processing, pp. 200-207, Sep. 7-9, 2015.

Galitsky, B. 2017. Matching parse thickets for open domain question answering, Data & Knowledge Engineering, vol. 107, Jan. 2017, pp. 24-50.

Galitsky et al., "On a Chat Bot Finding Answers with Optimal Rhetoric Representation", RANLP—Recent Advances in Natural Language Processing Meet Deep Learning, Nov. 10, 2017, pp. 253-259.

Galitsky et al., "Chatbot with a Discourse Structure-Driven Dialogue Management,", Proceedings of the Software Demonstrations of the 15th Conference of the European Chapter of the Association for Computational Linguistics Available on Internet at: https://pdfs.semanticscholar.org/439f/cbe14dbc84b694bae2ee42a914d743126d12.pdf, Apr. 2017, pp. 87-90.

Galitsky et al., Discourse-level Dialogue Management. in Developing Enterprise Chatbots: Springer, Cham, Switzerland, 2019, 23 pages.

Global Security Report 2010, Trustwave, Available online at: https://www.trustwave.com/Resources/Library/Documents/2010-Trustwave-Global-Security-Report/, 2010, 49 pages.

Grefenstette, "Towards a Formal Distributional Semantics: Simulating Logical Calculi with Tensors," University of Oxford, Apr. 2013, 10 pages.

Grefenstette et al., "Multi-step regression learning for compositional distributional semantics." In Proceedings of the Tenth International Conference on Computational Semantics. Association for Computational Linguistics, 2013, 11 pages.

Grosz, B.J., Discourse Analysis, in Understanding Spoken Language. D.E. Walker (Ed.) 1978, Elsevier North-Holland: p. 235-268.

Grosz and Sidner, "Attention, Intentions, and the Structure of Discourse," Computational Linguistics, 12(3):175-204, 1986.

Hai et al., Deceptive Review Spam Detection via Exploiting Task Relatedness and Unlabeled Data, In Proceedings of the 2016 Conference on Empirical Methods in Natural Language Processing, Nov. 1-5, 2016, pp. 1817-1826.

Hara et al., "Exploring Difficulties in Parsing Imperatives and Questions", Proceedings of the 5th International Joint Conference on Natural Language Processing, Nov. 8-13, 2011, pp. 749-757.

Hart et al., Text Classification for Data Loss Prevention, Hewlett-Packard Development Company, L.P., 2011, 21 pages.

Haussler, Convolution Kernels on Discrete Structures UCSC-CRL-99-10, UCSB Technical Report, Jul. 8, 1999, 38 pages.

(56) References Cited

OTHER PUBLICATIONS

Hernault et al., "A Sequential Model for Discourse Segmentation," CICLing 2010, LNCS 6008, pp. 315-326, 2010, 12 pages.
Houngbo and Mercer, "An automated method to build a corpus of rhetorically-classified sentences in biomedical texts," Proceedings of the First Workshop on Argumentation Mining, Association for Computational Linguistics, pp. 19-23, Jun. 26, 2014.
Ignore, Deny, Downplay: Accounts of Syrians from Douma Have No Place in Western Narrative, Russia Today, Available online at: https://www.rt.com/news/425438-douma-witnesses-gas-attack-syria/, Apr. 28, 2018, 8 pages.
Iruskieta et al., "A qualitative comparison method for rhetorical structures: identifying different discourse structures in multilingual corpora," Lang Resources & Evaluation, vol. 49, Issue 2, May 2014, 47 pages.
Jansen et al., "Discourse Complements Lexical Semantics for Nonfactoid Answer Reranking." In Proceedings of the 52nd Annual Meeting of the Association for Computational Linguistics, pp. 977-986, 2014.
John et al., Estimating Continuous Distributions in Bayesian Classifiers, Proceedings of the Eleventh Conference on Uncertainty in Artificial Intelligence, 1995, pp. 338-345.
Johnson et al., "The FrameNet Tagset for Frame-Semantic and Syntactic Coding of Predicate-Argument Structure", RightsLink, 2011, pp. 56-62.
Joty et al., "A Novel Discriminative Framework for Sentenece-Level Discourse Analysis," Proceedings of the 2012 Joint Conference on Empirical Methods in Natural Language Processing and Computational Natural Language, pp. 904-915, Jul. 12-14, 2012.
Joty and Moschitti. "Discriminative Reranking of Discourse Parses Using Tree Kernels," Proceedings of the 2014 Conference on Empirical Methods in Natural Language Processing, pp. 2049-2060, Oct. 25-29, 2014.
Joty et al., "Combining intra-and multi-sentential rhetorical parsing for document-level discourse analysis," In Proceedings of the $51^{st}$ Annual Meeting of the Association for Computational Linguistics, pp. 486-496, Aug. 4-9, 2013.
Joty et al., CODRA: A Novel Discriminative Framework for Rhetorical Analysis. Computational Linguistics, vol. 41, No. 3, 2015, 51 pages.
Jurafsky et al. Speech and Language Processing: An Introduction to Natural Language Processing, Computational Linguistics, and Speech Recognition. Upper Saddle River, NJ: Prentice Hall, 2000, pp. 719-761.
Kate et al. "Learning to transform natural to formal languages." In Proceedings of the Twentieth National Conference on Artificial Intelligence, pp. 1062-1068, Jul. 2005.
Kipper et al., "A Large-scale Classification of English Verbs," Kluwer Academic Publishers, Springer Netherland, 2006, 18 pages.
Kipper et al., "VerbNet overview, extensions, mappings and applications," Proceedings on NAACL HLT 2009: Tutorials, Association for Computational Linguistics, pp. 13-14, 2009.
Kirschner et al., "Linking the Thoughts: Analysis of Argumentation Structures in Scientific Publications," German Institute for Educational Research, 2015, 11 pages.
Kohavi, A Study of Cross-Validation and Bootstrap for Accuracy Estimation and Model Selection, International Joint Conference on Artificial Intelligence, Aug. 1995, pp. 1137-1143.
Kontos et al., "Question Answering and Rhetoric Analysis of Biomedical Texts in the AROMA System," National and Kapodistrian University of Athens, Unpublished Manuscript. http://citeseerx.ist.psu.edu/viewdoc/summary?doi=10.1.1.379.5382 (last downloaded Sep. 12, 2016), 6 pages.
Kong et al., Improve Tree Kernel-Based Event Pronoun Resolution with Competitive Information, Proceedings of the Twenty-Second International Joint Conference on Artificial Intelligence, vol. 3, 2011, pp. 1814-1819.
Levinson, "Presumptive Meanings: The Theory of Generalized Conversational Implicature." Cambridge, MA: The MIT Press, 2000, 11 pages.

Li et al., "Recursive Deep Models for Discourse Parsing," Stanford University, 2014, 10 pages.
Lin et al., "Recognizing Implicit Discourse Relations in the Penn Discourse Treebank," National University of Singapore, 2009, 9 pages.
Litman and Allen, "A Plan Recognition Model for Subdialogues in Conversations," Cognitive Science, 11: 163-200, 1987.
Makhalova et al., Pattern Structures for News Clustering, In Proceedings of the 4th International Conference on What can FCA do for Artificial Intelligence, vol. 1430, 2015, pp. 35-42.
Mann, "Discourse Structures for Text Generation," USC/Information Sciences Institute, 1984, 9 pages.
Mann et al, "Rhetorical Structure Theory and Text Analysis," University of Southern California, 1989, 67 pages.
Mann and Thompson, "Rhetorical structure theory: Towards a functional theory of text organization," Text-Interdisciplinary Journal for the Study of Discourse, 8(3):243-281, 1988.
Marcu et al., "An Unsupervised Approach to Recognizing Discourse Relations", Proceedings of the 40th Annual Meeting of the Association for Computational Linguistics (ACL), 2002, 8 pages.
Mercier et al., Why Do Humans Reason? Arguments for an Argumentative Theory, Behavioral and Brain Sciences, vol. 34, No. 2, Apr. 2011, pp. 57-111.
Mikolov et al., "Distributed representations of phrases and their compositionality," In Advances on Neural Information Processing Systems, Oct. 2013, 9 pages.
Mitchell and Lapata, "Composition in distributional models of semantics," Cognitive Science, 34, pp. 1388-1429, 2010.
Mitocariu et al., "Comparing Discourse Tree Structures," Conference Paper. Available from: https://www.researchgate.net/publication/262331642_Comparing_Discourse_Tree_Stuctures [accessed May 15, 2016], 12 pages.
Mochales and Moens, "Argumentation mining." Artificial Intelligence and Law, 19(1):1-22, 2011.
Mukherjee et al., Fake Review Detection: Classification and Analysis of Real and Pseudo Reviews, Technical Report, Department of Computer Science, 2013, 11 pages.
Mukherjee et al., What Yelp Fake Review Filter Might Be Doing?, In Proceedings of the Seventh International AAAI Conference on Weblogs and Social Media, 2013, pp. 409-418.
Ott. et al., "Finding Deceptive Opinion Spam by Any Stretch of the Imagination." In Proceedings of the 49th Annual Meeting of the Association for Computational Linguistics, pp. 309-319, Jun. 19-24, 2011.
Ott et al., "Negative Deceptive Opinion Spam." In Proceedings of the 2013 Conference of the North American Chapter of the Association for Computational Linguistics, pp. 497-501, Jun. 9-14, 2013.
Peldszus and Stede, "From argument diagrams to argumentation mining in texts: a survey," Int. J of Cognitive Informatics and Natural Intelligence 7(1), pp. 1-31, 2013.
Pendyala and Figueira, "Towards a truthful world wide web from a humanitarian perspective," IEEE 2015 Global Humanitarian Technology Conference, Oct. 2015, 7 pages.
Ponti, "Machine Learning Techniques Applied To Dependency Parsing", University of Pavia, Available Online at, URL: https://vision.unipv.it/AI/AIRG/MachineLearningTechniquesAppliedToDependencyParsingRevised.pdf (Last Accessed Jan. 1, 2019), Oct. 2015, pp. 1-45.
Popescu et al., "Logic-Based Rhetorical Structuring for Natural language Generation in Human-Computer Dialogue," TSD 2007, LNAI 4629, pp. 309-317, 2007.
Popescu-Belis, Dialogue Acts: One or More Dimensions? Tech Report ISSCO Working paper No. 62, University of Geneva, 2005, 46 pages.
Radev et al., "Centroid-based summarization of multiple documents: sentence extraction, utility-based evaluation, and user studies." In Proceedings of the 2000 NAACL-ANLP Workshop on Automatic summarization—vol. 4, 2000, 8 pages.
Radev, "A Common Theory of Information Fusion from Multiple Text Sources Step One: Cross-document Structure", Proceedings of the 1st SIGDial Workshop on Discourse and Dialogue, vol. 10, Oct. 7-8, 2000, pp. 74-83.

(56) References Cited

OTHER PUBLICATIONS

Rayana et al., Collective Opinion Spam Detection: Bridging Review Networks and Metadata, In Proceedings of the 21th ACM SIGKDD International Conference on Knowledge Discovery and Data Mining, ACM, Aug. 11-14, 2015, 10 pages.
Recasens et al., The Life and Death of Discourse Entities: Identifying Singleton Mentions, In Proceedings of NAACL-HLT, Jun. 9-14, 2013, pp. 627-633.
Reed et al., "Language Resources for Studying Argument." In Proceedings of the 6th Conference on Language Resources and Evaluation, LREC2008, ELRA, 2010, 6 pages.
Reichman, R. 1985. Getting computers to talk like you and me: discourse context, focus and semantics (an ATN model). Cambridge, Mass. London : MIT Press, pp. 35-49.
Salton et al., On the Specification of Term Values in Automatic Indexing, Journal of Documentation, Jun. 1973, 35 pages.
Salton et al., Term Weighting Approaches in Automatic Text Retrieval, Information Processing & Management, vol. 24, No. 5, Nov. 1987, 22 pages.
Santhosh and Ali, "Discourse Based Advancement on Question Answering System," International Journal on Soft Computing, Artificial Intelligence and Applications (IJSCAI), vol. 1, No. 2, Oct. 2012, 12 pages.
Scholman et al., "A step-wise approach to discourse annotation: Towards a reliable categorization of coherence relations," Categories of coherence relations in discourse annotation. Dialogue & Discourse, vol. 7, No. 2 (2016), 28 pages.
Searle, J. R. 1969. Speech acts: an essay in the philosophy of language. London: Cambridge University Press, pp. 22-53.
Sjoera, The linguistics Behind Chat Bots, iCapps, Available online at: http://www.icapps.com/the-linguistics-behind-chatbots/, Feb. 22, 2017, 9 pages.
Socher et al., "Learning continuous phrase representations and syntactic parsing with recursive neural networks," Stanford University, 2010, 9 pages.
Sperber and Wilson. Relevance: Communication and Cognition. Blackwell, Oxford and Harvard University Press, Cambridge, MA, 1986, 331 pages.
Sun et al., Exploiting Product Related Review Features for Fake Review Detection, Mathematical Problems in Engineering, vol. 2016, Jul. 4, 2016, 7 pages.
Sun et al., Exploring Syntactic Structural Features for Sub-Tree Alignment Using Bilingual Tree Kernels, ACL'10 Proceedings of the 48th Annual Meeting of the Association for Computational Linguistics, Jul. 2010, pp. 306-315.
Surdeanu et al., "Two Practical Rhetorical Structure Theory Parsers," Proceedings of the North American Chapter of the Association for Computational Linguistics—Human Language Technologies, May 31-Jun. 5, 2015, 5 pages.
Tai et al., "Improved Semantic Representations from Tree-Structured Long Short-Term Memory Networks", Available Online at: https://arxiv.org/pdf/1503.00075.pdf, May 30, 2015, pp. 1-11.
Traum, "Rhetorical Relations, Action and Intentionality in Conversation", Proceedings ACL SIG Workshop on Intentionality and Structure in Discourse Relations, Jun. 1993, pp. 132-135.
Traum and Allen, "Discourse obligations in dialogue processing." In Proceedings of the 32nd annual meeting on Association for Computational Linguistics (ACL '94). Association for Computational Linguistics, pp. 1-8, 1994.
Traum and Hinkelman, "Conversation Acts in Task-Oriented Spoken Dialogue," University of Rochester Computer Science, Computational Intelligence, 8(3), Aug. 1992, 31 pages.
Trstenjak et al., KNN with TF-IDF Based Framework for Text Categorization, Procedia Engineering, vol. 69, 24th DAAAM International Symposium on Intelligent Manufacturing and Automation, 2014, pp. 1356-1364.
Tsui A. M. B. 1994. English conversation. Describing English Language Series, London: Oxford University Press, pp. 159-193.
Uliyar, "A Primer: Oracle Intelligent Bots—Powered by artificial intelligence," White Paper, Sep. 2017, 28 pages.

Van Der Wees et al., Five Shades of Noise: Analyzing Machine Translation Errors in User-Generated Text, Proceedings of the ACL, Workshop on Noisy User-generated Text, Jul. 2015, pp. 28-37.
Vapnik, The Nature of Statistical Learning Theory, Springer Science, 1995, 201 pages.
Walker et al. "Quantitative and Qualitative Evaluation of Darpa Communicator Spoken Dialogue Systems," Discourse Analysis in Understanding Spoken Language, Proc. ACL, pp. 515-522, 2001.
Wang et al., "Kernel Based Discourse Relation Recognition with Temporal Ordering Information," In Proceedings of the $48^{th}$ annual meeting of the Association for Computational Linguistics, pp. 710-719, Jul. 11-16, 2010.
Wang et al., Using Learning Analytics to Understand the Design of an Intelligent Language Tutor—Chatbot Lucy, (IJACSA) International Journal of Advanced Computer Science and Applications, vol. 4, No. 11, 2013, pp. 124-131.
Welcome to Apache Lucene, Apache Lucene 7.5.0 and Apache Solr 7.5.0, Available online at www.lucene.apache.org, Sep. 24, 2018, 38 pages.
Wikipedia (2016). Malaysia_Airlines_Flight_17, https://en.wikipedia.org/wiki/Malaysia_Airlines_Flight_17. 38 pages.
Wu et al., Enhancing Text Representation for Classification Tasks with Semantic Graph Structures, International Journal of Innovative Computing, Information and Control, vol. 7, No. 5 (B), May 2011, pp. 2689-2698.
Wuchner et al., Data Loss Prevention Based on Data-Driven Usage Control, IEEE 23rd International Symposium on Software Reliability Engineering, 2012, 10 pages.
Yao et al., Online Deception Detection Refueled by Real World Data Collection, In Proceedings of Recent Advances in Natural Language Processing, Jul. 28, 2017, 10 pages.
Yessenalina and Cardie, "Compositional Matrix-Space Models for Sentiment Analysis." Proceedings of the 2011 Conference on Empirical Methods in Natural Language Processing, pp. 172-182, Jul. 27-31, 2011.
Zanzotto et al., "Estimating linear models for compositional distributional semantics." In Proceedings of the $23^{rd}$ International Conference on Computational Linguistics (COLING), 2010, 9 pages.
Zhao et al., "Facilitating Discourse Analysis with Interactive Visualization," IEEE Transactions on Visualization and Computer Graphics, Institute of Electrical and Electronics Engineers, 18(12), 2012, pp. 2639-2648.
Zeilenga, Lightweight Directory Access Protocol (LDAP) Read Entry Controls, Standards Track, Network Working Group, IETF, RFC 4527, Jun. 2006, 8 pages.
International Application No. PCT/US2018/053392, International Search Report and Written Opinion dated Dec. 17, 2018, 11 pages.
International Application No. PCT/US2019/031580, "International Search Report and Written Opinion", dated Jul. 5, 2019, 12 pages.
International Application No. PCT/US2018/031890, "International Preliminary Report on Patentability", dated Nov. 21, 2019, 9 pages.
International Application No. PCT/US2018/053392, "International Preliminary Report on Patentability", dated Apr. 9, 2020, 7 pages.
International Application No. PCT/US2019/015696, "International Search Report and Written Opinion", dated Apr. 23, 2019, 12 pages.
"Non-Final Office Action" in U.S. Appl. No. 15/975,685, dated Nov. 15, 2019, 23 pages.
"Non-Final Office Action" in U.S. Appl. No. 16/010,091, dated Nov. 18, 2019, 26 pages.
"Notice of Allowance" in U.S. Appl. No. 16/010,156, dated Nov. 7, 2019, 13 pages.
U.S. Appl. No. 16/145,702, "Final Office Action", dated May 6, 2020, 19 pages.
U.S. Appl. No. 16/145,702, "Notice of Allowance", dated Jul. 1, 2020, 15 pages.
U.S. Appl. No. 16/260,939, "Non-Final Office Action", dated May 1, 2020, 10 pages.
U.S. Appl. No. 15/975,683, "Non-Final Office Action", dated Oct. 31, 2019, 27 pages.
U.S. Appl. No. 15/975,683, "Notice of Allowance", dated Jun. 12, 2020, 17 pages.
U.S. Appl. No. 15/975,683, "Non-Final Office Action", dated Mar. 19, 2020, 16 pages.

(56) References Cited

OTHER PUBLICATIONS

U.S. Appl. No. 16/260,939, "Notice of Allowance", dated Jun. 12, 2020, 14 pages.
U.S. Appl. No. 16/010,156, "Notice of Allowance", dated Feb. 6, 2020, 13 pages.
U.S. Appl. No. 15/975,685, "Non-Final Office Action", dated Apr. 1, 2020, 23 pages.
U.S. Appl. No. 16/010,091, "Notice of Allowance", dated Mar. 19, 2020, 13 pages.
U.S. Appl. No. 16/145,777, "Non-Final Office Action", dated Apr. 3, 2020, 18 pages.
U.S. Appl. No. 16/145,702, "Non-Final Office Action", dated Feb. 5, 2020, 30 pages.
U.S. Appl. No. 16/010,141, "Non-Final Office Action", dated Feb. 24, 2020, 12 pages.
U.S. Appl. No. 16/145,702, "Final Office Action", dated Sep. 10, 2019, 25 pages.
U.S. Appl. No. 16/145,702, "First Action Interview Office Action Summary", dated Apr. 29, 2019, 8 pages.
U.S. Appl. No. 16/145,702, "First Action Interview Pilot Program Pre-Interview Communication", dated Feb. 7, 2019, 6 pages.
U.S. Appl. No. 16/010,123, Notice of Allowance, dated May 19, 2021, 16 pages.
U.S. Appl. No. 16/426,878, Corrected Notice of Allowability dated Jul. 22, 2022, 2 pages.
U.S. Appl. No. 16/426,878, Corrected Notice of Allowability dated Aug. 12, 2022, 2 pages.
U.S. Appl. No. 16/426,878, Notice of Allowance dated May 13, 2022, 10 pages.
U.S. Appl. No. 16/426,878, Corrected Notice of Allowability dated Jun. 23, 2022, 9 pages.

* cited by examiner

GENERATING DESIRED DISCOURSE STRUCTURE FROM AN ARBITRARY TEXT

CROSS-REFERENCES TO RELATED APPLICATIONS

This application is a continuation-in-part of Ser. No. 15/975,683, filed May 9, 2018, which claims priority to 62/504,377, filed May 10, 2017, and claims the benefit of provisional application 62/832,986, filed Apr. 12, 2019. These applications are hereby incorporated by reference in their entireties for all purposes. Additional examples can be found in U.S. patent application Ser. No. 16/789,840, filed Feb. 13, 2020, now U.S. Pat. No. 11,321,536, which is incorporated herein by reference in its entirety for all purposes.

TECHNICAL FIELD

This disclosure is generally concerned with linguistics. More specifically, this disclosure relates to using discourse techniques to generate questions and answers from text.

BACKGROUND

Due to the greatly increased speed of processors and capacity of memory, computer-implemented applications of linguistics are increasing. For example, computer-enabled analysis of language discourse facilitates numerous applications such as automated agents that can answer questions received from user devices.

Autonomous agents often leverage available electronic textual documents to perform functions such as determining answers to questions, training machine learning models, or forming a dialogue. But existing solutions are unable to fully leverage textual content. Hence, new solutions are needed.

SUMMARY

Figure 1:
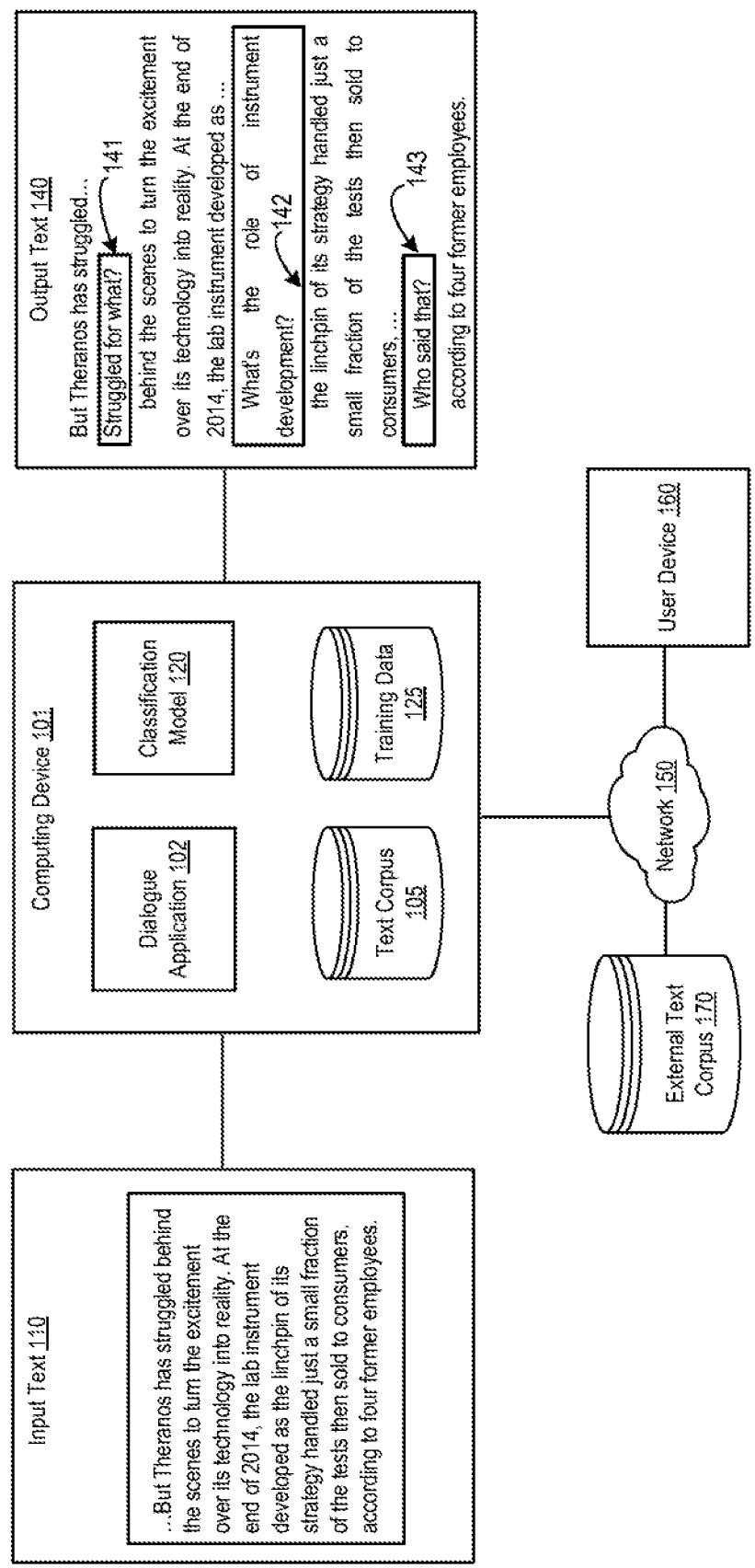
FIG. 1 shows an exemplary rhetoric classification environment, in accordance with an aspect.

Techniques are disclosed for generating a discourse structure from text. For example, disclosed techniques use discourse analysis to identify questions and answers from text. The questions and answers can be used for providing a virtual dialogue and/or generating training data for machine-learning models.

For example, a method for dialogue construction includes constructing, from text that includes fragments, a discourse tree that represents rhetorical relationships between the fragments. The discourse tree includes nodes. Each nonterminal node represents a rhetorical relationship between two of the fragments and each terminal node of the nodes of the discourse tree is associated with one of the fragments. The method further identifies a terminal node that includes a satellite elementary discourse unit from the discourse tree. The satellite elementary discourse unit is secondary to a corresponding nucleus elementary discourse unit. The method forms a question fragment from the satellite elementary discourse unit. The method annotates the text by inserting the question fragment into a location within the text. The location can be immediately preceding text that corresponds to the satellite elementary discourse unit. The method further annotates the text by labeling the satellite elementary discourse unit as an answer. The method further outputs the annotated corpus of text.

In an aspect, forming the question fragment includes: identifying, within the satellite elementary discourse unit, a word that represents either (i) a noun, (ii) a verb, or (iii) adjective; and replacing the word with a question word. A question word is one of (i) what, (ii) where, (iii) whom, (iv) who, or (v) how.

In an aspect, identifying a word includes constructing a parse tree from the satellite elementary discourse unit, the parse tree including nodes, and selecting, from the nodes, a node that represents either (i) a noun, (ii) a verb, or (iii) adjective.

In an aspect, forming the question fragment includes identifying a level of similarity between the question fragment and a template and determining that the level of similarity is greater than a threshold.

In an aspect, the method further includes generating one or more keywords from the question fragment. The method further includes submitting the keywords to a search engine. The method further includes obtaining a search result from the search engine. The method further includes comparing the search result with the question fragment by deriving a maximal common sub-tree of the question fragment and the search result. The method further includes determining that a number of words in the maximal common subtree is greater than a threshold, thereby verifying the question fragment.

In an aspect, forming the question fragment further includes matching each fragment of the discourse tree that has a verb to a verb signature. The matching includes accessing a includes verb signatures, each verb signature including the verb of the fragment and a sequence of thematic roles and the thematic roles describing a relationship between the verb and related words. The matching further includes determining, for each verb signature of the verb signatures, a thematic role of the respective signature that match a role of a word in the fragment. The matching further includes selecting a particular verb signature from the verb signatures based on the particular verb signature including a highest number of matches. The matching further includes associating the particular verb signature with the fragment, thereby forming a communicative discourse tree. The method further includes identifying, from the communicative discourse tree, a verb signature corresponding to the satellite elementary discourse unit and extracting, from the satellite elementary discourse unit, a portion of the satellite elementary discourse unit. The portion is located immediately following the verb signature.

In an aspect, the determining the templates includes accessing additional text. The determining includes forming, from the additional text, a first parse tree from a first question and a second parse tree from a second question. The determining includes identifying, from the first parse tree, an entity. The determining includes identifying, from the second parse tree, the entity. The determining includes generalizing the first parse tree and the second parse tree into a generalized fragment including the entity. The determining includes adding the generalized fragment into the includes templates.

In an aspect, the text is in a first domain and the method further includes generating, from an utterance, an additional communicative discourse tree. The method further includes applying a classification model to the additional communicative discourse tree; the classification model is trained with a includes questions and includes answers. The method further include receiving, from the classification model, an indication of whether the utterance is in rhetoric agreement with a reference text. The reference text is in a second domain.

In an aspect, the method further includes receiving, from a user device, a user question including text fragments. The method further includes identifying that the answer is relevant to the user question. The method further includes creating a virtual conversation that includes the question fragment and the answer. The method further includes labeling the question fragment with a first label identifying a first virtual actor. The method further includes labeling the answer with a second label identifying a second virtual actor. The method further includes providing the virtual conversation to the user device.

The exemplary methods discussed above can be implemented on systems comprising one or more processors or stored as instructions on a non-transitory computer-readable medium.

DETAILED DESCRIPTION

Aspects disclosed herein provide technical improvements to the area of computer-implemented linguistics. More specifically, certain aspects use discourse analysis to form questions from text, to identify corresponding answers within the text, and to determine suitable locations for the questions to be inserted into the text. Question and answer pairs can be used for various applications, including providing a virtual dialogue to a user, training classification models, and generating additional training data in a second domain from available training data in a first domain. Such applications enable improved autonomous agents or "chatbots." In contrast, existing solutions are unable to generate questions from an arbitrary text.

Disclosed solutions employ one or more techniques such as rhetorical structure theory, communicative discourse trees, template matching, syntactic generalization, and web-mining. For example, in an aspect, disclosed solutions use rhetorical structure theory to identify answers, to form questions that correspond to the answers, and to guide placement of the questions in text. In a further aspect, disclosed solutions use syntactic generalization and other discourse techniques to generate a set of question templates. The question templates can be used to verify that a generated question is of sufficient specificity. For example, a question should not be too specific as to give away the answer (e.g., "What is the name of a rock band from Liverpool, England with four members").

Certain aspects use "communicative discourse trees" or "CDTs." CDTs are discourse trees that are supplemented with communicative actions. A communicative action is a cooperative action undertaken by individuals based on mutual deliberation and argumentation. Because communicative discourse trees contain features (e.g., communicative actions) that are not included within a discourse tree, disclosed solutions overcome the limitations of previous systems, which are unable to identify these features. For example, communicative actions can be used to identify a question or to further refine a generated question. Technical advantages of some aspects include improved autonomous agents. For example, using communicative discourse trees and other techniques, improved performance over traditional statistical-based approaches can be accomplished. Existing solutions for autonomous agents are capable of only scripted, or limited response to user questions.

Certain Definitions

As used herein, "rhetorical structure theory" is an area of research and study that provided a theoretical basis upon which the coherence of a discourse could be analyzed.

As used herein, "discourse tree" or "DT" refers to a structure that represents the rhetorical relations for a sentence of part of a sentence.

As used herein, a "rhetorical relation," "rhetorical relationship," or "coherence relation" or "discourse relation" refers to how two segments of discourse are logically connected to one another. Examples of rhetorical relations include elaboration, contrast, and attribution.

As used herein, a "sentence fragment," or "fragment" is a part of a sentence that can be divided from the rest of the sentence. A fragment is an elementary discourse unit. For example, for the sentence "Dutch accident investigators say that evidence points to pro-Russian rebels as being responsible for shooting down the plane," two fragments are "Dutch accident investigators say that evidence points to pro-Russian rebels" and "as being responsible for shooting down the plane." A fragment can, but need not, include a verb.

As used herein, "signature" or "frame" refers to a property of a verb in a fragment. Each signature can include one or more thematic roles. For example, for the fragment "Dutch accident investigators say that evidence points to pro-Russian rebels," the verb is "say" and the signature of this particular use of the verb "say" could be "agent verb topic" where "investigators" is the agent and "evidence" is the topic.

As used herein, "thematic role" refers to components of a signature used to describe a role of one or more words. Continuing the previous example, "agent" and "topic" are thematic roles.

As used herein, "nuclearity" refers to which text segment, fragment, or span, is more central to a writer's purpose. The nucleus is the more central span, and the satellite is the less central one.

As used herein, "coherency" refers to the linking together of two rhetorical relations.

As used herein, "communicative verb" is a verb that indicates communication. For example, the verb "deny" is a communicative verb.

As used herein, "communicative action" describes an action performed by one or more agents and the subjects of the agents.

Turning now to the Figures, FIG. 1 depicts an computing environment in accordance with an aspect of the present disclosure. Computing environment 100 includes one or more of input text 110, computing device 101, output text 140, network 150, user device 160, and external text corpus 170. In the example depicted in FIG. 1, computing device 101 receives input text 110, generates questions 141-143 from input text 110, and inserts the generated questions 141-143 to output text 140, thereby creating a dialogue.

Computing device 101 includes one or more of dialogue application 102, text corpus 105, classification model 120, and training data 125. Examples of computing device 101 are distributed system 2000 and client computing devices 2002, 2004, 2006, and 2008. Examples of user device 160 include client computing devices 2002, 2004, 2006, and 2008.

Dialogue application 102 can interact with user device 160 over network 150. For example, dialogue application 102 can receive questions from user device 160, generate answers for the questions, and output the answers. User device 160 can be any mobile device such as a mobile phone, smart phone, tablet, laptop, smart watch, and the like.

Dialogue application 102 receives input text 110. Examples of input text 110 include strings of interactions between agents and a customer, a text log, or a message can output text or interactions, e.g., questions and answers, on a display. From the input text 110, dialogue application 102 generates questions and inserts the questions into the text at appropriate locations. For example, as depicted, output text 140 includes input text 130 with generated questions 141-143.

In an aspect, dialogue application 102 can facilitate virtual social dialogue with user device 160. A virtual social dialogue is a multi-step dialogue between imaginary agents and/or user devices and can be presented within an interactive session between a user device and an autonomous agent. To generate content for a virtual social dialogue, dialogue application 102 generates questions and answers from one or more corpuses of text. For example, dialogue application 102 can use text corpus 105, which can be local to computing device 101, and/or external text corpus 170, which is accessible via network 150. In an aspect, the generation of content can involve creating one or more communicative discourse trees. For example, dialogue application 102 can annotate questions and answers within the output dialogue 150 as appearing to be from an autonomous agent or a user. For example "User1: struggled for what?" and "Agent2: To turn excitement into reality."

In an aspect, dialogue application 102 can use classification model 120 and/or training data 125. Classification model 120 can be trained for different purposes, such as identifying rhetorical similarity between text or identifying similarity between texts. Classification model 120 can be a predictive model, a classification model, or other model trained to detect a presence of particular features. An example of a model is a support vector machine. For example, classification model 120 can use one or more such models to analyze a communicative discourse tree generated from input text 110. Example learning approaches include nearest neighbor models and tree kernel models. Examples of features that can be detected include a presence of argumentation, rhetoric agreement, a consecutive answer, or a feature present in input text 110.

Rhetoric Structure Theory and Discourse Trees

Linguistics is the scientific study of language. For example, linguistics can include the structure of a sentence (syntax), e.g., subject-verb-object, the meaning of a sentence (semantics), e.g. dog bites man vs. man bites dog, and what speakers do in conversation, i.e., discourse analysis or the analysis of language beyond the sentence.

The theoretical underpinnings of discourse, Rhetoric Structure Theory (RST), can be attributed to Mann, William and Thompson, Sandra, "Rhetorical structure theory: A Theory of Text organization," Text-Interdisciplinary Journal for the Study of Discourse, 8(3):243-281, 1988. Similar to how the syntax and semantics of programming language theory helped enable modern software compilers, RST helped enabled the analysis of discourse. More specifically RST posits structural blocks on at least two levels, a first level such as nuclearity and rhetorical relations, and a second level of structures or schemas. Discourse parsers or other computer software can parse text into a discourse tree.

Rhetoric Structure Theory models logical organization of text, a structure employed by a writer, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). Clauses in a sentence and sentences in a text are logically connected by the author. The meaning of a given sentence is related to that of the previous and the following sentences. This logical relation between clauses is called the coherence structure of the text. RST is one of the most popular theories of discourse, being based on a tree-like discourse structure, discourse trees (DTs). The leaves of a DT correspond to EDUs, the contiguous atomic text spans. Adjacent EDUs are connected by coherence relations (e.g., Attribution, Sequence), forming higher-level discourse units. These units are then also subject to this relation linking. EDUs linked by a relation are then differentiated based on their relative importance: nuclei are the core parts of the relation, while satellites are peripheral ones. As discussed, in order to determine accurate request-response pairs, both topic and rhetorical agreement are analyzed. When a speaker answers a question, such as a phrase or a sentence, the speaker's answer should address the topic of this question. In the case of an implicit formulation of a question, via a seed text of a message, an appropriate answer is expected not only maintain a topic, but also match the generalized epistemic state of this seed.

Rhetoric Relations

As discussed, aspects described herein use communicative discourse trees. Rhetorical relations can be described in different ways. For example, Mann and Thompson describe twenty-three possible relations. C. Mann, William & Thompson, Sandra. (1987) ("Mann and Thompson"). Rhetorical Structure Theory: A Theory of Text Organization. Other numbers of relations are possible.

TABLE 1

| Relation Name | Nucleus | Satellite |
| --- | --- | --- |
| Antithesis | ideas favored by the author | ideas disfavored by the author |
| Background | text whose understanding is being facilitated | text for facilitating understanding |
| Circumstance | text expressing the events or ideas occurring in the interpretive context | an interpretive context of situation or time |
| Concession | situation affirmed by author | situation which is apparently inconsistent but also affirmed by author |
| Condition | action or situation whose occurrence results from the occurrence of the conditioning situation | conditioning situation |
| Elaboration | basic information | additional information |
| Enablement | an action | information intended to aid the reader in performing an action |
| Evaluation | a situation | an evaluative comment about the situation |
| Evidence | a claim | information intended to increase the reader's belief in the claim |
| Interpretation | a situation | an interpretation of the situation |
| Justify | text | information supporting the writer's fright to express the text |
| Motivation | an action | information intended to increase the reader's desire to perform the action |
| Non-volitional Cause | a situation | another situation which causes that one, but not by anyone's deliberate action |
| Non-volitional Result | a situation | another situation which is caused by that one, but not by anyone's deliberate action |
| Otherwise (anti conditional) | action or situation whose occurrence results from the lack of occurrence of the conditioning situation | conditioning situation |
| Purpose | an intended situation | the intent behind the situation |
| Restatement | a situation | a reexpression of the situation |
| Solutionhood | a situation or method supporting full or partial satisfaction of the need | a question, request, problem, or other expressed need |
| Summary | text | a short summary of that text |
| Volitional Cause | a situation | another situation which causes that one, by someone's deliberate action |
| Volitional Result | a situation | another situation which is caused by that one, by someone's deliberate action |

Some empirical studies postulate that the majority of text is structured using nucleus-satellite relations. See Mann and Thompson. But other relations do not carry a definite selection of a nucleus. Examples of such relations are shown below.

TABLE 2

| Relation Name | Span | Other Span |
| --- | --- | --- |
| Contrast | One alternate | The other alternate |
| Joint | (unconstrained) | (unconstrained) |
| List | An item | A next item |
| Sequence | An item | A next item |

Figure 2:
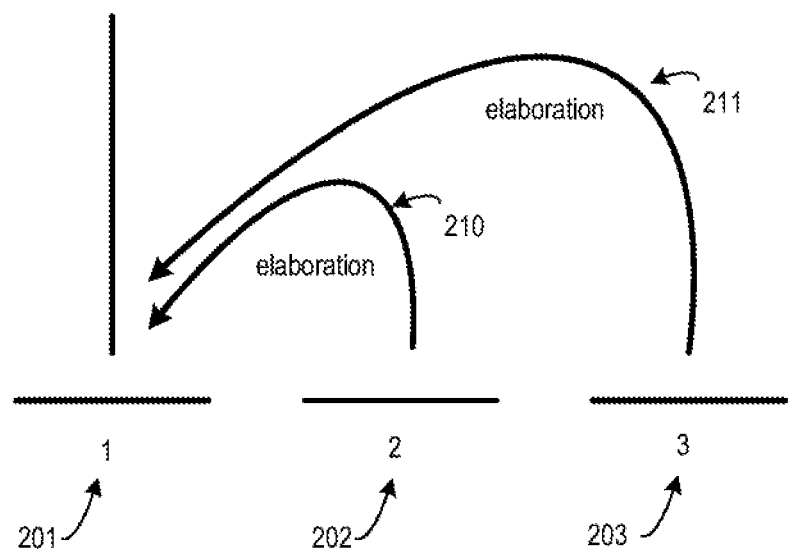
FIG. 2 depicts an example of a discourse tree in accordance with an aspect.
Figure 3:
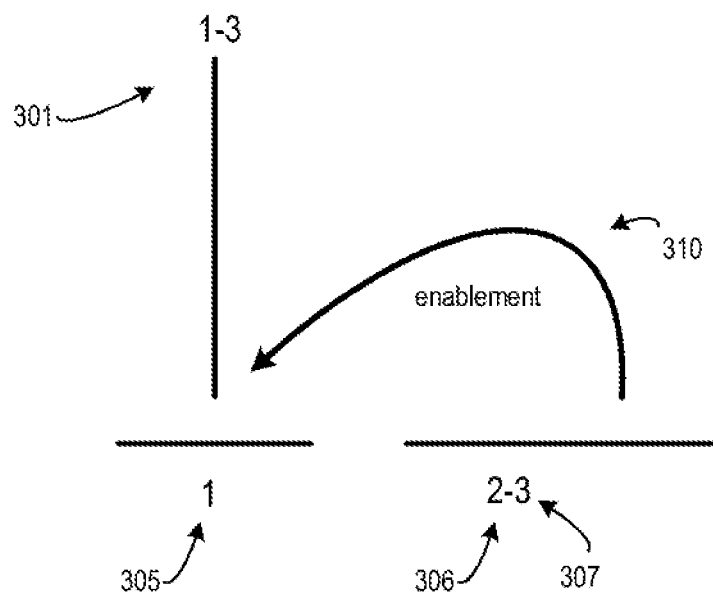
FIG. 3 depicts a further example of a discourse tree in accordance with an aspect.
Figure 3:
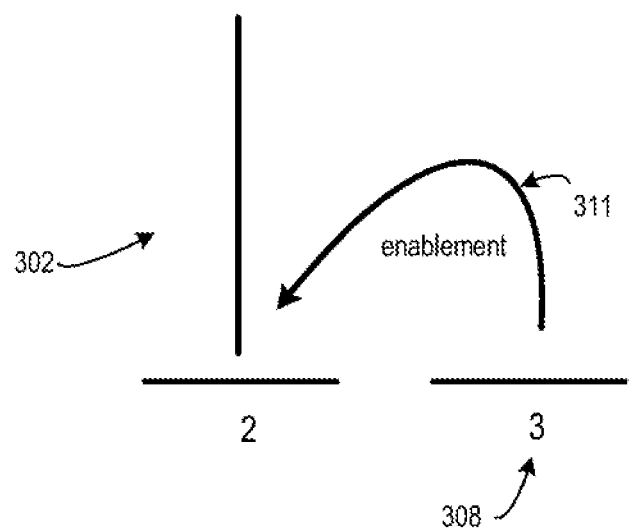

FIG. 2 depicts an example of a discourse tree, in accordance with an aspect. FIG. 2 includes discourse tree 200. Discourse tree includes text span 201, text span 202, text span 203, relation 210 and relation 228. The numbers in FIG. 2 correspond to the three text spans. FIG. 3 corresponds to the following example text with three text spans numbered 1, 2, 3:

1. Honolulu, Hi. will be site of the 2016 Conference on Hawaiian History

2. It is expected that 200 historians from the U.S. and Asia will attend

3. The conference will be concerned with how the Polynesians sailed to Hawaii

For example, relation 210, or elaboration, describes the relationship between text span 201 and text span 202. Relation 228 depicts the relationship, elaboration, between text span 203 and 204. As depicted, text spans 202 and 203 elaborate further on text span 201. In the above example, given a goal of notifying readers of a conference, text span 1 is the nucleus. Text spans 2 and 3 provide more detail about the conference. In FIG. 2, a horizontal number, e.g., 1-3, 1, 2, 3 covers a span of text (possibly made up of further spans); a vertical line signals the nucleus or nuclei; and a curve represents a rhetoric relation (elaboration) and the direction of the arrow points from the satellite to the nucleus. If the text span only functions as a satellite and not as a nuclei, then deleting the satellite would still leave a coherent text. If from FIG. 2 one deletes the nucleus, then text spans 2 and 3 are difficult to understand.

FIG. 3 depicts a further example of a discourse tree in accordance with an aspect. FIG. 3 includes components 301 and 302, text spans 305-307, relation 310 and relation 328. Relation 310 depicts the relationship 310, enablement, between components 306 and 305, and 307, and 305. FIG. 3 refers to the following text spans:

1. The new Tech Report abstracts are now in the journal area of the library near the abridged dictionary.

2. Please sign your name by any means that you would be interested in seeing.

3. Last day for sign-ups is 31 May.

As can be seen, relation 328 depicts the relationship between entity 307 and 306, which is enablement. FIG. 3 illustrates that while nuclei can be nested, there exists only one most nuclear text span.

Constructing a Discourse Tree

Discourse trees can be generated using different methods. A simple example of a method to construct a DT bottom up is:

(1) Divide the discourse text into units by:
 (a) Unit size may vary, depending on the goals of the analysis
 (b) Typically, units are clauses (2) Examine each unit, and its neighbors. Is there a relation holding between them?

(3) If yes, then mark that relation.

(4) If not, the unit might be at the boundary of a higher-level relation. Look at relations holding between larger units (spans).

(5) Continue until all the units in the text are accounted for.

Figure 4:
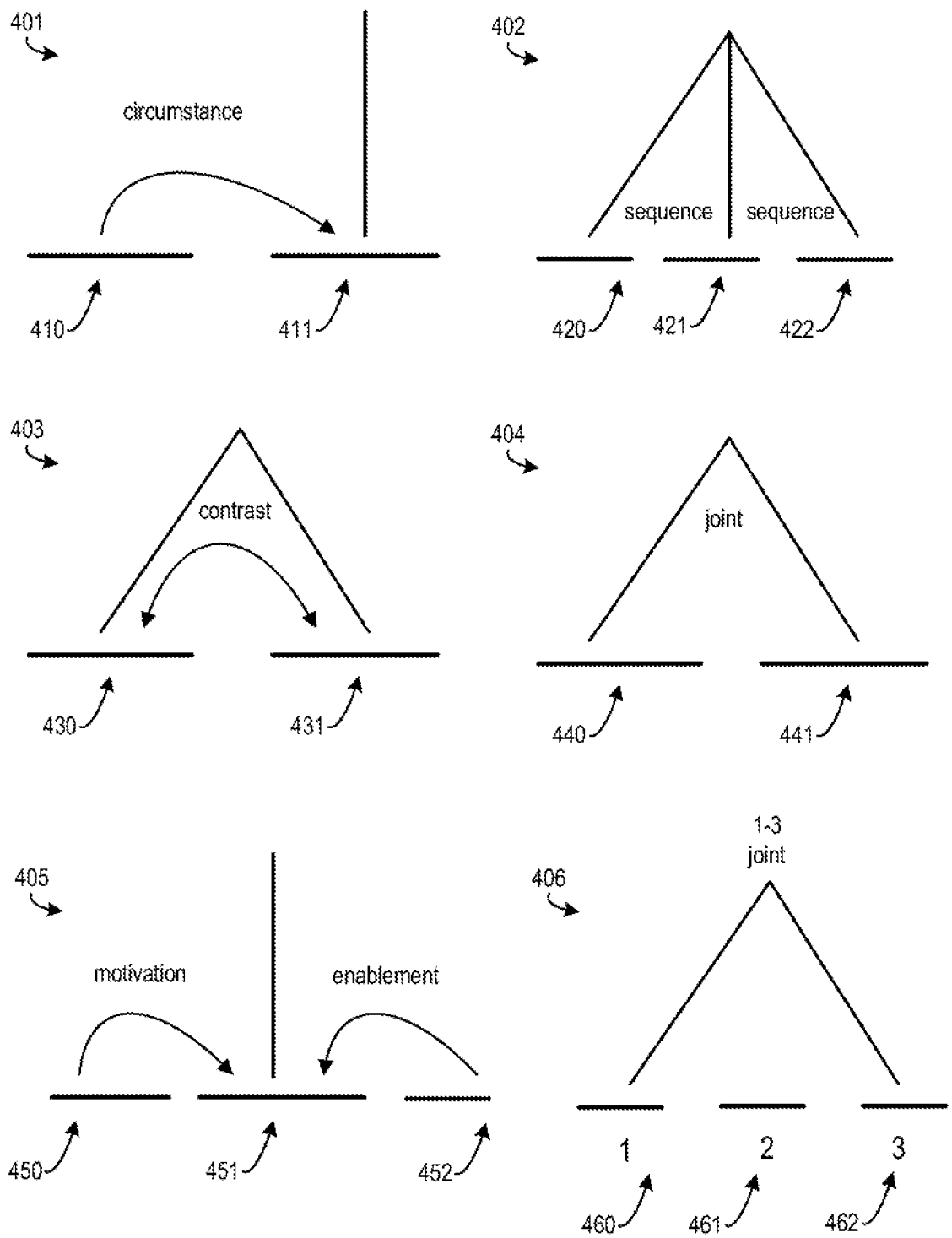
FIG. 4 depicts illustrative schemas, in accordance with an aspect.

Mann and Thompson also describe the second level of building block structures called schemas applications. In RST, rhetoric relations are not mapped directly onto texts; they are fitted onto structures called schema applications, and these in turn are fitted to text. Schema applications are derived from simpler structures called schemas (as shown by FIG. 4). Each schema indicates how a particular unit of text is decomposed into other smaller text units. A rhetorical structure tree or DT is a hierarchical system of schema applications. A schema application links a number of consecutive text spans, and creates a complex text span, which can in turn be linked by a higher-level schema application. RST asserts that the structure of every coherent discourse can be described by a single rhetorical structure tree, whose top schema creates a span encompassing the whole discourse.

FIG. 4 depicts illustrative schemas, in accordance with an aspect. FIG. 4 shows a joint schema is a list of items consisting of nuclei with no satellites. FIG. 4 depicts schemas 401-406. Schema 401 depicts a circumstance relation between text spans 410 and 428. Scheme 402 depicts a sequence relation between text spans 420 and 421 and a sequence relation between text spans 421 and 422. Schema 403 depicts a contrast relation between text spans 430 and 431. Schema 404 depicts a joint relationship between text spans 440 and 441. Schema 405 depicts a motivation relationship between 450 and 451, and an enablement relationship between 452 and 451. Schema 406 depicts joint relationship between text spans 460 and 462. An example of a joint scheme is shown in FIG. 4 for the three text spans below:

1. Skies will be partly sunny in the New York metropolitan area today.

2. It will be more humid, with temperatures in the middle 80's.

3. Tonight will be mostly cloudy, with the low temperature between 65 and 70.

While FIGS. 2-4 depict some graphical representations of a discourse tree, other representations are possible.

Figure 5:
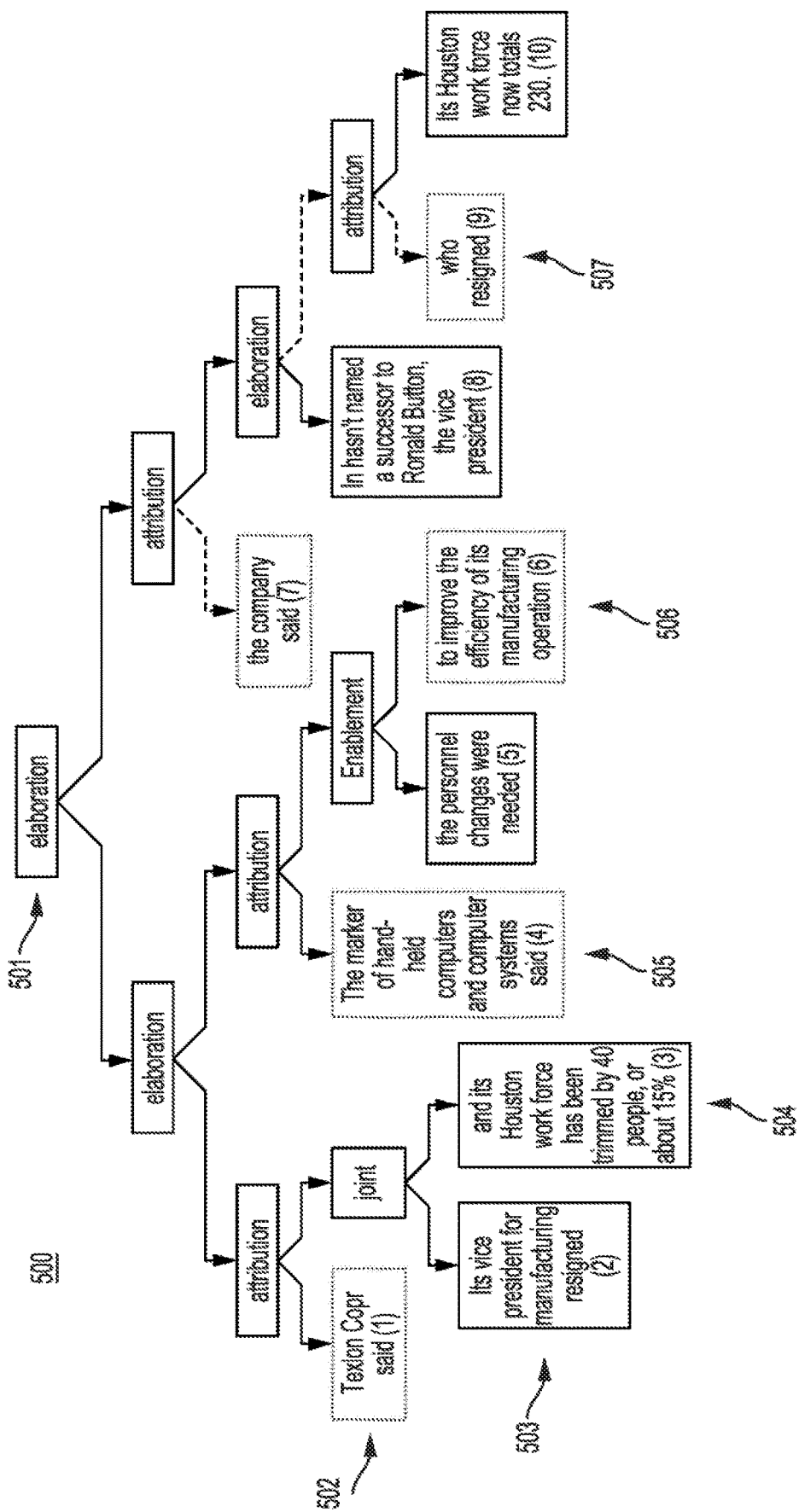
FIG. 5 depicts a discourse tree in accordance with an aspect.

FIG. 5 depicts a discourse tree in accordance with an aspect. As can be seen from FIG. 5, the leaves of a DT correspond to contiguous non-overlapping text spans called Elementary Discourse Units (EDUs). Adjacent EDUs are connected by relations (e.g., elaboration, attribution . . . ) and form larger discourse units, which are also connected by relations. "Discourse analysis in RST involves two subtasks: discourse segmentation is the task of identifying the EDUs, and discourse parsing is the task of linking the discourse units into a labeled tree." See Joty, Shafiq R and Giuseppe Carenini, Raymond T Ng, and Yashar Mehdad. 2013. Combining intra- and multi-sentential rhetorical parsing for document-level discourse analysis. In ACL (1), pages 486-496.

Figure 6:
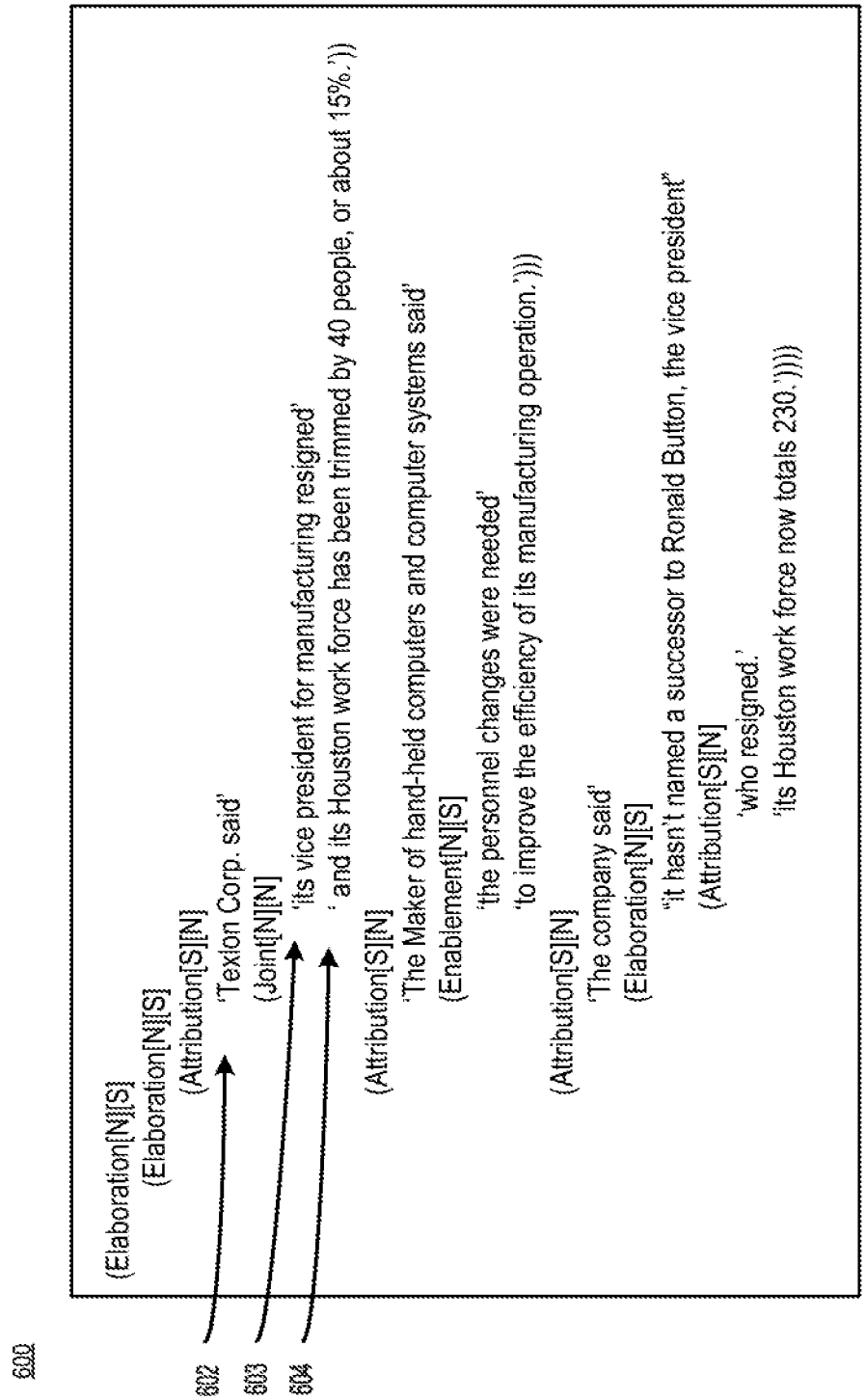
FIG. 6 depicts an exemplary indented text encoding of the representation in FIG. 5 in accordance with an aspect.

FIG. 5 depicts text spans that are leaves, or terminal nodes, on the tree, each numbered in the order they appear in the full text, shown in FIG. 6. FIG. 5 includes tree 500. Tree 500 includes, for example, nodes 501-507. The nodes indicate relationships. Nodes are non-terminal, such as node 501, or terminal, such as nodes 502-507. As can be seen, nodes 503 and 504 are related by a joint relationship. Nodes 502, 505, 506, and 508 are nuclei. The dotted lines indicate that the branch or text span is a satellite. The relations are nodes in gray boxes.

FIG. 6 depicts an exemplary indented text encoding of the representation in FIG. 5 in accordance with an aspect. FIG. 6 includes text 600 and text sequences 602-604. Text 600 is presented in a manner more amenable to computer programming. Text sequence 602 corresponds to node 502, sequence 603 corresponds to node 503, and sequence 604 corresponds to node 504. In FIG. 6, "N" indicates a nucleus and "S" indicates a satellite.

Examples of Discourse Parsers

Automatic discourse segmentation can be performed with different methods. For example, given a sentence, a segmentation model identifies the boundaries of the composite elementary discourse units by predicting whether a boundary should be inserted before each particular token in the sentence. For example, one framework considers each token in the sentence sequentially and independently. In this framework, the segmentation model scans the sentence token by token, and uses a binary classifier, such as a support vector machine or logistic regression, to predict whether it is appropriate to insert a boundary before the token being examined. In another example, the task is a sequential labeling problem. Once text is segmented into elementary discourse units, sentence-level discourse parsing can be performed to construct the discourse tree. Machine learning techniques can be used.

In one aspect of the present disclosure, two Rhetorical Structure Theory (RST) discourse parsers are used: CoreNLPProcessor which relies on constituent syntax, and FastNLPProcessor which uses dependency syntax. See Surdeanu, Mihai & Hicks, Thomas & Antonio Valenzuela-Escarcega, Marco. Two Practical Rhetorical Structure Theory Parsers. (2015).

In addition, the above two discourse parsers, i.e., CoreNLPProcessor and FastNLPProcessor use Natural Language Processing (NLP) for syntactic parsing. For example, the Stanford CoreNLP gives the base forms of words, their parts of speech, whether they are names of companies, people, etc., normalize dates, times, and numeric quantities, mark up the structure of sentences in terms of phrases and syntactic dependencies, indicate which noun phrases refer to the same entities. Practically, RST is a still theory that may work in many cases of discourse, but in some cases, it may not work. There are many variables including, but not limited to, what EDU's are in a coherent text, i.e., what discourse segmenters are used, what relations inventory is used and what relations are selected for the EDUs, the corpus of documents used for training and testing, and even what parsers are used. So for example, in Surdeanu, et al., "Two Practical Rhetorical Structure Theory Parsers," paper cited above, tests must be run on a particular corpus using specialized metrics to determine which parser gives better performance. Thus unlike computer language parsers which give predictable results, discourse parsers (and segmenters) can give unpredictable results depending on the training and/or test text corpus. Thus, discourse trees are a mixture of the predicable arts (e.g., compilers) and the unpredictable arts (e.g., like chemistry were experimentation is needed to determine what combinations will give you the desired results).

In order to objectively determine how good a Discourse analysis is, a series of metrics are being used, e.g., Precision/Recall/F1 metrics from Daniel Marcu, "The Theory and Practice of Discourse Parsing and Summarization," MIT Press, (2000). Precision, or positive predictive value is the fraction of relevant instances among the retrieved instances, while recall (also known as sensitivity) is the fraction of relevant instances that have been retrieved over the total amount of relevant instances. Both precision and recall are therefore based on an understanding and measure of relevance. Suppose a computer program for recognizing dogs in photographs identifies eight dogs in a picture containing 12 dogs and some cats. Of the eight dogs identified, five actually are dogs (true positives), while the rest are cats (false positives). The program's precision is 5/8 while its recall is 5/12. When a search engine returns 30 pages only 20 of which were relevant while failing to return 40 additional relevant pages, its precision is 20/30=2/3 while its recall is 20/60=1/3. Therefore, in this case, precision is 'how useful the search results are', and recall is 'how complete the results are.'" The F1 score (also F-score or F-measure) is a measure of a test's accuracy. It considers both the precision and the recall of the test to compute the score: F1=2× ((precision×recall)/(precision+recall)) and is the harmonic mean of precision and recall. The F1 score reaches its best value at 1 (perfect precision and recall) and worst at 0.

Autonomous Agents or Chatbots

A conversation between Human A and Human B is a form of discourse. For example, applications exist such as FaceBook® Messenger, WhatsApp®, Slack,® SMS, etc., a conversation between A and B may typically be via messages in addition to more traditional email and voice conversations. A chatbot (which may also be called intelligent bots or virtual assistant, etc.) is an "intelligent" machine that, for example, replaces human B and to various degrees mimics the conversation between two humans. An example ultimate goal is that human A cannot tell whether B is a human or a machine (the Turning test, developed by Alan Turing in 1950). Discourse analysis, artificial intelligence, including machine learning, and natural language processing, have made great strides toward the long-term goal of passing the Turing test. Of course, with computers being more and more capable of searching and processing vast repositories of data and performing complex analysis on the data to include predictive analysis, the long-term goal is the chatbot being human-like and a computer combined.

For example, users can interact with the Intelligent Bots Platform through a conversational interaction. This interaction, also called the conversational user interface (UI), is a dialog between the end user and the chatbot, just as between two human beings. It could be as simple as the end user saying "Hello" to the chatbot and the chatbot responding with a "Hi" and asking the user how it can help, or it could be a transactional interaction in a banking chatbot, such as transferring money from one account to the other, or an informational interaction in a HR chatbot, such as checking for vacation balance, or asking an FAQ in a retail chatbot, such as how to handle returns. Natural language processing (NLP) and machine learning (ML) algorithms combined with other approaches can be used to classify end user intent. An intent at a high level is what the end user would like to accomplish (e.g., get account balance, make a purchase). An intent is essentially, a mapping of customer input to a unit of work that the backend should perform. Therefore, based on the phrases uttered by the user in the chatbot, these are mapped that to a specific and discrete use case or unit of work, for e.g. check balance, transfer money and track spending are all "use cases" that the chatbot should support and be able to work out which unit of work should be triggered from the free text entry that the end user types in a natural language.

The underlying rational for having an AI chatbot respond like a human is that the human brain can formulate and understand the request and then give a good response to the human request much better than a machine. Thus, there should be significant improvement in the request/response of a chatbot, if human B is mimicked. So an initial part of the problem is how does the human brain formulate and understand the request? To mimic, a model is used. RST and DT allow a formal and repeatable way of doing this.

At a high level, there are typically two types of requests: (1) A request to perform some action; and (2) a request for information, e.g., a question. The first type has a response in which a unit of work is created. The second type has a response that is, e.g., a good answer, to the question. The answer could take the form of, for example, in some aspects, the AI constructing an answer from its extensive knowledge base(s) or from matching the best existing answer from searching the internet or intranet or other publically/privately available data sources.

Communicative Discourse Trees and The Rhetoric Classifier

Aspects of the present disclosure build communicative discourse trees and use communicative discourse trees to analyze whether the rhetorical structure of a request or question agrees with an answer. More specifically, aspects described herein create representations of a request-response pair, learns the representations, and relates the pairs into classes of valid or invalid pairs. In this manner, an autonomous agent can receive a question from a user, process the question, for example, by searching for multiple answers, determine the best answer from the answers, and provide the answer to the user.

More specifically, to represent linguistic features of text, aspects described herein use rhetoric relations and speech acts (or communicative actions). Rhetoric relations are relationships between the parts of the sentences, typically obtained from a discourse tree. Speech acts are obtained as verbs from a verb resource such as VerbNet. By using both rhetoric relations and communicative actions, aspects described herein can correctly recognize valid request-response pairs. To do so, aspects correlate the syntactic structure of a question with that of an answer. By using the structure, a better answer can be determined.

For example, when an autonomous agent receives an indication from a person that the person desires to sell an item with certain features, the autonomous agent should provide a search result that not only contains the features but also indicates an intent to buy. In this manner, the autonomous agent has determined the user's intent. Similarly, when an autonomous agent receives a request from a person to share knowledge about a particular item, the search result should contain an intent to receive a recommendation. When a person asks an autonomous agent for an opinion about a subject, the autonomous agent shares an opinion about the subject, rather than soliciting another opinion.

Analyzing Request and Response Pairs

Figure 7:
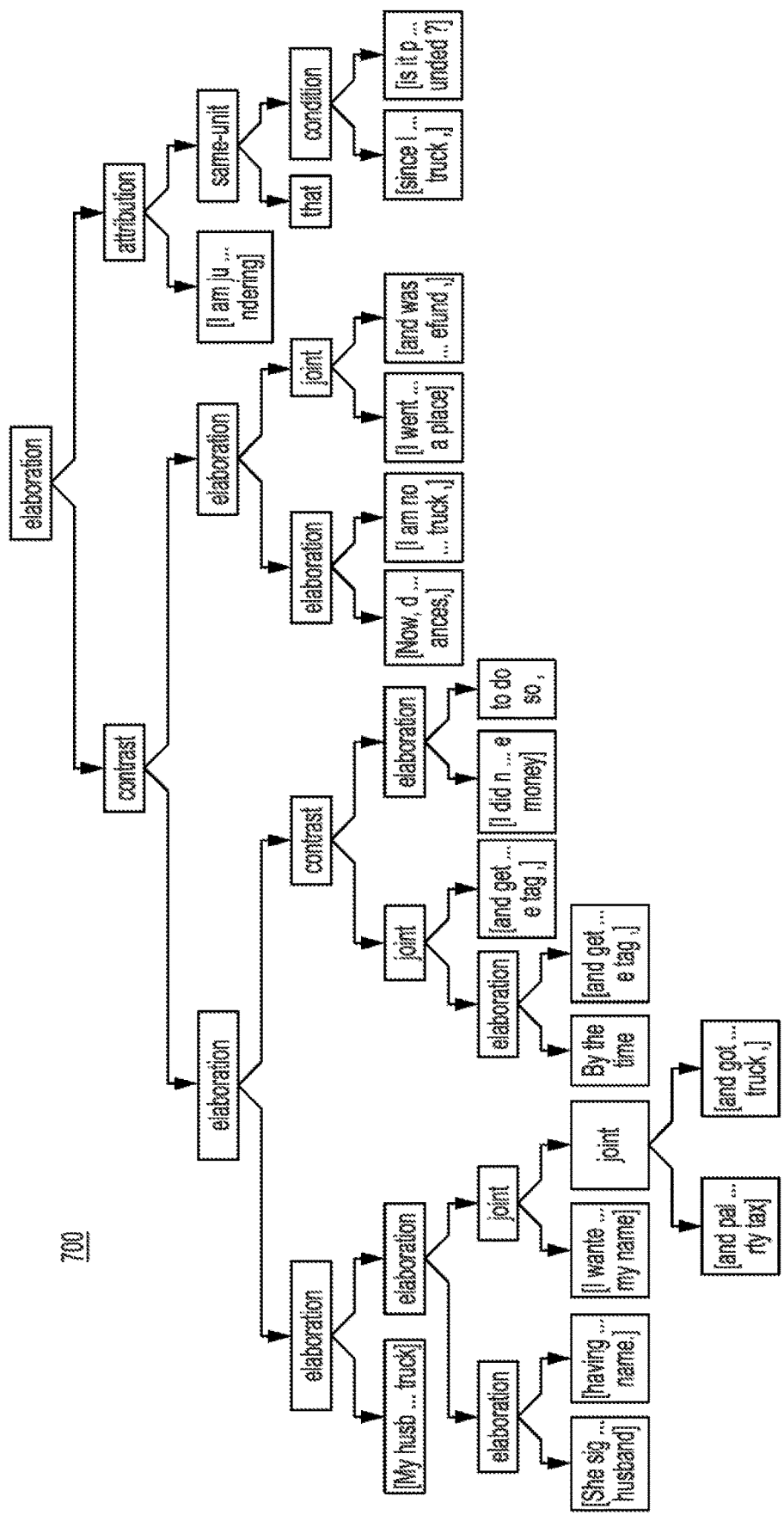
FIG. 7 depicts an exemplary discourse tree for an example request about property tax in accordance with an aspect.

FIG. 7 depicts an exemplary discourse tree for an example request about property tax in accordance with an aspect. The node labels are the relations and the arrowed line points to the satellite. The nucleus is a solid line. FIG. 7 depicts the following text.

Request: "My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund. I am just wondering that since I am not going to have a tag on this truck, is it possible to get the property tax refunded?"

Response: "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax. If you apply late, there will be penalties on top of the normal taxes and fees. You don't need to register it at the same time, but you absolutely need to title it within the period of time stipulated in state law."

As can be seen in FIG. 7, analyzing the above text results in the following. "My husbands' grandmother gave him his grandfather's truck" is elaborated by "She signed the title over but due to my husband" elaborated by "having unpaid fines on his license, he was not able to get the truck put in his name." which is elaborated by "I wanted to put in my name," "and paid the property tax", and "and got insurance for the truck."

"My husbands' grandmother gave him his grandfather's truck. She signed the title over but due to my husband having unpaid fines on his license, he was not able to get the truck put in his name. I wanted to put in my name and paid the property tax and got insurance for the truck." is elaborated by;

"I didn't have the money" elaborated by "to do so" contrasted with [0106] "By the time" elaborated by "it came to sending off the title"

"and getting the tag"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so" is contrasted with "Now, due to circumstances," elaborated with "I am not going to be able to afford the truck." which is elaborated with "I went to the insurance place"

"and was refused a refund"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund." is elaborated with "I am just wondering that since I am not going to have a tag on this truck, is it possible to get the property tax refunded?"

"I am just wondering" has attribution to

"that" is the same unit as "is it possible to get the property tax refunded?" which has condition "since I am not going to have a tag on this truck"

As can be seen, the main subject of the topic is "Property tax on a car". The question includes the contradiction: on one hand, all properties are taxable, and on the other hand, the ownership is somewhat incomplete. A good response has to address both topic of the question and clarify the inconsistency. To do that, the responder is making even stronger claim concerning the necessity to pay tax on whatever is owned irrespectively of the registration status. This example is a member of positive training set from our Yahoo! Answers evaluation domain. The main subject of the topic is "Property tax on a car". The question includes the contradiction: on one hand, all properties are taxable, and on the other hand, the ownership is somewhat incomplete. A good answer/response has to address both topic of the question and clarify the inconsistency. The reader can observe that since the question includes rhetoric relation of contrast, the answer has to match it with a similar relation to be convincing. Otherwise, this answer would look incomplete even to those who are not domain experts.

Figure 8:
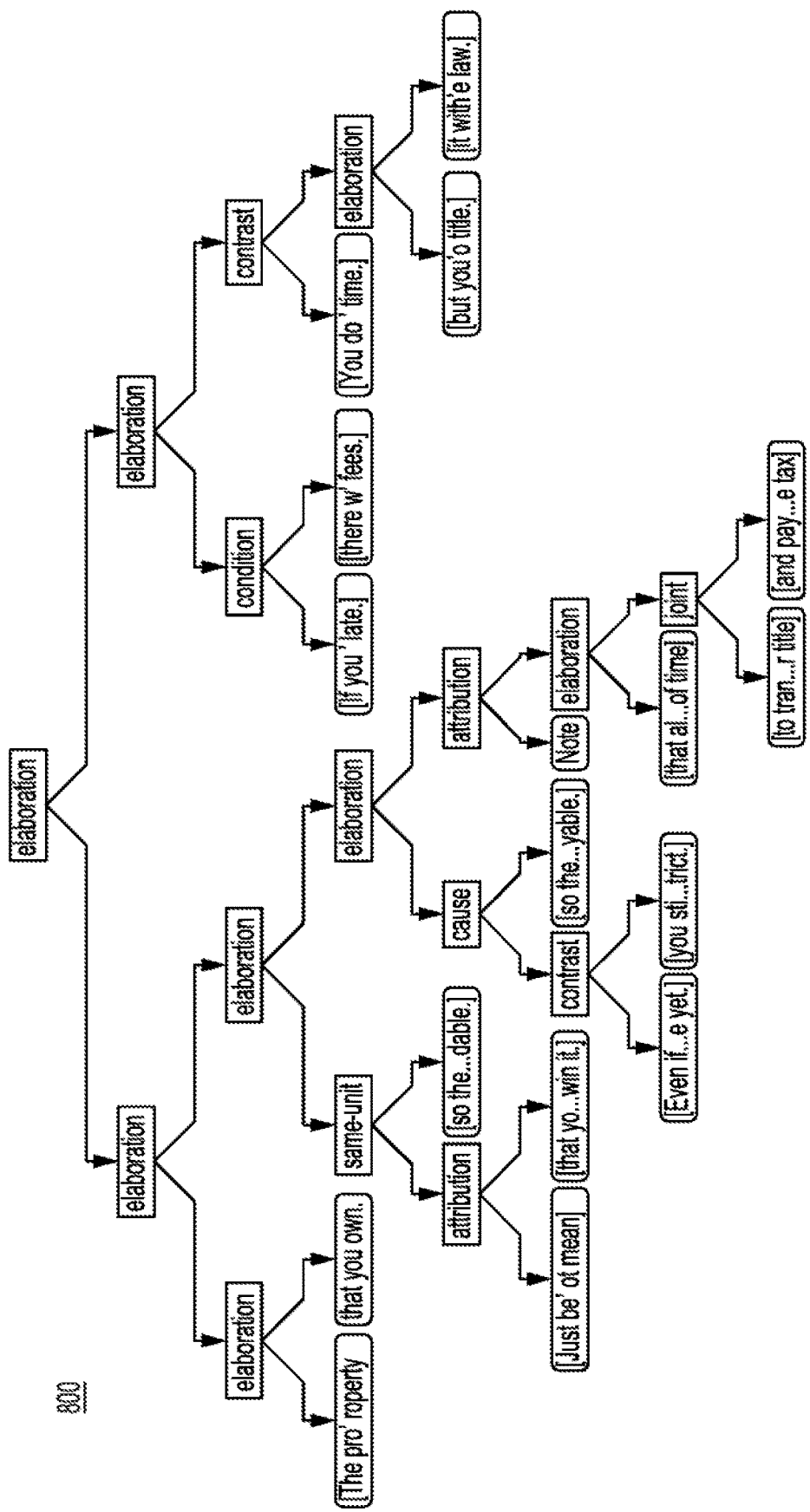
FIG. 8 depicts a discourse tree for an exemplary response for the question represented in FIG. 7.

FIG. 8 depicts a discourse tree for an exemplary response for the question represented in FIG. 7, according to certain aspects of the present disclosure. The central nucleus is "the property tax is assessed on property" elaborated by "that you own". "The property tax is assessed on property that you own" is also a nucleus elaborated by "Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax."

The nucleus "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax." is elaborated by "there will be penalties on top of the normal taxes and fees" with condition "If you apply late," which in turn is elaborated by the contrast of "but you absolutely need to title it within the period of time stipulated in state law." and "You don't need to register it at the same time.".

Comparing the DT of FIG. 7 and DT of FIG. 8, enables a determination of how well matched the response (FIG. 8) is to the request (FIG. 7). In some aspects of the present disclosure, the above framework is used, at least in part, to determine the DTs for the request/response and the rhetoric agreement between the DTs.

In another example, the question "What does The Investigative Committee of the Russian Federation do" has at least two answers, for example, an official answer or an actual answer.

Figure 9:
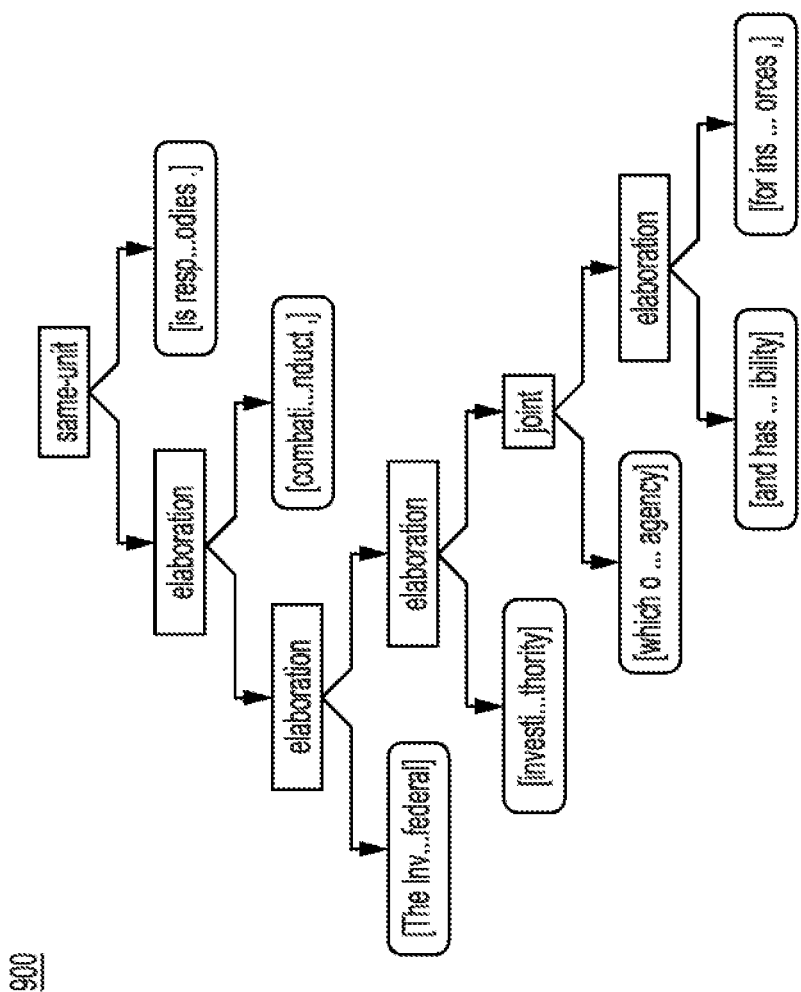
FIG. 9 illustrates a discourse tree for an official answer in accordance with an aspect.

FIG. 9 illustrates a discourse tree for an official answer in accordance with an aspect. As depicted in FIG. 9, an official answer, or mission statement states that "The Investigative Committee of the Russian Federation is the main federal investigating authority which operates as Russia's Anti-corruption agency and has statutory responsibility for inspecting the police forces, combating police corruption and police misconduct, is responsible for conducting investigations into local authorities and federal governmental bodies."

Figure 10:
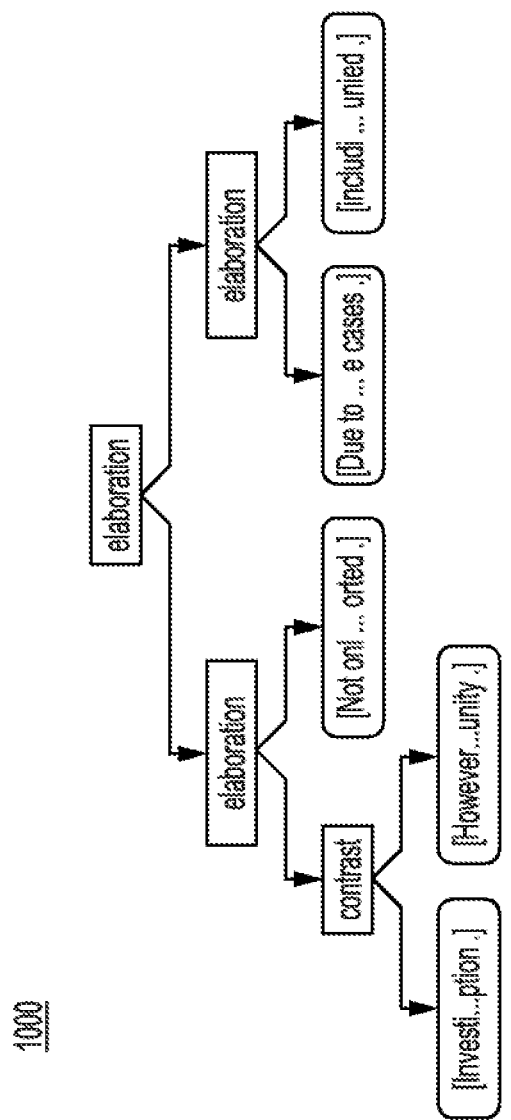
FIG. 10 illustrates a discourse tree for a raw answer in accordance with an aspect.

FIG. 10 illustrates a discourse tree for a raw answer in accordance with an aspect. As depicted in FIG. 10, another, perhaps more honest, answer states that "Investigative Committee of the Russian Federation is supposed to fight corruption. However, top-rank officers of the Investigative Committee of the Russian Federation are charged with creation of a criminal community. Not only that, but their involvement in large bribes, money laundering, obstruction of justice, abuse of power, extortion, and racketeering has been reported. Due to the activities of these officers, dozens of high-profile cases including the ones against criminal lords had been ultimately ruined."

The choice of answers depends on context. Rhetoric structure allows differentiating between "official", "politically correct", template-based answers and "actual", "raw", "reports from the field", or "controversial" answers. (See FIG. 9 and FIG. 10). Sometimes, the question itself can give a hint about which category of answers is expected. If a question is formulated as a factoid or definitional one, without a second meaning, then the first category of answers is suitable. Otherwise, if a question has the meaning "tell me what it really is", then the second category is appropriate. In general, after extracting a rhetoric structure from a question, selecting a suitable answer that would have a similar, matching, or complementary rhetoric structure is easier.

The official answer is based on elaboration and joints, which are neutral in terms of controversy a text might contain (See FIG. 9). At the same time, the row answer includes the contrast relation. This relation is extracted between the phrase for what an agent is expected to do and what this agent was discovered to have done.

Classification of Request-Response Pairs

Dialogue application 102 can determine whether a given answer or response, such as an answer obtained from an answer database or a public database, is responsive to a given question, or request. More specifically, dialogue application 102 analyzes whether a request and response pair is correct or incorrect by determining one or both of (i) relevance or (ii) rhetoric agreement between the request and the response. Rhetoric agreement can be analyzed without taking into account relevance, which can be treated orthogonally.

Dialogue application 102 can determine similarity between question-answer pairs using different methods. For example, dialogue application 102 can determine level of similarity between an individual question and an individual answer. Alternatively, dialogue application 102 can determine a measure of similarity between a first pair including a question and an answer, and a second pair including a question and answer.

For example, dialogue application 102 uses classification model 120 trained to predict matching or non-matching answers. Dialogue application 102 can process two pairs at a time, for example <q1, a1> and <q2, a2>. Dialogue application 102 compares q1 with q2 and a1 with a1, producing a combined similarity score. Such a comparison allows a determination of whether an unknown question/answer pair contains a correct answer or not by assessing a distance from another question/answer pair with a known label. In particular, an unlabeled pair <q2, a2> can be processed so that rather than "guessing" correctness based on words or structures shared by q2 and a2, both q2 and a2 can be compared with their corresponding components q1 and a2 of the labeled pair <q2, a2> on the grounds of such words or structures. Because this approach targets a domain-independent classification of an answer, only the structural cohesiveness between a question and answer can be leveraged, not 'meanings' of answers.

In an aspect, dialogue application 102 uses training data 125 to train classification model 120. In this manner, classification model 120 is trained to determine a similarity between pairs of questions and answers. This is a classification problem. Training data 125 can include a positive training set and a negative training set. Training data 125 includes matching request-response pairs in a positive dataset and arbitrary or lower relevance or appropriateness request-response pairs in a negative dataset. For the positive dataset, various domains with distinct acceptance criteria are selected that indicate whether an answer or response is suitable for the question.

Each training data set includes a set of training pairs. Each training set includes a question communicative discourse tree that represents a question and an answer communicative discourse tree that represents an answer and an expected level of complementarity between the question and answer. By using an iterative process, dialogue application 102 provides a training pair to classification model 120 and receives, from the model, a level of complementarity. Dialogue application 102 calculates a loss function by determining a difference between the determined level of complementarity and an expected level of complementarity for the particular training pair. Based on the loss function, dialogue application 102 adjusts internal parameters of the classification model to minimize the loss function.

Acceptance criteria can vary by application. For example, acceptance criteria may be low for community question answering, automated question answering, automated and manual customer support systems, social network communications and writing by individuals such as consumers about their experience with products, such as reviews and complaints. RR acceptance criteria may be high in scientific texts, professional journalism, health and legal documents in the form of FAQ, professional social networks such as "stackoverflow."

Communicative Discourse Trees (CDTs)

Dialogue application 102 can create, analyze, and compare communicative discourse trees. Communicative discourse trees are designed to combine rhetoric information with speech act structures. CDTs include with arcs labeled with expressions for communicative actions. By combining communicative actions, CDTs enable the modeling of RST relations and communicative actions. A CDT is a reduction of a parse thicket. See Galitsky, B, Ilvovsky, D. and Kuznetsov SO. Rhetoric Map of an Answer to Compound Queries Knowledge Trail Inc. ACL 2015, 681-686. ("Galitsky 2015"). A parse thicket is a combination of parse trees for sentences with discourse-level relationships between words and parts of the sentence in one graph. By incorporating labels that identify speech actions, learning of communicative discourse trees can occur over a richer features set than just rhetoric relations and syntax of elementary discourse units (EDUs).

In an example, a dispute between three parties concerning the causes of a downing of a commercial airliner, Malaysia Airlines Flight 16 is analyzed. An RST representation of the arguments being communicated is built. In the example, three conflicting agents, Dutch investigators, The Investigative Committee of the Russian Federation, and the self-proclaimed Donetsk People's Republic exchange their opinions on the matter. The example illustrates a controversial conflict where each party does all it can to blame its opponent. To sound more convincing, each party does not just produce its claim but formulates a response in a way to rebuff the claims of an opponent. To achieve this goal, each party attempts to match the style and discourse of the opponents' claims.

Figure 11:
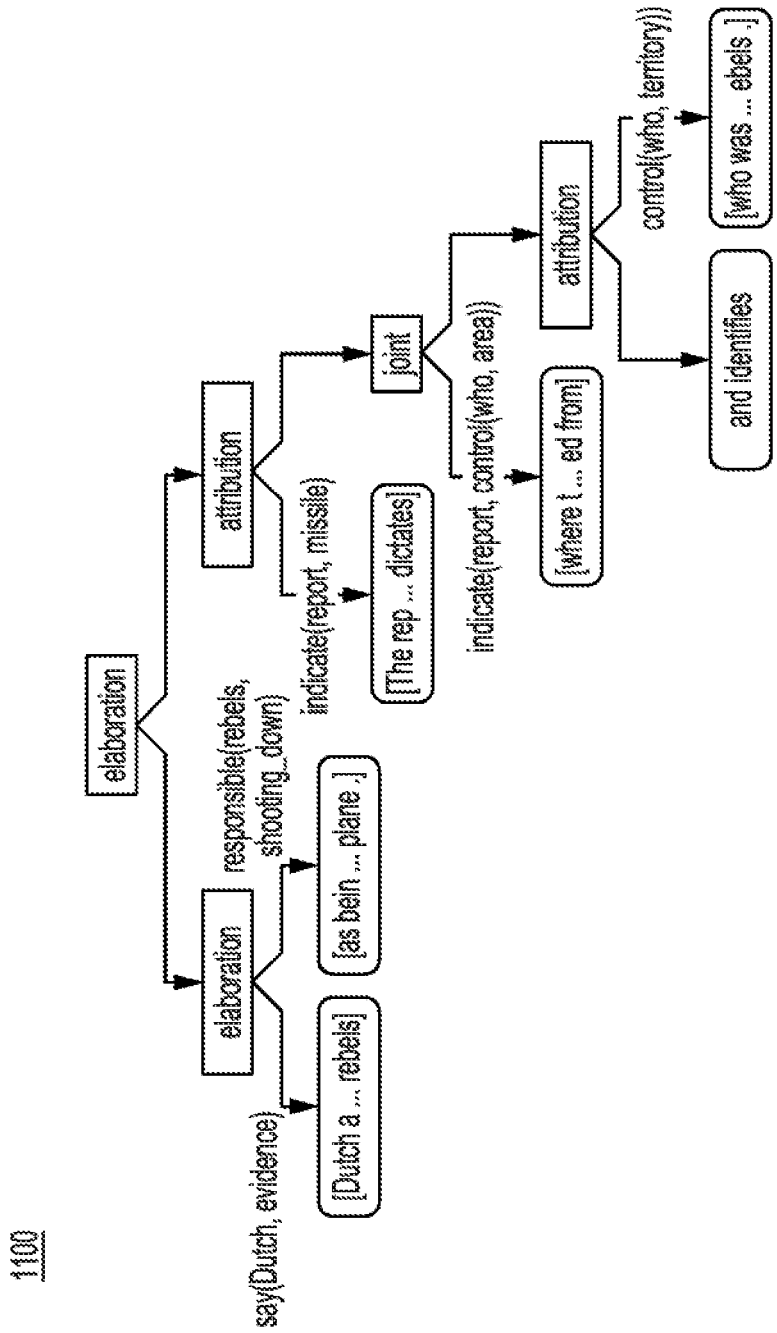
FIG. 11 illustrates a communicative discourse tree for a claim of a first agent in accordance with an aspect.

FIG. 11 illustrates a communicative discourse tree for a claim of a first agent in accordance with an aspect. FIG. 11 depicts communicative discourse tree 100, which represents the following text: "Dutch accident investigators say that evidence points to pro-Russian rebels as being responsible for shooting down plane. The report indicates where the missile was fired from and identifies who was in control of the territory and pins the downing of MH16 on the pro-Russian rebels."

As can be seen from FIG. 11, non-terminal nodes of CDTs are rhetoric relations, and terminal nodes are elementary discourse units (phrases, sentence fragments) which are the subjects of these relations. Certain arcs of CDTs are labeled with the expressions for communicative actions, including the actor agent and the subject of these actions (what is being communicated). For example, the nucleus node for elaboration relation (on the left) are labeled with say (Dutch, evidence), and the satellite with responsible (rebels, shooting down). These labels are not intended to express that the subjects of EDUs are evidence and shooting down but instead for matching this CDT with others for the purpose of finding similarity between them. In this case just linking these communicative actions by a rhetoric relation and not providing information of communicative discourse would be too limited way to represent a structure of what and how is being communicated. A requirement for an RR pair to have the same or coordinated rhetoric relation is too weak, so an agreement of CDT labels for arcs on top of matching nodes is required.

The straight edges of this graph are syntactic relations, and curvy arcs are discourse relations, such as anaphora, same entity, sub-entity, rhetoric relation and communicative actions. This graph includes much richer information than just a combination of parse trees for individual sentences. In addition to CDTs, parse thickets can be generalized at the level of words, relations, phrases and sentences. The speech actions are logic predicates expressing the agents involved in the respective speech acts and their subjects. The arguments of logical predicates are formed in accordance to respective semantic roles, as proposed by a framework such as VerbNet. See Karin Kipper, Anna Korhonen, Neville Ryant, Martha Palmer, A Large-scale Classification of English Verbs, Language Resources and Evaluation Journal, 42(1), pp. 21-40, Springer Netherland, 2008. and/or Karin Kipper Schuler, Anna Korhonen, Susan W. Brown, VerbNet overview, extensions, mappings and apps, Tutorial, NAACL-HLT 2009, Boulder, Colo.

Figure 12:
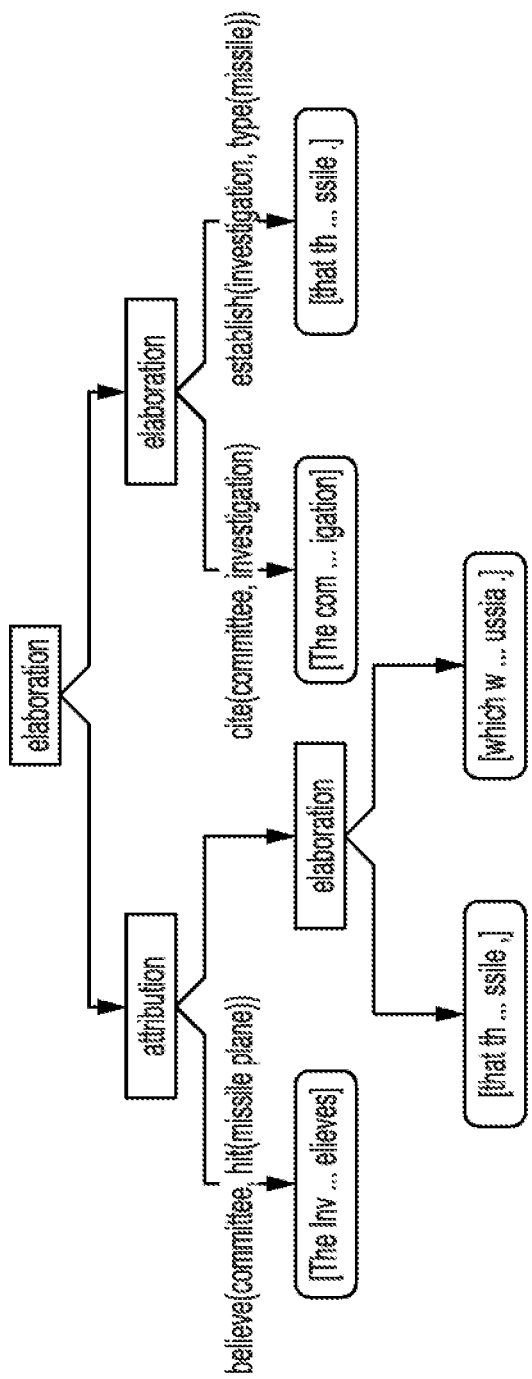
FIG. 12 illustrates a communicative discourse tree for a claim of a second agent in accordance with an aspect.

FIG. 12 illustrates a communicative discourse tree for a claim of a second agent in accordance with an aspect. FIG. 12 depicts communicative discourse tree 1200, which represents the following text: "The Investigative Committee of the Russian Federation believes that the plane was hit by a missile, which was not produced in Russia. The committee cites an investigation that established the type of the missile."

Figure 13:
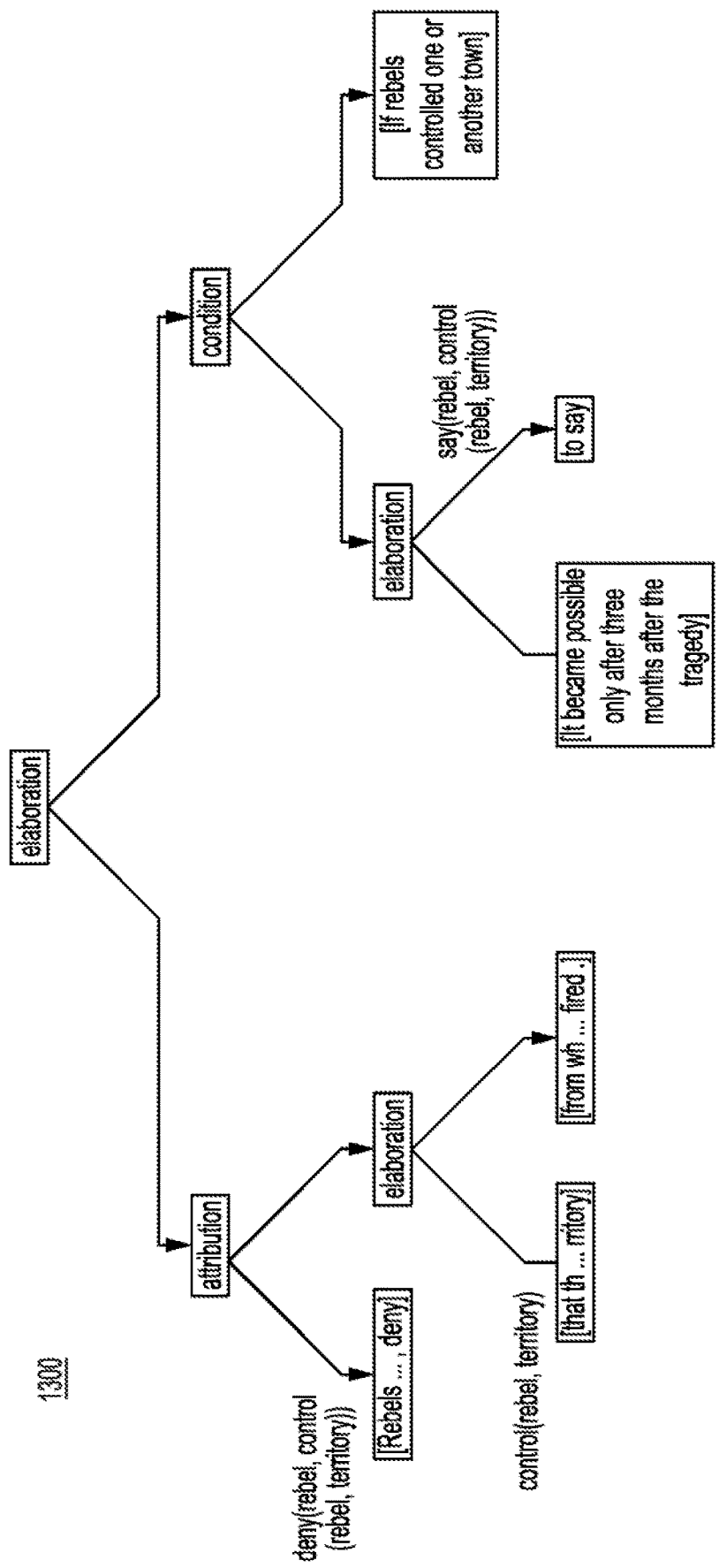
FIG. 13 illustrates a communicative discourse tree for a claim of a third agent in accordance with an aspect.

FIG. 13 illustrates a communicative discourse tree for a claim of a third agent in accordance with an aspect. FIG. 13 depicts communicative discourse tree 1300, which represents the following text: "Rebels, the self-proclaimed Donetsk People's Republic, deny that they controlled the territory from which the missile was allegedly fired. It became possible only after three months after the tragedy to say if rebels controlled one or another town."

As can be seen from communicative discourse trees 1100-1300, a response is not arbitrary. A response talks about the same entities as the original text. For example, communicative discourse trees 1200 and 1300 are related to communicative discourse tree 1100. A response backs up a disagreement with estimates and sentiments about these entities, and about actions of these entities.

More specifically, replies of involved agent need to reflect the communicative discourse of the first, seed message. As a simple observation, because the first agent uses Attribution to communicate his claims, the other agents have to follow the suite and either provide their own attributions or attack the validity of attribution of the proponent, or both. To capture a broad variety of features for how communicative structure of the seed message needs to be retained in consecutive messages, pairs of respective CDTs can be learned.

To verify the agreement of a request-response, discourse relations or speech acts (communicative actions) alone are often insufficient. As can be seen from the example depicted in FIGS. 11-13, the discourse structure of interactions between agents and the kind of interactions are useful. However, the domain of interaction (e.g., military conflicts or politics) or the subjects of these interactions, i.e., the entities, do not need to be analyzed.

Representing Rhetoric Relations and Communicative Actions

In order to compute similarity between abstract structures, two approaches are frequently used: (1) representing these structures in a numerical space, and express similarity as a number, which is a statistical learning approach, or (2) using a structural representation, without numerical space, such as trees and graphs, and expressing similarity as a maximal common sub-structure. Expressing similarity as a maximal common sub-structure is referred to as generalization.

Learning communicative actions helps express and understand arguments. Computational verb lexicons help support acquisition of entities for actions and provide a rule-based form to express their meanings. Verbs express the semantics of an event being described as well as the relational information among participants in that event, and project the syntactic structures that encode that information. Verbs, and in particular communicative action verbs, can be highly variable and can display a rich range of semantic behaviors. In response, verb classification helps a learning systems to deal with this complexity by organizing verbs into groups that share core semantic properties.

VerbNet is one such lexicon, which identifies semantic roles and syntactic patterns characteristic of the verbs in each class and makes explicit the connections between the syntactic patterns and the underlying semantic relations that can be inferred for all members of the class. See Karin Kipper, Anna Korhonen, Neville Ryant and Martha Palmer, *Language Resources and Evaluation*, Vol. 42, No. 1 (March 2008), at 21. Each syntactic frame, or verb signature, for a class has a corresponding semantic representation that details the semantic relations between event participants across the course of the event.

For example, the verb amuse is part of a cluster of similar verbs that have a similar structure of arguments (semantic roles) such as amaze, anger, arouse, disturb, and irritate. The roles of the arguments of these communicative actions are as follows: Experiencer (usually, an animate entity), Stimulus, and Result. Each verb can have classes of meanings differentiated by syntactic features for how this verb occurs in a sentence, or frames. For example, the frames for amuse are as follows, using the following key noun phrase (NP), noun (N), communicative action (V), verb phrase (VP), adverb (ADV):

NP V NP. Example: "The teacher amused the children." Syntax: Stimulus V Experiencer. Clause: amuse(Stimulus, E, Emotion, Experiencer), cause(Stimulus, E), emotional_state(result(E), Emotion, Experiencer).

NP V ADV-Middle. Example: "Small children amuse quickly." Syntax: Experiencer V ADV. Clause: amuse(Experiencer, Prop):—, property(Experiencer, Prop), adv(Prop).

NP V NP-PRO-ARB. Example "The teacher amused." Syntax Stimulus V. amuse(Stimulus, E, Emotion, Experiencer): cause(Stimulus, E), emotional_state(result(E), Emotion, Experiencer).

NP.cause V NP. Example "The teacher's dolls amused the children." syntax Stimulus <+genitive> ('s) V Experiencer. amuse(Stimulus, E, Emotion, Experiencer): cause(Stimulus, E), emotional_state(during(E), Emotion, Experiencer).

NP V NP ADJ. Example "This performance bored me totally." syntax Stimulus V Experiencer Result. amuse(Stimulus, E, Emotion, Experiencer). cause(Stimulus, E), emotional_state(result(E), Emotion, Experiencer), Pred(result(E), Experiencer).

Communicative actions can be characterized into clusters, for example:

Verbs with Predicative Complements (Appoint, characterize, dub, declare, conjecture, masquerade, orphan, captain, consider, classify), Verbs of Perception (See, sight, peer).

Verbs of Psychological State (Amuse, admire, marvel, appeal), Verbs of Desire (Want, long).

Judgment Verbs (Judgment), Verbs of Assessment (Assess, estimate), Verbs of Searching (Hunt, search, stalk, investigate, rummage, ferret), Verbs of Social Interaction (Correspond, marry, meet, battle), Verbs of Communication (Transfer(message), inquire, interrogate, tell, manner (speaking), talk, chat, say, complain, advise, confess, lecture, overstate, promise). Avoid Verbs (Avoid), Measure Verbs, (Register, cost, fit, price, bill), Aspectual Verbs (Begin, complete, continue, stop, establish, sustain.

Aspects described herein provide advantages over statistical learning models. In contrast to statistical solutions, aspects use a classification system can provide a verb or a verb-like structure which is determined to cause the target feature (such as rhetoric agreement). For example, statistical machine learning models express similarity as a number, which can make interpretation difficult.

Representing Request-Response Pairs

Representing request-response pairs facilitates classification based operations based on a pair. In an example, request-response pairs can be represented as parse thickets. A parse thicket is a representation of parse trees for two or more sentences with discourse-level relationships between words and parts of the sentence in one graph. See Galitsky 2015. Topical similarity between question and answer can expressed as common sub-graphs of parse thickets. The higher the number of common graph nodes, the higher the similarity.

Figure 14:
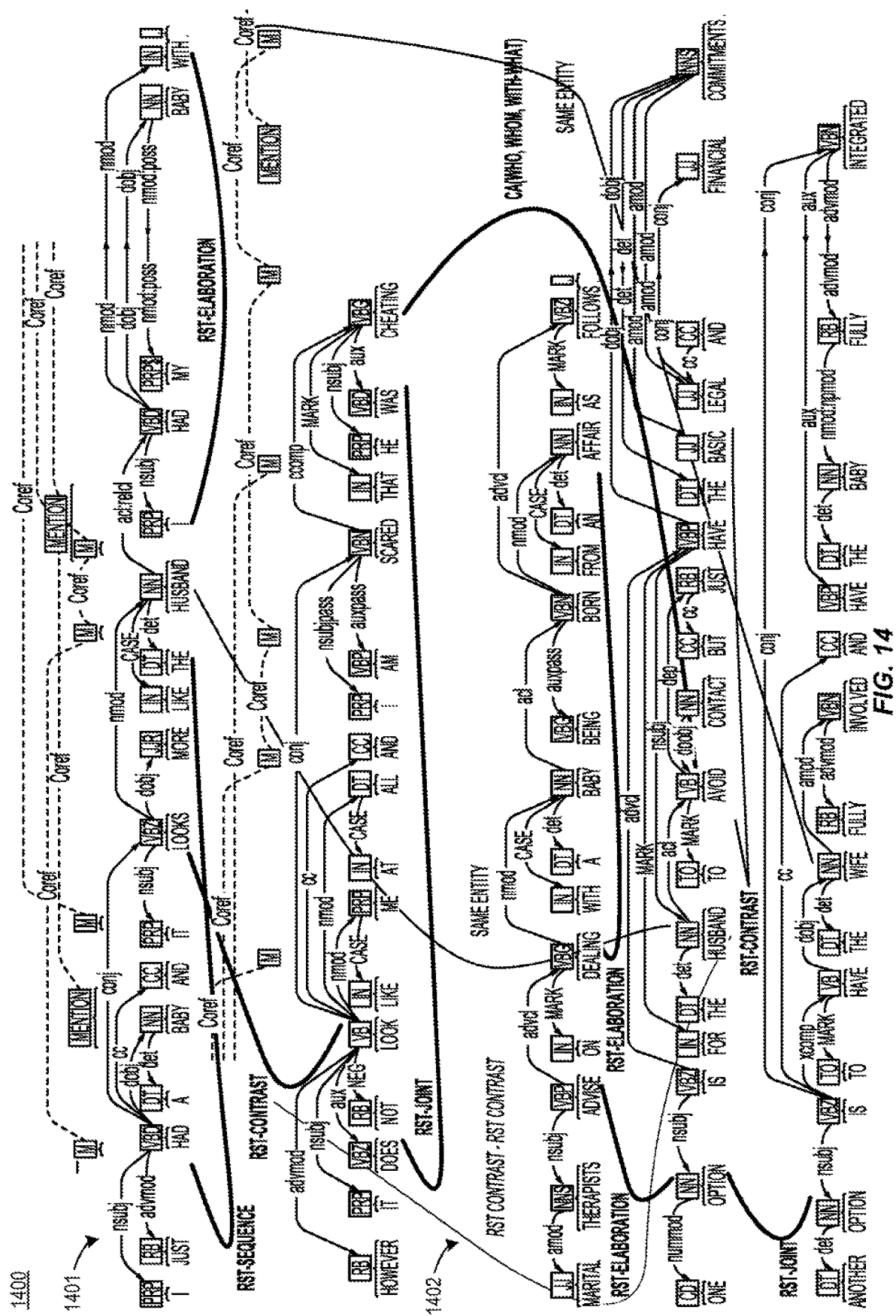
FIG. 14 illustrates parse thickets in accordance with an aspect.

FIG. 14 illustrates parse thickets in accordance with an aspect. FIG. 14 depicts parse thicket 1400 including a parse tree for a request 1401, and a parse tree for a corresponding response 1402.

Parse tree 1401 represents the question "I just had a baby and it looks more like the husband I had my baby with. However it does not look like me at all and I am scared that he was cheating on me with another lady and I had her kid. This child is the best thing that has ever happened to me and I cannot imagine giving my baby to the real mom."

Response 1402 represents the response "Marital therapists advise on dealing with a child being born from an affair as follows. One option is for the husband to avoid contact but just have the basic legal and financial commitments. Another option is to have the wife fully involved and have the baby fully integrated into the family just like a child from a previous marriage."

FIG. 14 represents a greedy approach to representing linguistic information about a paragraph of text. The straight edges of this graph are syntactic relations, and curvy arcs are discourse relations, such as anaphora, same entity, sub-entity, rhetoric relation and communicative actions. The solid arcs are for same entity/sub-entity/anaphora relations, and the dotted arcs are for rhetoric relations and communicative actions. Oval labels in straight edges denote the syntactic relations. Lemmas are written in the boxes for the nodes, and lemma forms are written on the right side of the nodes.

Parse thicket 1400 includes much richer information than just a combination of parse trees for individual sentences. Navigation through this graph along the edges for syntactic relations as well as arcs for discourse relations allows to transform a given parse thicket into semantically equivalent forms for matching with other parse thickets, performing a text similarity assessment task. To form a complete formal representation of a paragraph, as many links as possible are expressed. Each of the discourse arcs produces a pair of thicket phrases that can be a potential match.

Topical similarity between the seed (request) and response is expressed as common sub-graphs of parse thickets. They are visualized as connected clouds. The higher the number of common graph nodes, the higher the similarity. For rhetoric agreement, common sub-graph does not have to be large as it is in the given text. However, rhetoric relations and communicative actions of the seed and response are correlated and a correspondence is required.

Generalization for Communicative Actions

A similarity between two communicative actions $A_1$ and $A_2$ is defined as a an abstract verb which possesses the features which are common between $A_1$ and $A_2$. Defining a similarity of two verbs as an abstract verb-like structure supports inductive learning tasks, such as a rhetoric agreement assessment. In an example, a similarity between the following two common verbs, agree and disagree, can be generalized as follows: agree ^ disagree=verb(Interlocutor, Proposed_action, Speaker), where Interlocution is the person who proposed the Proposed_action to the Speaker and to whom the Speaker communicates their response. Proposed_action is an action that the Speaker would perform if they were to accept or refuse the request or offer, and The Speaker is the person to whom a particular action has been proposed and who responds to the request or offer made.

In a further example, a similarity between verbs agree and explain is represented as follows: agree ^ explain=verb (Interlocutor, *, Speaker). The subjects of communicative actions are generalized in the context of communicative actions and are not be generalized with other "physical" actions. Hence, aspects generalize individual occurrences of communicative actions together with corresponding subjects.

Additionally, sequences of communicative actions representing dialogs can be compared against other such sequences of similar dialogs. In this manner, the meaning of an individual communicative action as well as the dynamic discourse structure of a dialogue is (in contrast to its static structure reflected via rhetoric relations) is represented. A generalization is a compound structural representation that happens at each level. Lemma of a communicative action is generalized with lemma, and its semantic role are generalized with respective semantic role.

Communicative actions are used by text authors to indicate a structure of a dialogue or a conflict. See Searle, J. R. 1969, Speech acts: an essay in the philosophy of language. London: Cambridge University Press. Subjects are generalized in the context of these actions and are not generalized with other "physical" actions. Hence, the individual occurrences of communicative actions together are generalized with their subjects, as well as their pairs, as discourse "steps."

Generalization of communicative actions can also be thought of from the standpoint of matching the verb frames, such as VerbNet. The communicative links reflect the discourse structure associated with participation (or mentioning) of more than a single agent in the text. The links form a sequence connecting the words for communicative actions (either verbs or multi-words implicitly indicating a communicative intent of a person).

Communicative actions include an actor, one or more agents being acted upon, and the phrase describing the features of this action. A communicative action can be described as a function of the form: verb (agent, subject, cause), where verb characterizes some type of interaction between involved agents (e.g., explain, confirm, remind, disagree, deny, etc.), subject refers to the information transmitted or object described, and cause refers to the motivation or explanation for the subject.

A scenario (labeled directed graph) is a sub-graph of a parse thicket G=(V, A), where V={$action_1$, $action_2$ . . . $action_n$} is a finite set of vertices corresponding to communicative actions, and A is a finite set of labeled arcs (ordered pairs of vertices), classified as follows:

Each arc $action_i$, $action_j \in A_{sequence}$ corresponds to a temporal precedence of two actions $v_i$, $ag_i$, $s_i$, $c_i$ and $v_j$, $ag_j$, $s_j$, $c_j$ that refer to the same subject, e.g., $s_j = s_i$ or different subjects. Each arc $action_i$, $action_{jk} \in A_{cause}$ corresponds to an attack relationship between $action_i$ and $action_j$ indicating that the cause of $action_i$ in conflict with the subject or cause of $action_j$.

Subgraphs of parse thickets associated with scenarios of interaction between agents have some distinguishing features. For example, (1) all vertices are ordered in time, so that there is one incoming arc and one outgoing arc for all vertices (except the initial and terminal vertices), (2) for $A_{sequence}$ arcs, at most one incoming and only one outgoing arc are admissible, and (3) for $A_{cause}$ arcs, there can be many outgoing arcs from a given vertex, as well as many incoming arcs. The vertices involved may be associated with different agents or with the same agent (i.e., when he contradicts himself). To compute similarities between parse thickets and their communicative action, induced subgraphs, the subgraphs of the same configuration with similar labels of arcs and strict correspondence of vertices are analyzed.

The following similarities exist by analyzing the arcs of the communicative actions of a parse thicket: (1) one communicative action from with its subject from T1 against another communicative action with its subject from T2 (communicative action arc is not used), and (2) a pair of communicative actions with their subjects from T1 compared to another pair of communicative actions from T2 (communicative action arcs are used).

Generalizing two different communicative actions is based on their attributes. See (Galitsky et al 2013). As can be seen in the example discussed with respect to FIG. 14, one communicative action from T1, cheating(husband, wife, another lady) can be compared with a second from T2, avoid(husband, contact(husband, another lady)). A generalization results in communicative_action(husband, *) which introduces a constraint on A in the form that if a given agent (=husband) is mentioned as a subject of CA in Q, he(she) should also be a subject of (possibly, another) CA in A. Two communicative actions can always be generalized, which is not the case for their subjects: if their generalization result is empty, the generalization result of communicative actions with these subjects is also empty.

Generalization of RST Relations

Some relations between discourse trees can be generalized, such as arcs that represent the same type of relation (presentation relation, such as antithesis, subject matter relation, such as condition, and multinuclear relation, such as list) can be generalized. A nucleus or a situation presented by a nucleus is indicated by "N." Satellite or situations presented by a satellite, are indicated by "S." "W" indicates a writer. "R" indicates a reader (hearer). Situations are propositions, completed actions or actions in progress, and communicative actions and states (including beliefs, desires, approve, explain, reconcile and others). Generalization of two RST relations with the above parameters is expressed as:

$$rst1(N1,S1,W1,R1)\char`\^rst2(N2,S2,W2,R2)=(rst1\char`\^rst2)$$
$$(N1\char`\^N2,S1\char`\^S2,W1\char`\^W2,R1\char`\^R2).$$

The texts in N1, S1, W1, R1 are subject to generalization as phrases. For example, rst1 ^ rst2 can be generalized as follows: (1) if relation_type(rst1)!=relation_type(rst2) then a generalization is empty. (2) Otherwise, the signatures of rhetoric relations are generalized as sentences: sentence(N1, S1, W1, R1) ^ sentence(N2, S2, W2, R2). See Iruskieta, Mikel, Iria da Cunha and Maite Taboada. A qualitative comparison method for rhetorical structures: identifying different discourse structures in multilingual corpora. Lang Resources & Evaluation. June 2015, Volume 49, Issue 2.

For example, the meaning of rst–background ^ rst–enablement=(S increases the ability of R to comprehend an element in N)^(R comprehending S increases the ability of R to perform the action in N)=increase-VB the-DT ability-NN of-IN R-NN to-IN.

Because the relations rst–background ^ rst–enablement differ, the RST relation part is empty. The expressions that are the verbal definitions of respective RST relations are then generalized. For example, for each word or a placeholder for a word such as an agent, this word (with its POS) is retained if the word the same in each input phrase or remove the word if the word is different between these phrases. The resultant expression can be interpreted as a common meaning between the definitions of two different RST relations, obtained formally.

Two arcs between the question and the answer depicted in FIG. 14 show the generalization instance based on the RST relation "RST-contrast". For example, "I just had a baby" is a RST-contrast with "it does not look like me," and related to "husband to avoid contact" which is a RST-contrast with "have the basic legal and financial commitments." As can be seen, the answer need not have to be similar to the verb phrase of the question but the rhetoric structure of the question and answer are similar. Not all phrases in the answer must match phrases in question. For example, the phrases that do not match have certain rhetoric relations with the phrases in the answer which are relevant to phrases in question.

Building a Communicative Discourse Tree

Figure 15:
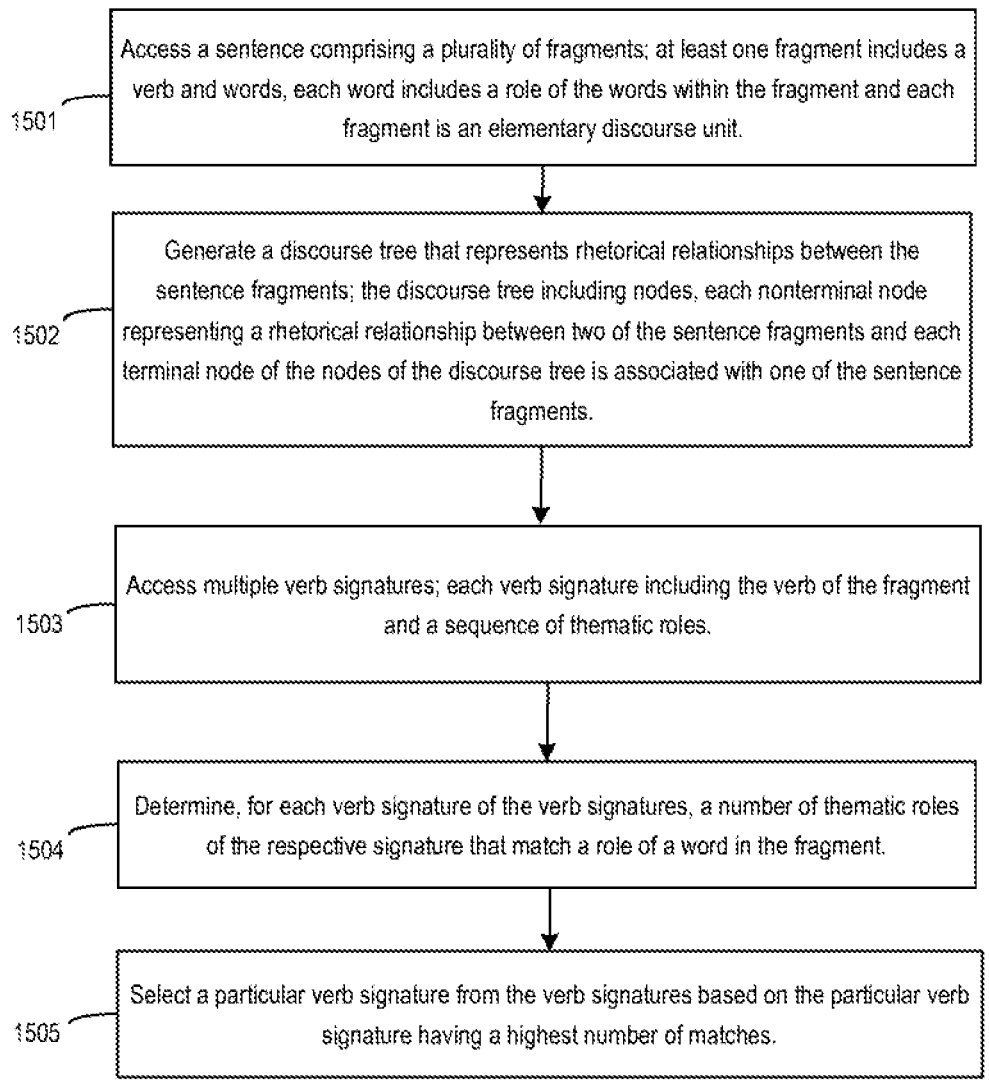
FIG. 15 illustrates an exemplary process for building a communicative discourse tree in accordance with an aspect.

FIG. 15 illustrates an exemplary process for building a communicative discourse tree in accordance with an aspect. Dialogue application 102 can implement process 1500. As discussed, communicative discourse trees enable improved search engine results.

At block 1501, process 1500 involves accessing a sentence including fragments. At least one fragment includes a verb and words and each word includes a role of the words within the fragment, and each fragment is an elementary discourse unit. For example, dialogue application 102 accesses a sentence such as "Rebels, the self-proclaimed Donetsk People's Republic, deny that they controlled the territory from which the missile was allegedly fired" as described with respect to FIG. 13.

Continuing the example, dialogue application 102 determines that the sentence includes several fragments. For example, a first fragment is "rebels . . . deny." A second fragment is "that they controlled the territory." A third fragment is "from which the missile was allegedly fired." Each fragment includes a verb, for example, "deny" for the first fragment and "controlled" for the second fragment. Although, a fragment need not include a verb.

At block 1502, process 1500 involves generating a discourse tree that represents rhetorical relationships between the sentence fragments. The discourse tree including nodes, each nonterminal node representing a rhetorical relationship between two of the sentence fragments and each terminal node of the nodes of the discourse tree is associated with one of the sentence fragments.

Continuing the example, dialogue application 102 generates a discourse tree as shown in FIG. 13. For example, the third fragment, "from which the missile was allegedly fired" elaborates on "that they controlled the territory." The second and third fragments together relate to attribution of what happened, i.e., the attack cannot have been the rebels because they do not control the territory.

At block 1503, process 1500 involves accessing multiple verb signatures. For example, dialogue application 102 accesses a list of verbs, e.g., from VerbNet. Each verb matches or is related to the verb of the fragment. For example, for the first fragment, the verb is "deny." Accordingly, dialogue application 102 accesses a list of verb signatures that relate to the verb deny.

As discussed, each verb signature includes the verb of the fragment and one or more of thematic roles. For example, a signature includes one or more of noun phrase (NP), noun (N), communicative action (V), verb phrase (VP), or adverb (ADV). The thematic roles describing the relationship between the verb and related words. For example "the teacher amused the children" has a different signature from "small children amuse quickly." For the first fragment, the verb "deny," dialogue application 102 accesses a list of frames, or verb signatures for verbs that match "deny." The list is "NP V NP to be NP," "NP V that S" and "NP V NP."

Each verb signature includes thematic roles. A thematic role refers to the role of the verb in the sentence fragment. Dialogue application 102 determines the thematic roles in each verb signature. Example thematic roles include actor, agent, asset, attribute, beneficiary, cause, location destination source, destination, source, location, experiencer, extent, instrument, material and product, material, product, patient, predicate, recipient, stimulus, theme, time, or topic.

At block 1504, process 1500 involves determining, for each verb signature of the verb signatures, a number of thematic roles of the respective signature that match a role of a word in the fragment. For the first fragment, dialogue application 102 determines that the verb "deny" has only three roles, "agent", "verb" and "theme."

At block 1505, process 1500 involves selecting a particular verb signature from the verb signatures based on the particular verb signature having a highest number of matches. For example, referring again to FIG. 13, deny in the first fragment "the rebels deny . . . that they control the territory" is matched to verb signature deny "NP V NP", and "control" is matched to control (rebel, territory). Verb signatures are nested, resulting in a nested signature of "deny (rebel, control(rebel, territory))."

Building a Dialogue from an Arbitrary Text

Certain aspects leverage Rhetoric Structure Theory (RST) and other techniques to form questions that correspond with identified answers from within text. Examples of use cases include training classification models, generating training data in a second domain from available training data in a first domain, and generating and providing a virtual dialogue to a user device. Text of any style or genre can be used.

Rhetoric Structure Theory (RST) and other techniques can be used to identify answers and questions from text. As discussed, the flow of entities in text can be represented via a discourse tree that includes elementary discourse units (EDUs). Many rhetorical relations between elementary discourse units are binary anti-symmetric and specify which EDU has more important (nucleus) compared to less important (satellite). Therefore, a dialogue can be formed from text by identifying nucleus EDUs and satellite EDUs. In some cases, questions are identified from a satellite EDU and nucleus EDUs remain as background answers. These questions tend to be local in nature, e.g., to a region of text. In other cases, questions can be produced from nucleus EDUs, can be global in nature, applying to an entire text.

Discourse-based techniques can also be used to determine a suitable location within the text for a question to be inserted. For example, a marker can be inserted in the text at the point at which a nucleus EDU is finished and before a satellite EDU starts. A generated question can be inserted at this marker. The question "interrupts" the dialogue flow between a text author and a person asking a question. The text of the satellite EDU and possibly consecutive text then flows naturally as the answer to the question. The question is ideally related to the entity of the nucleus. But not all nuclei are relevant—text is interrupted to answer a question only if the question is suitable. For example, if conversion of a satellite elementary discourse unit into a question fails, if generalization of a question fails, or if verification of a question fails, then a question is not generated and inserted into the text.

Figure 16:
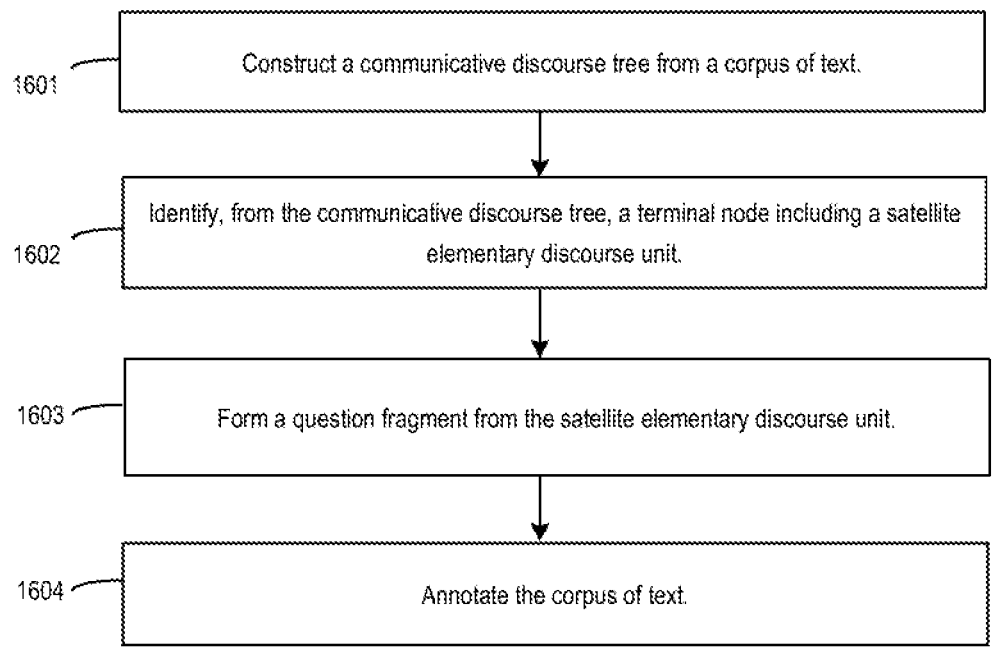
FIG. 16 illustrates an exemplary process for annotating text in accordance with an aspect.

The problem of building dialogue from text T is formulated as splitting it into a sequence of answers $A=[A_1 \ldots A_n]$ to form a dialogue:

$$[A_1, <Q_1, A_2>, \ldots, <A_{n-1}, A_n>],$$

where $A_i$ answers $Q_{i-1}$ and possibly previous question, and $\cup A_i = T$. $Q_{i-1}$ is derived from the whole or a part of $A_i$ by linguistic means and generalization. FIG. 16 depicts an example of a suitable process.

FIG. 16 illustrates an exemplary process 1600 for annotating text in accordance with an aspect. Dialogue application 102 can implement process 1600.

At block 1601, process 1600 involves a communicative discourse tree from text including fragments. Examples of text include electronic documents, books, and other online content.

In some cases, process 1600 involves creating a discourse tree rather than a communicative discourse tree. A discourse tree represents rhetorical relationships between the fragments of text. The discourse tree includes nodes, each nonterminal node representing a rhetorical relationship between two of the fragments, and each terminal node of the nodes of the discourse tree is associated with one of the fragments. By contrast, a communicative discourse tree includes communicative actions. For example purposes, process 1600 is discussed with respect to FIG. 17.

Figure 17:
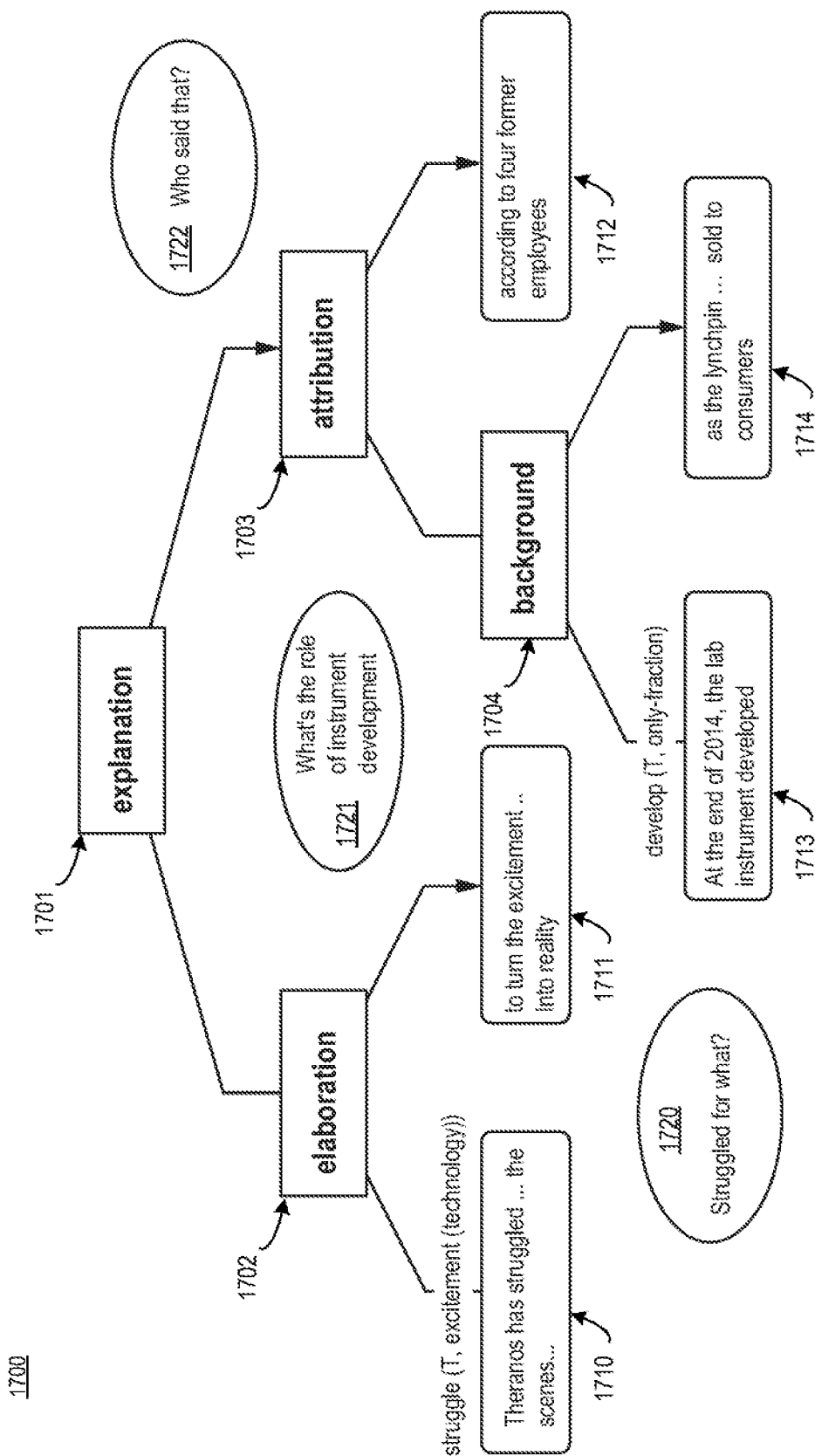
FIG. 17 illustrates an exemplary communicative discourse tree in accordance with an aspect.

FIG. 17 illustrates an exemplary communicative discourse tree in accordance with an aspect. FIG. 17 depicts a communicative discourse tree, which represents the following text: "Theranos has struggled behind the scenes to turn the excitement over its technology into reality. At the end of 2014, the lab instrument developed as the linchpin of its strategy handled just a small fraction of the tests then sold to consumers, according to four former employees." FIG. 17 depicts rhetorical relations 1701-1704 which are of type explanation, elaboration, attribution, and background respectively. FIG. 17 also depicts elementary discourse units 1710-1714. Elementary discourse units are leaf nodes of the discourse tree. Elementary discourse units 1710, 1713, and 1712 are satellite elementary discourse units and elementary discourse units 1711 and 1714 are nuclei elementary discourse units. Dialogue application 102 forms questions 1720-1722.

At block 1602, process 1600 involves identifying, from the discourse tree, a terminal node including a satellite elementary discourse unit. Once the text is split into elementary discourse units, dialogue application 102 identifies which text fragments will serve as answers to questions by identifying one or more satellites. Each satellite elementary discourse unit represents an answer, for which a corresponding question can be created. As discussed, the satellite elementary discourse unit is secondary to a corresponding nucleus elementary discourse unit.

Continuing the example, elementary discourse units 1710 and 1713 are nucleus elementary discourse units, whereas elementary discourse units 1711, 1712, and 1714 are satellite elementary discourse units.

At block 1603, process 1600 involves forming a question fragment from the satellite elementary discourse unit. Different approaches can be used to form a question fragment at block 1603. For example, forming a question can include constructing a parse tree from the satellite elementary discourse unit. The parse tree includes nodes, e.g., for a noun phrase or a verb phrase. Dialogue application 102 selects, from the nodes, a node that represents either (i) a noun, (ii) a verb, or (iii) adjective. Dialogue application 102 can then replace the identified word with a question word. Examples of question words are what, where, whom, who, how, or whose. Other question words are possible. Table 3, below, lists some examples of how various parts of a parse tree can be replaced with question words.

TABLE 3 question word insertion
Using Rhetorical Relations to Guide Question Formation

| Node(s) Deleted | Formed Question |
| --- | --- |
| Noun Phrase (NP) - | Noun and preposition of noun are replaced<br>Example:<br>"The president of US announced a . . ."<br>Substitution: "The president of US" –> Who<br>Q = Who announced . . . ? |

TABLE 3-continued question word insertion
Using Rhetorical Relations to Guide Question Formation

| Node(s) Deleted | Formed Question |
|---|---|
| Verb Phrase (VP) | Verb and verb subject are replaced with what/when/where<br>Example:<br>The president of US announced a new series of project to improve the security of state<br>VP = announced a new series of projects . . . =><br>Verb + Verb subject => announced what/when/where<br>Substitution: Verb itself −> what<br>Question: what did the president announce |
| Predicate + Subject | President announced => subject + predicate + VP(predicate)<br>Wh part = VP-verb itself = for whom/to what audience/for what purpose<br>Substitution: President announce for X, X−> What . . . ?<br>Question: President announced for whom?<br>President announced to which of his supporters<br>President announced for what reason |
| Verb phrase + noun phrase | Formed question = noun phrase with Wh word<br>Verb phrase = Announced on the summer evening<br>Noun phrase = the summer evening<br>Substitution: noun phrase => when/what/where<br>Question: when did announce?<br>What did announce, where did announce |
| Verb phrase, considering VerbNet roles | Phrase = "Announced about relationship with China"<br>Verb Net (Announced): Who, ToWhom, What, When, Where)<br>Select role: When<br>Question: When announced about relationship with China? |
| Communicative verb phrase with its subject | Phrase: said that the president announced<br>Subject = the president announce<br>Substitution "president" −> Who<br>Question: who announced? |
| Possessive noun phrase | Phrase = President's announcement<br>Substitution President's −> whose<br>Question: Whose announcement?<br>Phrase = President of China<br>Substitution = President of China => president of what<br>Q: President of what . . . announced? |

Figure 18:
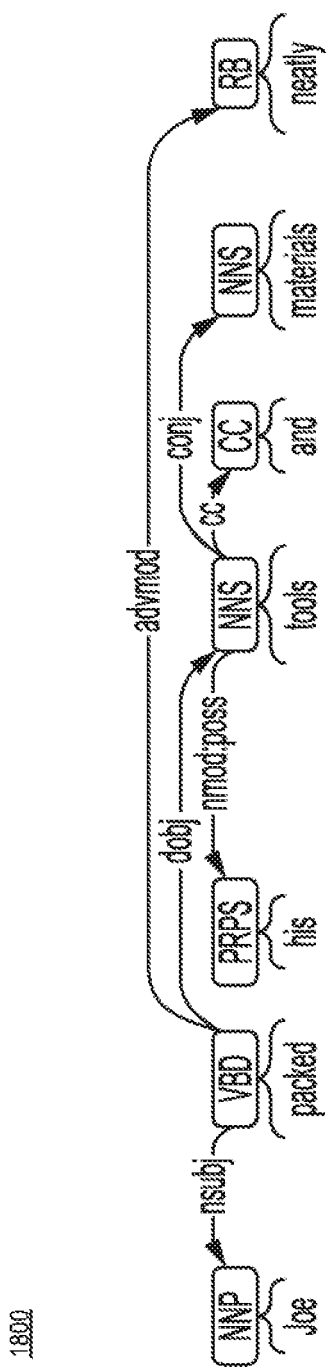
FIG. 18 illustrates an exemplary parse tree in accordance with an aspect.

FIG. 18 illustrates an exemplary parse tree in accordance with an aspect. FIG. 18 depicts an example of determining questions from text. In particular, FIG. 18 includes parse tree 1800, which represents the sentence: "Joe packed his tools and materials neatly." After building a parse tree, dialogue application 102 identifies nouns, verbs and adjectives in the parse tree. Dialogue application 102 builds a question for this reduction by substitution of a question word for a node. For every selected node, dialogue application 102 selects an appropriate question word by using the following rules: substituting "who" or "what" for a noun, "what . . . do" for a verb, or "which way" or "how is" for an adjective. As can be seen in Table 4, in an example, the sentence can be transformed into the question "What did Joe pack neatly." Dialogue application 102 replaces the noun "tools and materials" and the related word "his," leaving "Joe packed neatly." Dialogue application 102 then inserts the question word "what," resulting in "What did Joe pack neatly."

TABLE 4 transforming a statement into a question
Forming a Question for "Joe packed his tools and materials neatly."

| Node(s) Deleted | Resulting Question |
|---|---|
| Tools and materials (NNS) | What did Joe pack neatly |
| Joe (NNP), his (PRP$) | Who packed tools and materials neatly?<br>Whose tools and materials were packed neatly? |
| Neatly (RB) | How did Joe pack? |

In an aspect, a type of rhetorical relation that is connected to a particular satellite discourse unit can be used as a hint to determine an appropriate question word. For example, the rhetorical relation "elaboration" forms a "what" question, a "background" relation forms a "what question," and a rhetorical relation "cause" yields a "why" question.

TABLE 5 rhetorical relation to question word mapping
Using Rhetorical Relations to Guide Selection of Question Words

| Rhetorical Relation | Question Words |
| --- | --- |
| elaboration | "what" |
| background | "what" |
| cause | "why", "what caused"<br>Example: nucleus "I fell on the pavement" and satellite "since it was wet after he rain."<br>Question: "Why did I fall?" |
| attribution | "how"<br>Example:<br>"how do you know that?<br>Example: "According to CNN, dogs eat cats as they do not like diversity in animals."<br>Question: "how do . . . know that dogs eat cats?"<br>"What makes you believe . . . ?"<br>"From whom do you know . . . ?"<br>"Who told that?" |
| Temporal sequence | After/before what . . . ? What happened after what? |
| Enablement | "Which way do you do . . ."<br>"By which means?"<br>"What did . . . do to . . ." |
| Condition | "On what condition?" |
| Concession | "But why?"<br>"How come?" |
| Purpose | "For what?"<br>"For which purpose?" |

Returning to FIG. 17, as can be seen, dialogue application 102 creates question 1720. Question 1720 "Struggled for what?" uses the "what" question word and corresponds to elementary discourse unit 1710 and rhetorical relation 1720 ("elaboration"). Dialogue application 102 forms question 1721 "What's the role of instrument development?" which uses question word "what." Question 1721 corresponds to elementary discourse unit 1711 and rhetorical relation 1704 ("background"). Finally, dialogue application 102 forms question 1722 ("Who said that?"), which is a "what/who is source" question that corresponds to rhetorical relation 1703 ("attribution"). In the case that multiple possible questions can be derived from a particular satellite elementary discourse unit (e.g., one "what" question and another "why" question), one of the questions can be randomly chosen.

For example, dialogue application 102 examines satellite elementary discourse unit 1710, which states "But Theranos has struggled." From elementary discourse unit 1710, dialogue application 102 creates question "Struggled for what" by removing "Theranos," which is a noun, leaving "But what has struggled" and verb "has," leaving "but struggled."

In an aspect, nodes that are linked by co-references (e.g., pronouns) can be used and/or more complex selection rules can be applied. If a node is selected, then the node is removed from the parse tree.

In a further aspect, dialogue application 102 can refine a question to create a more natural-sounding question. For example, converting the satellite elementary discourse unit into a question might result in an unnatural question such as "the linchpin of its strategy handled just a small fraction of the tests then sold to whom?" Instead, dialogue application 102 phrases the question as "What does its strategy handle?"

More specifically, to improve the meaningfulness, interestingness and diversity of a formed and generalized question, dialogue application 102 can use web-mining techniques. Web-mining techniques involve forming a web search query from the original question (e.g., from the satellite elementary discourse unit) and attempts to find an expression from a web document as close to this question as possible and also from a reputable source or is popular. For example, dialogue application 102 queries an internet source for the question. Dialogue application 102 obtains search results from the internet source and iterates through the search results, scoring document titles, snippet sentences, and other expressions in found documents on the basis of their semantic similarity to the query.

Semantic similarity is assessed via the syntactic generalization score between the query and the search result. If a search result of sufficient similarity is found, then dialogue application 102 substitutes one or more entities of the question with new ones from search result. For two words of the same part of speech (POS), their generalization is the same word with the POS. If the lemmas for the two words are different but the POS is the same, then the POS remains in the result. If lemmas are the same but POS is different, lemma stays in the result. A lemma represents a word without the related part-of-speech information.

To illustrate this concept, consider an example of two natural language expressions. The meanings of the expressions are represented by logic formulas. The unification and anti-unification of these formulas are constructed. Some words (entities) are mapped to predicates, some are mapped into their arguments, and some other words do not explicitly occur in logic form representation but indicate the above instantiation of predicates with arguments.

Consider the following two sentences "camera with digital zoom" and "camera with zoom for beginners." To express the meanings, the following logic predicates are used:
camera(name_of_feature, type_of_users) and
zoom(type_of_zoom).

Note that this is a simplified example, and as such, may have a reduced number of arguments as compared to more typical examples. Continuing the example, the above expressions can be represented as:
camera(zoom(digital), AnyUser),
camera(zoom(AnyZoom), beginner)

According to the notation, variables (non-instantiated values, not specified in NL expressions) are capitalized. Given the above pair of formulas, unification computes their most general specialization camera(zoom(digital), beginner), and anti-unification computes their most specific generalization, camera(zoom(AnyZoom), AnyUser).

At the syntactic level, the expressions are subjected to a generalization ('^') of two noun phrases as: {NN-camera, PRP-with, [digital], NN-zoom [for beginners]}. The expressions in square brackets are eliminated because they occur in one expression but not occur in the other. As a result, obtain {NN-camera, PRP-with, NN-zoom]}, which is a syntactic analog of semantic generalization, is obtained.

The purpose of an abstract generalization is to find commonality between portions of text at various semantic levels. Generalization operation occurs on the one or more levels. Examples of levels are paragraph level, sentence level, phrase level, and word level.

At each level (except word-level), individual words, the result of generalization of two expressions is a set of expressions. In such set, for each pair of expressions so that one is less general than other, the latter is eliminated. Generalization of two sets of expressions is a set of sets which are the results of pair-wise generalization of these expressions.

Only a single generalization exists for a pair of words: if words are the same in the same form, the result is a node with this word in this form. To involve word2vec models (Mikolov et al., 2015), compute generalization of two different words, the following rule is used. If subject1=subject2, then subject1^subject2=<subject1, POS (subject1), 1>. Otherwise, if they have the same part-of-speech, subject1^subject2=<*,POS(subject1), word2vecDistance(subject1^subject2)>. If part-of-speech is different, generalization is an empty tuple. It cannot be further generalized.

For a pair of phrases, generalization includes all maximum ordered sets of generalization nodes for words in phrases so that the order of words is retained. In the following example, "To buy digital camera today, on Monday."
"Digital camera was a good buy today, first Monday of the month."

Generalization is {<JJ-digital, NN-camera>, <NN-today, ADV, Monday>}, where the generalization for noun phrases is followed by the generalization for an adverbial phrase. Verb buy is excluded from both generalizations because it occurs in a different order in the above phrases. Buy—digital—camera is not a generalization phrase because buy occurs in different sequence with the other generalization nodes.

Further, to verify that the formed and modified question obtained from a satellite elementary discourse unit includes text that will generate a good answer, dialogue application 102 can apply an open-domain question-answer (Q/A) technique. For example, given the whole original text and a formed question, dialogue application 102 can verify that the answer is the elementary discourse unit from which this question was formed and that the answer does not correspond to another EDU. An incorrect text fragment can appear as an answer if the question was substantially distorted by generalization or web mining. An example of a suitable Q/A system is the Pavlov.ai deep learning system.

For example, dialogue application 102 can generate one or more keywords from the question fragment (e.g., "technology") and submit the keywords to a search engine. Dialogue application 102 obtains a search result from the search engine and compares the search result with the question fragment. The comparison can be accomplished by deriving a maximal common sub-tree of the question fragment and the search result.

In a further aspect, dialogue application 102 can obtain a semantically similar phrase by searching for candidate questions in a database. Dialogue application 102 can then merge the phrase with the candidate question. Dialogue generation, or generating a Natural Language question conditioned on an answer and the corresponding document, is related to general content (sentence) generation, but can result in questions that are less random in nature than questions generated by deep-learning techniques.

Returning to FIG. 16, at block 1604, process 1600 involves annotating the text. Annotating includes inserting the question fragment into a location within the text. Dialogue application 102 identifies a location that is immediately preceding text that corresponds to the satellite elementary discourse unit. Dialogue application 102 can also label the satellite elementary discourse unit as an answer.

Referring back to FIG. 17, dialogue application 102 creates an annotated corpus of text from discourse tree 1700. The annotated corpus of text follows:

But Theranos has struggled . . . .
Struggled for what?
behind the scenes to turn the excitement over its technology into reality. At the end of 2014, the lab instrument developed as . . .
What's the role of instrument development?
the linchpin of its strategy handled just a small fraction of the tests then sold to consumers, . . . .
Who said that?
according to four former employees."

Dialogue application 102 can use the annotated corpus of text for different applications. Alternatively, dialogue application 102 can output the questions and/or answers as discrete entities. Examples of suitable applications include training classification models, providing a virtual dialogue to a user, and generating training data in a second domain from available training data in a first domain.

Using Communicative Discourse Trees to Generate Questions

In an aspect, dialogue application 102 can use communicative discourse trees to improve the formation of questions. For example, using communicative discourse trees, a text that already includes a subject (underlined in the example) of a communicative action (bolded) in a satellite, it can be naturally converted into a question: 'A potential PG&E bankruptcy is seen as putting pressure on California lawmakers to provide a bailout and avoid more turmoil for the state's largest utility'→{'Why put pressure on California lawmakers?', 'What should California lawmakers provide?', . . . }.

Referring back to process 1600, process 1600 can be performed with communicative discourse trees. For example, block 1601 can involve generating a communicative discourse tree. Block 1603 can involve forming a question from a communicative discourse tree. For example, dialogue application 102 identifies from the communicative discourse tree, a verb signature that corresponds to the satellite elementary discourse unit. Dialogue application 102 extracts a portion of the text in the satellite elementary discourse unit that is located immediately following the verb signature.

For example, referring back to FIG. 17, elementary discourse units 1710, which is the nucleus of elementary discourse unit 1711, includes communicative action struggle (T, excitement(technology)) which is attached to the relation of Elaboration. In an aspect, dialogue application 102 can generate a question 'Was there an excitement about [Theranos] technology?' Similarly, for the elementary discourse unit 1713, communicative action develop(T, small-fraction), dialogue application 102 can generate a question 'Does Theranos only did a small fraction of tests?"

Template Matching

In an aspect, dialogue application 102 can use template matching in conjunction with or instead of forming questions based on satellite elementary discourse units. Template matching can be performed at block 1603. Template matching involves identifying a level of similarity between the question fragment and a question template and determining that the level of similarity is greater than a threshold. An example of a question template is "'What is a British rock band that formed in London?" Templates can help ensure that questions are a proper level of specificity. By contrast, 'What is a British rock band that formed in London in 1970 and received Grammy Hall of Fame Award in 2004?' would be too specific and should be reduced.

Templates can be generated offline. To achieve a proper level of generalization for questions, dialogue application 102 accesses an extended set of questions such as Stanford Q/A database (SQuAD), performs pair-wise syntactic generalization (Galitsky et al 2012) and retains most frequent question templates. SQuAD corpus (Rajpurkar et al., 2016) is a machine comprehension dataset consisting of over 100 k crowd-sourced question-answer pairs on five hundred Wikipedia articles. For example, generalizing 'What is the purpose of life on Earth' and 'Tell me the purpose of complex numbers' dialogue application 102 obtains 'the-DT purpose-NN of-PRP*NP' where we retain the part-of-speech tags. Dialogue application 102 collects the most frequent generalization results (question templates).

Templates obtained from extended questions can be further generalized to form additional questions. For example, dialogue application 102 can form, from additional text, a first parse tree from a first question and a second parse tree from a second question. An entity is identified from the first parse tree the second parse tree. Dialogue application 102 generalizes the first parse tree and the second parse tree into a generalized fragment including the entity and adds the generalized fragment into the templates.

Dialogue application 102 can apply phrase-reduction rules at both individual phrase and sentence level. As a result, a question is obtained from an original satellite EDU expression that is as close to a question template as possible. Hence for every satellite EDU expression, dialogue application 102 iterates through the templates and find the most similar one. In terms of syntactic generalization, it is a template which delivers a maximal common sub-parse tree with this expression. For sentence "[I built a bridge]$_{nucleus}$ [with the purpose of fast access to the forest]$_{satellite}$", the satellite EDU is better covered by the template from our previous paragraph than, for example, by 'access-NN to-TO forest-NN' or 'access-NN to-TO NP' in terms of the number of common terms (parse tree nodes) of the generalization result.

Annotated Text as Training Data

Certain aspects of the present disclosure use communicative discourse trees to generate robust training data sets, which can then be used to train one or more machine learning models. In turn, the machine learning models trained in this manner facilitate improved dialogue on the part of autonomous agents.

Certain aspects create a training set for a particular domain. In the case that training data for the particular domain is not available, then aspects can generate training data from arbitrary documents in that domain.

In other aspects, the training data can be used for transfer learning, that is, generating training data from text that is in a first domain (e.g., subject) and to train a model that is employed in a second domain. For example, training data based on a legal text could be used to train a model that is deployed in an autonomous agent that is used in banking. One advantage is that in some domains, obtaining training data may not be possible.

For example, if text is in a first domain, dialogue application 102 can generate training data in a second domain. Dialogue application 102 generating, from an utterance (or fragment of text), an additional communicative discourse tree. Dialogue application 102 applies a classification model to the additional communicative discourse tree. The classification model is trained with questions and answers. Dialogue application 102 receives an indication of whether the utterance is in rhetorical agreement with a reference text from the classification model. If the text is in rhetorical agreement, then the text is added to a training data set.

Annotated Text as Virtual Dialogue

Dialogue application 102 can create a virtual social dialogue from the questions and answers generated by process 1600. A virtual social dialogue is a multi-turn dialogue between imaginary agents that is obtained as a result of content transformation. Dialogue application 102 can label each of the question fragments and answers with labels that identifies a particular virtual actor. The dialogue application 102 can then provide the virtual conversation to the user device.

Global and Local Questions

Both global questions, (questions that can be answered by a text as a whole) and local questions (questions specific to a particular elementary discourse unit) can be formed. For example, referring back to the discourse tree 1700 in FIG. 17, the following are the questions which can be answered by this text as a whole:

<What for/Why/When> did Theranos struggle? (Nucleus of the Elaboration)

<When/How/Why/What> was the lab instrument developed? (Nucleus for the Background).

Figure 19:
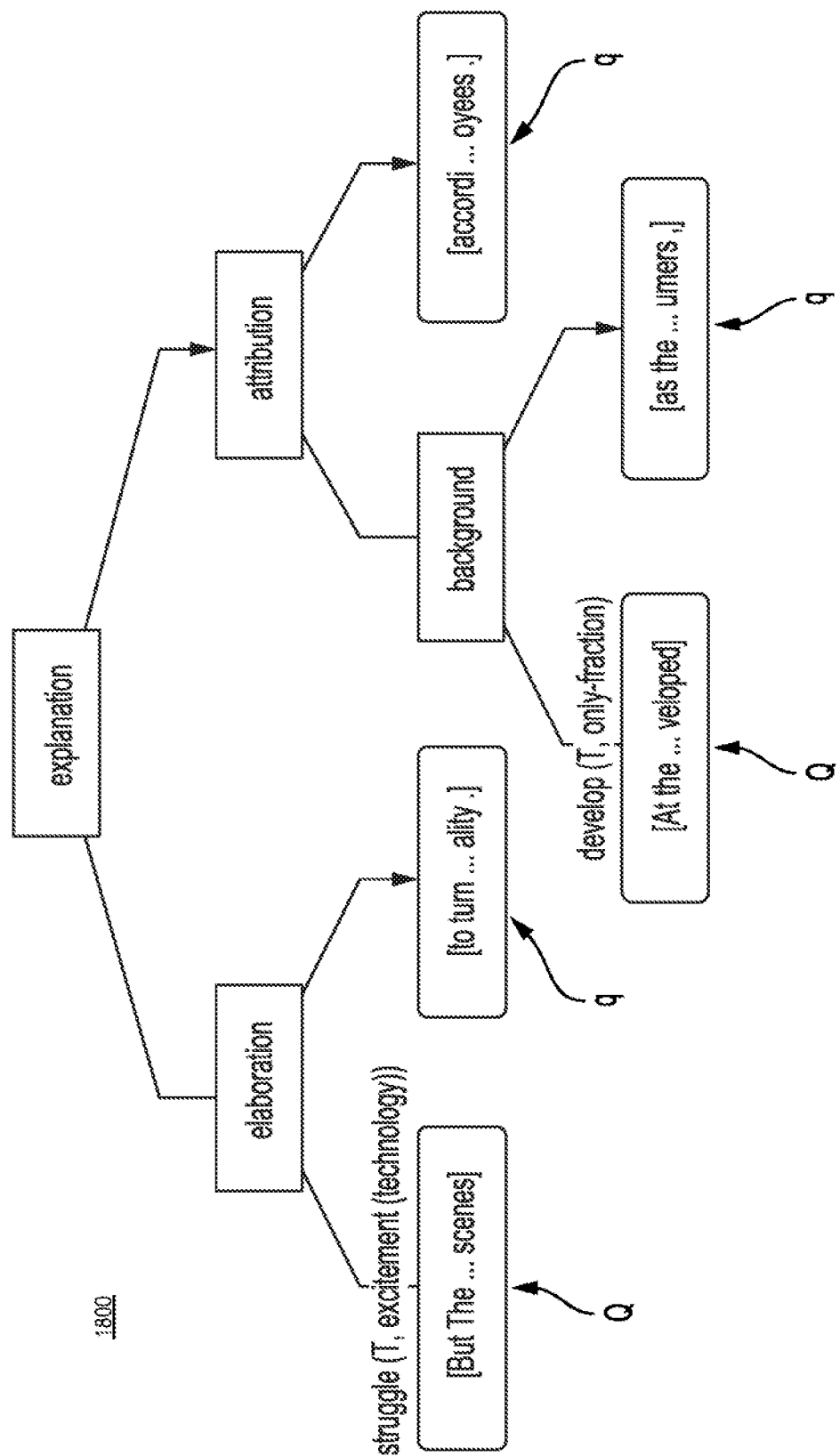
FIG. 19 illustrates an exemplary communicative discourse tree that indicates global questions and dialogue questions for a text, in accordance with an aspect.

FIG. 19 illustrates an exemplary communicative discourse tree that indicates global questions and dialogue questions for a text, in accordance with an aspect. FIG. 19 indicates global questions to the whole text (marked by upper case "Q") and dialogue questions (marked by lower-case "q"). Global questions relate to an entire text, whereas local dialog questions are related to respective satellite EDUs (particular parts of text).

In FIG. 19, we tag each EDU with respect to its role for forming questions: Nucleuses serve as 'global' questions Q and can be initial questions to start a conversation. Conversely, satellites can serve as 'local' questions q to form a dialogue, but not be asked expecting the whole text as an answer.

This split into global questions for the whole text and local questions for its individual parts via a dialogue is reliable as long as rhetorical parsing is correct. In the real life, some local questions would be good for the whole text, and some global questions would not be fully/adequately answered by this text; however, for the purpose of dialogue management, this split provides a reliable tool.

Hence within our developed framework a dialogue in our training dataset starts with a global question, followed by local questions. Now, what happens in a real time when a user starts asking questions? We outline a dialogue management algorithm based on direct match of user utterances against the ones in the training set dialogues. We will compare this algorithm with more popular, learning—based one.

An initial user question $U_1$ is matched with global questions $\{Q_g\}$, and a set of suitable dialogues S is formed, possibly with most relevant representative $D^* \in S$. Each such dialogue $D_1$ has its $Q_g$ containing the same entities as $U_1$.

A first answer $A_1$ from this representative is given. Once the user produces her second utterance $U_2$, it is matched with the $Q_1$ from the set of suitable dialogues. For $A_1$ it can be D, a different dialogue from $D^*$ as long as its $Q_j$ or $A_j$, is most relevant to $U_2$. Each consecutive $U_i$ should be answered by $D \in S$ with most relevant $Q_j$ or $A_j$, There is a following web/document search scenario with dialogue support available when we can build a dialogue from an arbitrary document on the web and have it ready for conversation. Initial search query.

Evaluation

Performance of the dialogue construction algorithm can be measured relative to a number of operations that an editor would need to apply to obtain a satisfactory dialogue. Table 4 contains the data for individual questions. The second column contains the percentages of formed questions which need to be corrected. Third to fifth columns show contributions of three various methods of improving attempts for the formed questions. The last, sixth column estimates the percentages of problematic questions after these three methods are applied sequentially. One way to evaluate the dialogue formation quality is to follow along the line of the dialogue generation assessment. The word-overlap metrics since it is. Q/A verification helps to a degree since meaningless questions cause different answers to the ones these questions were intended for. Notice that all these errors in questions do not affect significantly the overall dialogue flow determined by the original text.

TABLE 4

Data for individual questions

| Construction/Correction method | DT-Satellite rephrasing into Q, necessary corrections (error rate) % | Using CA, decrease, % | Using web mining, decrease % | Verifying by open-domain Q/A, decrease, % | Hybrid improvement (combined decrease) |
|---|---|---|---|---|---|
| Correcting grammar | 27 | 21 | 16 | 16 | 11 |
| Removing too specific words | 16 | 19 | 23 | 21 | 16 |
| Adding words to make question more concrete | 22 | 25 | 12 | 14 | 9 |
| Reject Q as meaningless | 9 | 9 | 5 | 7 | 3 |
| Overall modification | 39 | 32 | 34 | 30 | 19 | such as BLEU adopted from machine translation have become popular to compare a machine-generated response to a single target response (Papineni et al 2002). In this case, it corresponds to the overlap between a formed question and a respective response from the original text. Since the response to the input context in dialogue could be very diverse and open, a single target response is not able to cover all acceptable question-answer (Q/A) pairs. (Liu et al. 2016) demonstrated that word-overlap metrics do not agree well with the reply quality judgments from human annotators. Word embedding metric only access synonymy rather than general appropriateness of a question for an answer. Hence to assess the performance of the proposed algorithm, we use evaluation methods based on editing of formed questions by human annotators.

One of the problems in formed questions is that they do not obey the proper grammar. Almost a third of formed questions have grammar errors, once we apply generalization to it. As we apply web mining and Q/A verification, the error rate decreases by almost half.

Although questions are subject to generalization, in almost one out of five questions further generalization is required. Less generalization steps are required when the satellite EDU includes communicative actions, since their subjects are usually already close to how people formulate questions. Web mining sometimes breaks a proper level of generalization, since a search result can be too specific. Q/A verification does not help to reach proper generalization either.

Conversely, some questions turn out to be too general so that the individual question as well as the dialogue looks unnatural. We observe that relying on CA does not make these questions more specific; however, web mining helps a lot with ideas on what to add to the questions. It might not necessarily fit the whole dialogue well but makes an individual question more natural and assists with question diversity. Getting expressions from the web by searching over-generalized questions reduces its number by half.

About a tenth part of questions is meaningless and should be rejected. CAs does not help but web mining helps a lot, In a further evaluation, a baseline is detected based on a dataset of human dialogues obtained from the car repair recommendations resource. User questions are usually seven—fifteen keywords long and answers by their peers are three to six sentences. This dataset is scraped from (CarPros 2016) and split into dialogue utterances. It is available as a chatbot training dataset at (Car Repair Dataset 2016). The dataset includes 9300 dialogues, so for a specific car problem there is a high chance of s shortage of similar repair scenarios to learn from. We experiment with acquiring additional training dataset on demand.

This is the first system, to the best of our knowledge, that builds dialogues from arbitrary texts. Hence the developed technology supports the transition from search engine—based information access, that relied on indexed documents, to dialogue systems, in an arbitrary domain. Doc2Dialogue is a configurable system that can include web mining, forming queries based on communicative actions, and other question refinement means. The system of (Novikova et al 2016) of NL generation (NLG) evaluation produces ungrammatical output by word-by-word—based generation and learning from noisy data.

Reinforcement learning (Sutton and Barto, 1998) (allows us to use policy gradient to directly optimize task-specific rewards such as BLEU, which are otherwise non-differentiable and hard to optimize (Kumar et al 2018).

Word-based metrics rely on the assumption that human-generated references is a correct and complete gold standard, this assumptions are invalid for corpus-based NLG. This is especially true for crowdsourced dialogue datasets. Grammar-based metrics neither rely on human-generated references nor are affected by their quality.

(Wang at al 2016) proposed a generative machine comprehension model that machine leans to form questions and to answer them based on documents. The proposed model uses a sequence-to-sequence framework that encodes the document and generates a question (answer) given an answer (question). Significant improvement in model performance is observed empirically on the SQuAD corpus, confirming our hypothesis that the model benefits from jointly learning to perform both tasks.

It is well known that manually creating meaningful and relevant questions to texts is a time-consuming and challenging task. For example, while evaluating students on reading comprehension, it is tedious for a teacher to manually create questions, find answers to those questions, and thereafter evaluate answers. Traditional approaches have either used a linguistically motivated set of transformation rules for transforming a given sentence into a question or a set of manually created templates with slot fillers to generate questions. Recently, neural network based techniques such as sequence-to-sequence learning have achieved remarkable success in various NLP tasks, including question generation. A recent deep learning approach to question generation by Serban et al. (2016) investigates a simpler task of generating questions only from a triplet of subject, relation and object. Du et al. (2016) propose a sequence-to-sequence model with attention for question generation from text. Kumar et al. (2018) generate question-answer pairs from text using pointer networks (Vinyals et al., 2015).

Whereas a majority of neural network approaches (Serban et al 2018, Nakamura et al 2018) generate dialogues to support real-time conversation, mostly based on data of a limited quality, the current study produces dialogues in a given domain to improve the overall performance of conversational systems requiring extensive dataset, such as neural-based. Hence this work complements popular approaches to dialogue generation rather then competes for the generation process itself. Instead of using a very peculiar, hardly generalizable and not very natural for automated chatbot dataset such as Switchboard (Godfrey and Holliman 1997), we provide a tool to generate a high-volume of dialogues for a given domain on demand.

Dialogue generation approaches rely on a limited set of dialogues which are very different to what a user would expect from chatbots operating in the domains of interest such as finance, legal, health. These dataset are rather peculiar in style and content; it is hard to extend their conversational logic to other domains. These datasets include 1) Movie Triples corpus (Banchs 2012) covers a wide range of topics with few spelling mistakes, but its small size of about quarter of a million makes it difficult to train a dialogue model. We thought that this scenario would really benefit from the proposed adversarial generation.
2) Ubuntu Dialogue Corpus has a limited scope of topics but contains almost 2 million conversations with an average of 5 utterances per conversation.
3) Car Repair dataset that we formed for evaluation of dialogue management algorithm (Galitsky et al 2019) includes pairs extracted from dialogues as first and second utterance, so that the question is seven—fifteen keywords and answer is three to six sentences. This resource was obtained to train a dialog support system but it also proved to be useful to evaluate search. This dataset is scraped from CarPros.com and is available at (Car Repair Dataset 2016).

The technique presented here allows building dialogue matching content, style and cohesiveness of the target chatbot conversations. The content quality, factual accuracy, coherence of thoroughness of text is dramatically higher than the one possibly obtained from a dialogue corpus compiled with the purpose different from a chatbot training.

(Yuan et al 2016) reframe the standard machine comprehension task: rather than answering questions about a document, we teach machines to ask questions. Our work has several motivations. First, we believe that posing appropriate questions is an important aspect of information acquisition in intelligent systems. Second, learning to ask questions may improve the ability to answer them. Singer and Donlan (1982) demonstrated that having students devise questions before reading can increase scores on subsequent comprehension tests. Third, answering the questions in most existing QA datasets is an extractive task—it requires selecting some span of text within the document—while question asking is comparatively abstractive—it requires generation of text that may not appear in the document.

Fourth, although question building task has attracted significant attention in the past decade, it is hard to find research where attempts are made to form dialogue from arbitrary text. Question generation task requires an alteration of a general Q/A problem formulation and a satisfactory solution can be provided by an end-to-end system once a sufficient training set is available. Conversely, the dialogue construction problem needs to rely on insights from discourse analysis; discourse tree topology plays an essential role here.

Our rule-based dialogue formation algorithm is designed to build training sets for data-hungry approaches such as statistical and deep learning. Notice that if deep learning composes a training set, it would not be the best one to feed another deep learning system for dialogue management since its shortcomings will be generalized and amplified. Once generated dialogue data is available, chatbots can penetrate in the domains which are very distinctive by nature from the ones for which real human dialogues are currently available. Less formalized, user-generated and under-represented domains can be enabled with chatbots so that manual dialogue management efforts would not be required.

Figure 20:
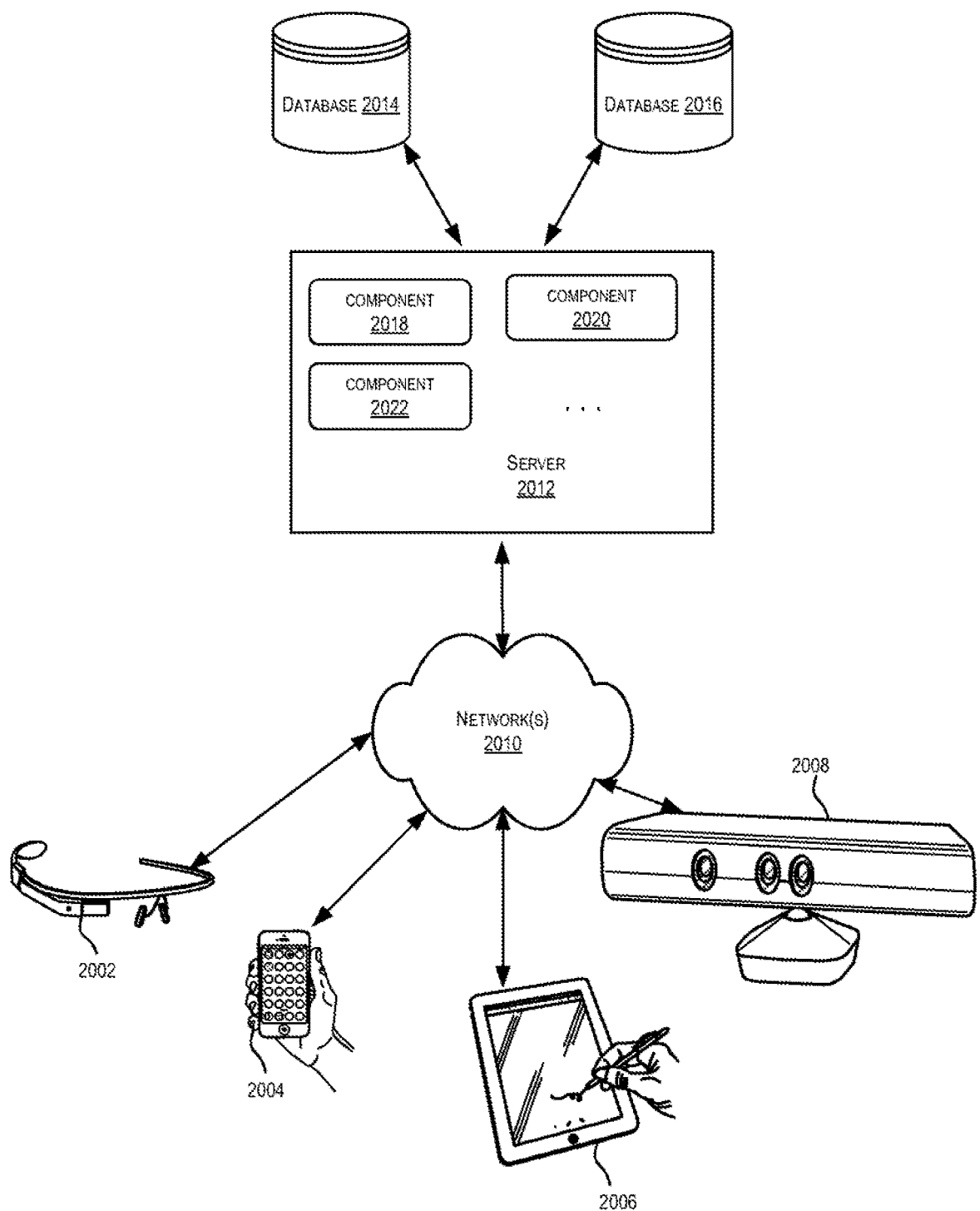
FIG. 20 depicts a simplified diagram of a distributed system for implementing one of the aspects.

FIG. 20 depicts a simplified diagram of a distributed system 2000 for implementing one of the aspects. In the illustrated aspect, distributed system 2000 includes one or more client computing devices 2002, 2004, 2006, and 2008, which are configured to execute and operate a client application such as a web browser, proprietary client (e.g., Oracle Forms), or the like over one or more network(s) 2010. Server 2012 may be communicatively coupled with remote client computing devices 2002, 2004, 2006, and 2008 via network 2010.

In various aspects, server 2012 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 2002, 2004, 2006, and/or 2008. Users operating client computing devices 2002, 2004, 2006, and/or 2008 may in turn utilize one or more client applications to interact with server 2012 to utilize the services provided by these components.

In the configuration depicted in the figure, the software components 2018, 2020 and 2022 of distributed system 2000 are shown as being implemented on server 2012. In other aspects, one or more of the components of distributed system 2000 and/or the services provided by these components may also be implemented by one or more of the client computing devices 2002, 2004, 2006, and/or 2008. Users operating the client computing devices may then utilize one or more client applications to use the services provided by these components. These components may be implemented in hardware, firmware, software, or combinations thereof. It should be appreciated that various different system configurations are possible, which may be different from distributed system 2000. The aspect shown in the figure is thus one example of a distributed system for implementing an aspect system and is not intended to be limiting.

Client computing devices 2002, 2004, 2006, and/or 2008 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 2002, 2004, 2006, and 2008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 2010.

Although exemplary distributed system 2000 is shown with four client computing devices, any number of client computing devices may be supported. Other devices, such as devices with sensors, etc., may interact with server 2012.

Network(s) 2010 in distributed system 2000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 2010 can be a local area network (LAN), such as one based on Ethernet, Token-Ring and/or the like. Network(s) 2010 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.20 suite of protocols, Bluetooth®, and/or any other wireless protocol); and/or any combination of these and/or other networks.

Server 2012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 2012 can include one or more virtual machines running virtual operating systems, or other computing architectures involving virtualization. One or more flexible pools of logical storage devices can be virtualized to maintain virtual storage devices for the server. Virtual networks can be controlled by server 2012 using software defined networking. In various aspects, server 2012 may be adapted to run one or more services or software applications described in the foregoing disclosure. For example, server 2012 may correspond to a server for performing processing described above according to an aspect of the present disclosure.

Server 2012 may run an operating system including any of those discussed above, as well as any commercially available server operating system. Server 2012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 2012 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2012 may also include one or more applications to display the data feeds and/or real-time events via one or more display devices of client computing devices 2002, 2004, 2006, and 2008.

Distributed system 2000 may also include one or more databases 2014 and 2016. Databases 2014 and 2016 may reside in a variety of locations. By way of example, one or more of databases 2014 and 2016 may reside on a non-transitory storage medium local to (and/or resident in) server 2012. Alternatively, databases 2014 and 2016 may be remote from server 2012 and in communication with server 2012 via a network-based or dedicated connection. In one set of aspects, databases 2014 and 2016 may reside in a storage-area network (SAN). Similarly, any necessary files for performing the functions attributed to server 2012 may be stored locally on server 2012 and/or remotely, as appropriate. In one set of aspects, databases 2014 and 2016 may include relational databases, such as databases provided by Oracle, that are adapted to store, update, and retrieve data in response to SQL-formatted commands.

Figure 21:
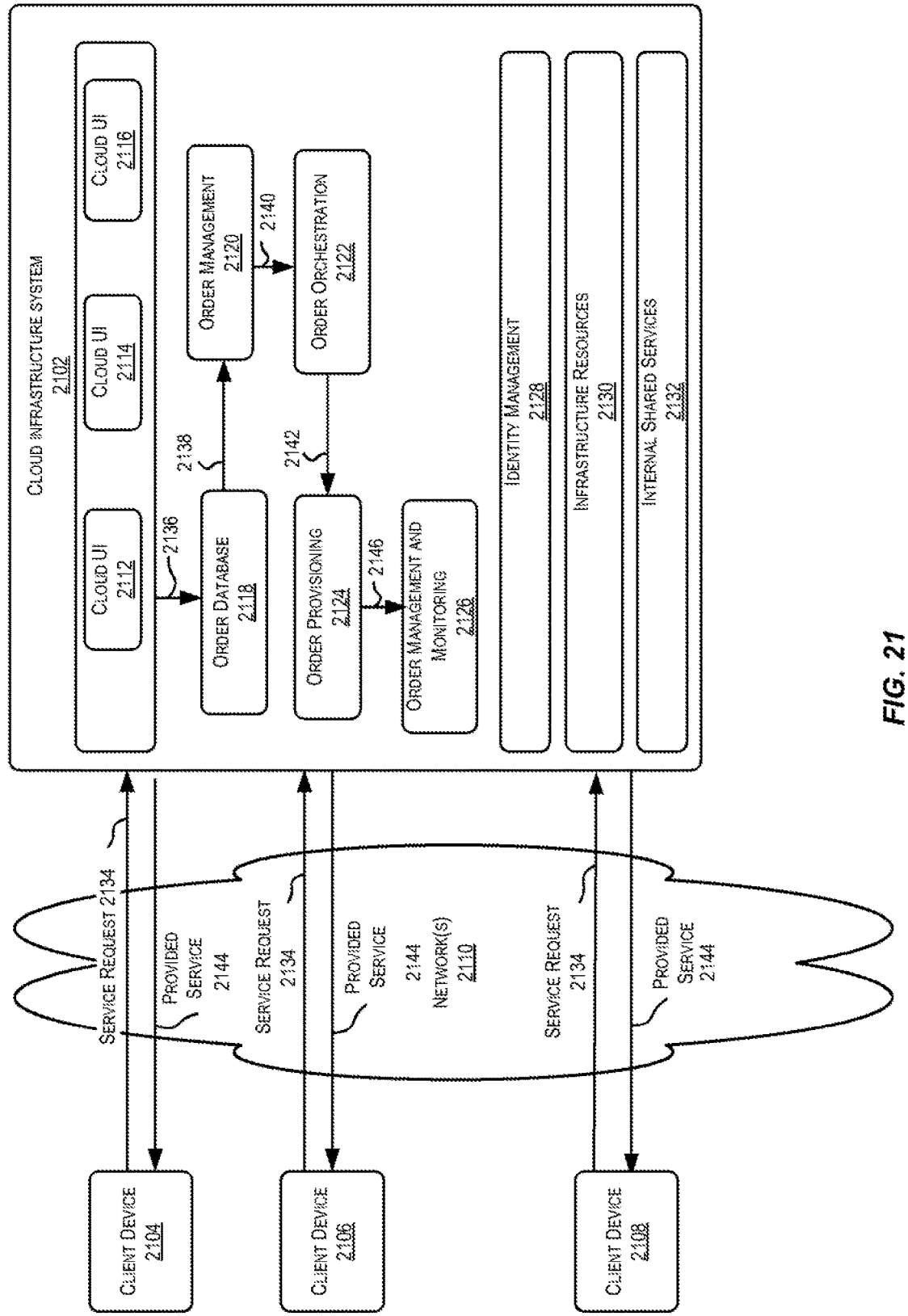
FIG. 21 is a simplified block diagram of components of a system environment by which services provided by the components of an aspect system may be offered as cloud services in accordance with an aspect.

FIG. 21 is a simplified block diagram of one or more components of a system environment 2100 by which services provided by one or more components of an aspect system may be offered as cloud services, in accordance with an aspect of the present disclosure. In the illustrated aspect, system environment 2100 includes one or more client computing devices 2104, 2106, and 2108 that may be used by users to interact with a cloud infrastructure system 2102 that provides cloud services. The client computing devices may be configured to operate a client application such as a web browser, a proprietary client application (e.g., Oracle Forms), or some other application, which may be used by a user of the client computing device to interact with cloud infrastructure system 2102 to use services provided by cloud infrastructure system 2102.

It should be appreciated that cloud infrastructure system 2102 depicted in the figure may have other components than those depicted. Further, the aspect shown in the figure is only one example of a cloud infrastructure system that may incorporate an aspect of the disclosure. In some other aspects, cloud infrastructure system 2102 may have more or fewer components than shown in the figure, may combine two or more components, or may have a different configuration or arrangement of components.

Client computing devices 2104, 2106, and 2108 may be devices similar to those described above for 2002, 2004, 2006, and 2008.

Although exemplary system environment 2100 is shown with three client computing devices, any number of client computing devices may be supported. Other devices such as devices with sensors, etc. may interact with cloud infrastructure system 2102.

Network(s) 2110 may facilitate communications and exchange of data between client computing devices 2104, 2106, and 2108 and cloud infrastructure system 2102. Each network may be any type of network familiar to those skilled in the art that can support data communications using any of a variety of commercially-available protocols, including those described above for network(s) 2010.

Cloud infrastructure system 2102 may comprise one or more computers and/or servers that may include those described above for server 2021.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 2102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 2102 may be adapted to automatically provision, manage and track a customer's subscription to services offered by cloud infrastructure system 2102. Cloud infrastructure system 2102 may provide the cloud services via different deployment models. For example, services may be provided under a public cloud model in which cloud infrastructure system 2102 is owned by an organization selling cloud services (e.g., owned by Oracle) and the services are made available to the general public or different industry enterprises. As another example, services may be provided under a private cloud model in which cloud infrastructure system 2102 is operated solely for a single organization and may provide services for one or more entities within the organization. The cloud services may also be provided under a community cloud model in which cloud infrastructure system 2102 and the services provided by cloud infrastructure system 2102 are shared by several organizations in a related community. The cloud services may also be provided under a hybrid cloud model, which is a combination of two or more different models.

In some aspects, the services provided by cloud infrastructure system 2102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2102. Cloud infrastructure system 2102 then performs processing to provide the services in the customer's subscription order.

In some aspects, the services provided by cloud infrastructure system 2102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 2102 may also include infrastructure resources 2130 for providing the resources used to provide various services to customers of the cloud infrastructure system. In one aspect, infrastructure resources 2130 may include pre-integrated and optimized combinations of hardware, such as servers, storage, and networking resources to execute the services provided by the PaaS platform and the SaaS platform.

In some aspects, resources in cloud infrastructure system 2102 may be shared by multiple users and dynamically re-allocated per demand. Additionally, resources may be allocated to users in different time zones. For example, cloud infrastructure system 2121 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 2132 may be provided that are shared by different components or modules of cloud infrastructure system 2102 and by the services provided by cloud infrastructure system 2102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 2102 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 2102, and the like.

In one aspect, as depicted in the figure, cloud management functionality may be provided by one or more modules, such as an order management module 2120, an order orchestration module 2122, an order provisioning module 2124, an order management and monitoring module 2126, and an identity management module 2128. These modules may include or be provided using one or more computers and/or servers, which may be general purpose computers, specialized server computers, server farms, server clusters, or any other appropriate arrangement and/or combination.

In exemplary operation 2134, a customer using a client device, such as client computing device 2104, 2106 or 2108, may interact with cloud infrastructure system 2102 by requesting one or more services provided by cloud infrastructure system 2102 and placing an order for a subscription for one or more services offered by cloud infrastructure system 2102. In certain aspects, the customer may access a cloud User Interface (UI) 2121, cloud UI 2114 and/or cloud UI 2116 and place a subscription order via these UIs. The order information received by cloud infrastructure system 2102 in response to the customer placing an order may include information identifying the customer and one or more services offered by the cloud infrastructure system 2102 that the customer intends to subscribe to.

After an order has been placed by the customer, the order information is received via the cloud UIs, 2121, 2114 and/or 2116.

At operation 2136, the order is stored in order database 2118. Order database 2118 can be one of several databases operated by cloud infrastructure system 2102 and operated in conjunction with other system elements.

At operation 2138, the order information is forwarded to an order management module 2120. In some instances, order management module 2120 may be configured to perform billing and accounting functions related to the order, such as verifying the order, and upon verification, booking the order.

At operation 2140, information regarding the order is communicated to an order orchestration module 2122. Order orchestration module 2122 may utilize the order information to orchestrate the provisioning of services and resources for the order placed by the customer. In some instances, order orchestration module 2122 may orchestrate the provisioning of resources to support the subscribed services using the services of order provisioning module 2124.

In certain aspects, order orchestration module 2122 enables the management of business processes associated with each order and applies business logic to determine whether an order should proceed to provisioning. At operation 2142, upon receiving an order for a new subscription, order orchestration module 2122 sends a request to order provisioning module 2124 to allocate resources and configure those resources needed to fulfill the subscription order. Order provisioning module 2124 enables the allocation of resources for the services ordered by the customer. Order provisioning module 2124 provides a level of abstraction between the cloud services provided by cloud infrastructure system 2100 and the physical implementation layer that is used to provision the resources for providing the requested services. Order orchestration module 2122 may thus be isolated from implementation details, such as whether or not services and resources are actually provisioned on the fly or pre-provisioned and only allocated/assigned upon request.

At operation 2144, once the services and resources are provisioned, a notification of the provided service may be sent to customers on client computing devices 2104, 2106 and/or 2108 by order provisioning module 2124 of cloud infrastructure system 2102.

At operation 2146, the customer's subscription order may be managed and tracked by an order management and monitoring module 2126. In some instances, order management and monitoring module 2126 may be configured to collect usage statistics for the services in the subscription order, such as the amount of storage used, the amount data transferred, the number of users, and the amount of system up time and system down time.

In certain aspects, cloud infrastructure system 2100 may include an identity management module 2128. Identity management module 2128 may be configured to provide identity services, such as access management and authorization services in cloud infrastructure system 2100. In some aspects, identity management module 2128 may control information about customers who wish to utilize the services provided by cloud infrastructure system 2102. Such information can include information that authenticates the identities of such customers and information that describes which actions those customers are authorized to perform relative to various system resources (e.g., files, directories, applications, communication ports, memory segments, etc.) Identity management module 2128 may also include the management of descriptive information about each customer and about how and by whom that descriptive information can be accessed and modified.

Figure 22:
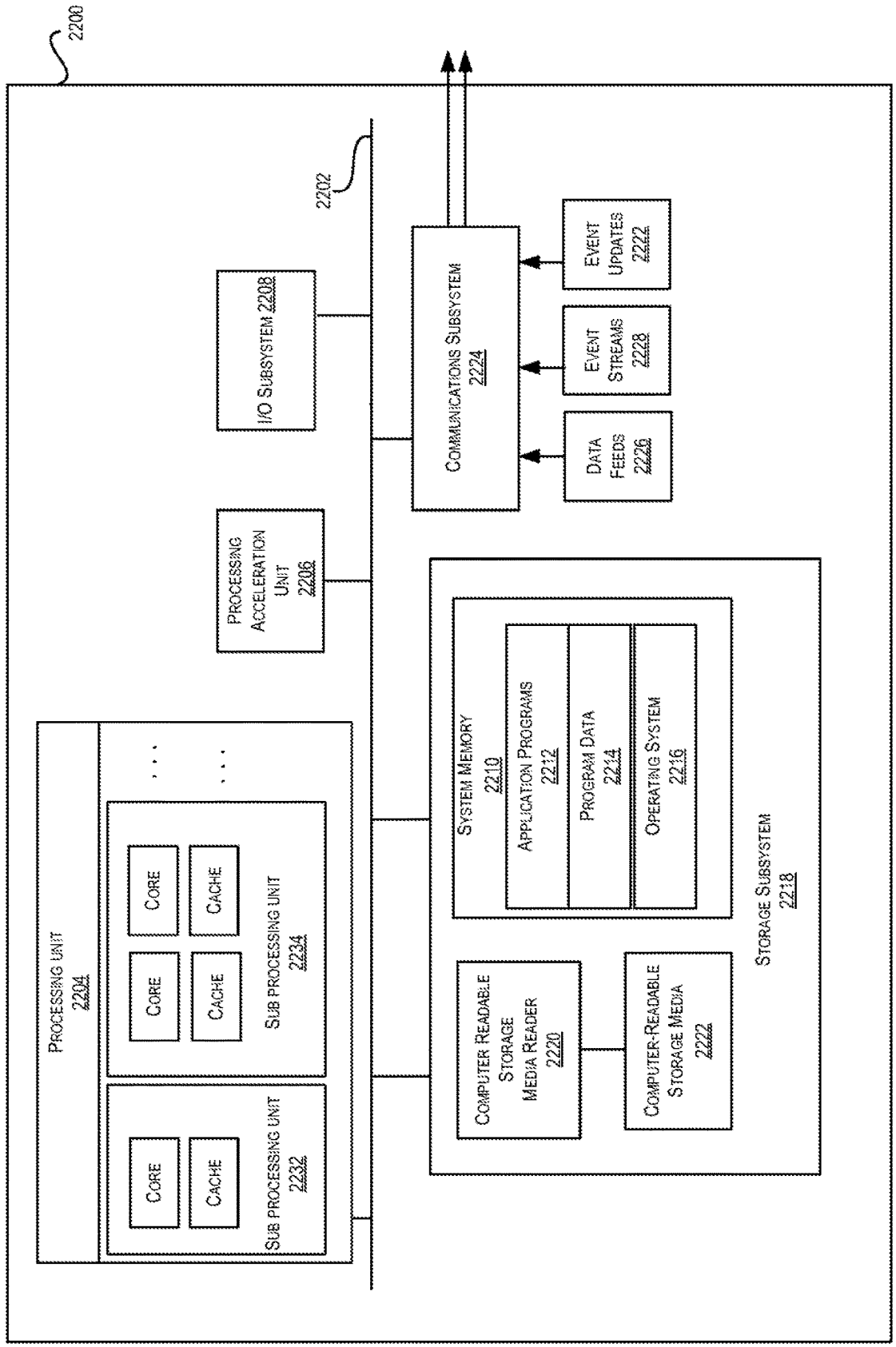
FIG. 22 illustrates an exemplary computer system, in which various aspects of the present disclosure may be implemented.

FIG. 22 illustrates an exemplary computer system 2200, in which various aspects of the present disclosure may be implemented. The system 2200 may be used to implement any of the computer systems described above. As shown in the figure, computer system 2200 includes a processing unit 2204 that communicates with a number of peripheral subsystems via a bus subsystem 2202. These peripheral subsystems may include a processing acceleration unit 2206, an I/O subsystem 2208, a storage subsystem 2218 and a communications subsystem 2224. Storage subsystem 2218 includes tangible computer-readable storage media 2222 and a system memory 2210.

Bus subsystem 2202 provides a mechanism for letting the various components and subsystems of computer system 2200 communicate with each other as intended. Although bus subsystem 2202 is shown schematically as a single bus, alternative aspects of the bus subsystem may utilize multiple buses. Bus subsystem 2202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P2286.1 standard.

Processing unit 2204, which can be implemented as one or more integrated circuits (e.g., a conventional microprocessor or microcontroller), controls the operation of computer system 2200. One or more processors may be included in processing unit 2204. These processors may include single core or multicore processors. In certain aspects, processing unit 2204 may be implemented as one or more independent processing units 2232 and/or 2234 with single or multicore processors included in each processing unit. In other aspects, processing unit 2204 may also be implemented as a quad-core processing unit formed by integrating two dual-core processors into a single chip.

In various aspects, processing unit 2204 can execute a variety of programs in response to program code and can maintain multiple concurrently executing programs or processes. At any given time, some or all of the program code to be executed can be resident in processor(s) 2204 and/or in storage subsystem 2218. Through suitable programming, processor(s) 2204 can provide various functionalities described above. Computer system 2200 may additionally include a processing acceleration unit 2206, which can include a digital signal processor (DSP), a special-purpose processor, and/or the like.

I/O subsystem 2208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2200 may comprise a storage subsystem 2218 that comprises software elements, shown as being currently located within a system memory 2210. System memory 2210 may store program instructions that are loadable and executable on processing unit 2204, as well as data generated during the execution of these programs.

Depending on the configuration and type of computer system 2200, system memory 2210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2204. In some implementations, system memory 2210 may include multiple different types of memory, such as static random access memory (SRAM) or dynamic random access memory (DRAM). In some implementations, a basic input/output system (BIOS), containing the basic routines that help to transfer information between elements within computer system 2200, such as during start-up, may typically be stored in the ROM. By way of example, and not limitation, system memory 2210 also illustrates application programs 2212, which may include client applications, Web browsers, mid-tier applications, relational database management systems (RDBMS), etc., program data 2214, and an operating system 2216. By way of example, operating system 2216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2218 may also provide a tangible computer-readable storage medium for storing the basic programming and data constructs that provide the functionality of some aspects. Software (programs, code modules, instructions) that when executed by a processor provide the functionality described above may be stored in storage subsystem 2218. These software modules or instructions may be executed by processing unit 2204. Storage subsystem 2218 may also provide a repository for storing data used in accordance with the present disclosure.

Storage subsystem 2218 may also include a computer-readable storage media reader 2220 that can further be connected to computer-readable storage media 2222. Together and, optionally, in combination with system memory 2210, computer-readable storage media 2222 may comprehensively represent remote, local, fixed, and/or removable storage devices plus storage media for temporarily and/or more permanently containing, storing, transmitting, and retrieving computer-readable information.

Computer-readable storage media 2222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 2200.

By way of example, computer-readable storage media 2222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2222 may include, but is not limited to, Zip® drives, flash memory cards, universal serial bus (USB) flash drives, secure digital (SD) cards, DVD disks, digital video tape, and the like. Computer-readable storage media 2222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2200.

Communications subsystem 2224 provides an interface to other computer systems and networks. Communications subsystem 2224 serves as an interface for receiving data from and transmitting data to other systems from computer system 2200. For example, communications subsystem 2224 may enable computer system 2200 to connect to one or more devices via the Internet. In some aspects, communications subsystem 2224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 2224 can provide wired network connectivity (e.g., Ethernet) in addition to or instead of a wireless interface.

In some aspects, communications subsystem 2224 may also receive input communication in the form of structured and/or unstructured data feeds 2226, event streams 2228, event updates 2230, and the like on behalf of one or more users who may use computer system 2200.

By way of example, communications subsystem 2224 may be configured to receive unstructured data feeds 2226 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 2224 may also be configured to receive data in the form of continuous data streams, which may include event streams 2228 of real-time events and/or event updates 2230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2224 may also be configured to output the structured and/or unstructured data feeds 2226, event streams 2228, event updates 2230, and the like to one or more databases that may be in communication with one or more streaming data source computers coupled to computer system 2200.

Computer system 2200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the disclosure are described with reference to specific aspects thereof, but those skilled in the art will recognize that the disclosure is not limited thereto. Various features and aspects of the above-described disclosure may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method for dialogue construction from text, the method comprising:
   constructing, from text comprising fragments, a discourse tree that represents rhetorical relationships between the fragments, wherein the discourse tree comprises a plurality of nodes, each nonterminal node representing a rhetorical relationship between two of the fragments, and each terminal node of the nodes of the discourse tree is associated with one of the fragments;
   identifying, from the discourse tree, a terminal node comprising a satellite elementary discourse unit, wherein the satellite elementary discourse unit is secondary to a corresponding nucleus elementary discourse unit;
   forming a question fragment from the satellite elementary discourse unit;
   annotating the text by:
      inserting the question fragment into a location within the text, wherein the location is immediately preceding text that corresponds to the satellite elementary discourse unit;
      labeling the satellite elementary discourse unit as an answer;
      receiving, from a user device, a user question comprising text fragments;
      identifying that the answer is relevant to the user question;
      creating a virtual conversation that comprises the question fragment and the answer;
      labeling the question fragment with a first label identifying a first virtual actor;
      labeling the answer with a second label identifying a second virtual actor; and
      providing the virtual conversation to the user device.

2. The computer-implemented method of claim 1, wherein forming the question fragment comprises:
   identifying, within the satellite elementary discourse unit, a word that represents either (i) a noun, (ii) a verb, or (iii) adjective; and
   replacing the word with a question word, wherein a question word is one of (i) what, (ii) where, (iii) whom, (iv) who, or (v) how.

3. The computer-implemented method of claim 2, wherein identifying a word comprises:
   constructing a parse tree from the satellite elementary discourse unit, wherein the parse tree comprises nodes; and
   selecting, from the nodes, a node that represents either (i) a noun, (ii) a verb, or (iii) adjective.

4. The computer-implemented method of claim 1, wherein forming the question fragment comprises:
   identifying a level of similarity between the question fragment and a template of a plurality of text fragment templates; and
   determining that the level of similarity is greater than a threshold.

5. The computer-implemented method of claim 1, further comprising:
   generating one or more keywords from the question fragment;
   submitting the keywords to a search engine;
   obtaining a search result from the search engine;
   comparing the search result with the question fragment by deriving a maximal common sub-tree of the question fragment and the search result; and
   determining that a number of words in the maximal common sub-tree is greater than a threshold, thereby verifying the question fragment.

6. The computer-implemented method of claim 1, wherein forming the question fragment further comprises:
   matching each fragment of the discourse tree that has a verb to a verb signature, the matching comprising:
      accessing a plurality of verb signatures, wherein each verb signature comprises the verb of the fragment and a sequence of thematic roles, wherein thematic roles describe a relationship between the verb and related words;
      determining, for each verb signature of the plurality of verb signatures, a plurality of thematic roles of the respective signature that match a role of a word in the fragment;
      selecting a particular verb signature from the plurality of verb signatures based on the particular verb signature comprising a highest number of matches; and
      associating the particular verb signature with the fragment, thereby forming a communicative discourse tree;
   identifying, from the communicative discourse tree, a verb signature corresponding to the satellite elementary discourse unit; and extracting, from the satellite elementary discourse unit, a portion of the satellite elementary discourse unit, wherein the portion is located immediately following the verb signature.

7. The computer-implemented method of claim 4, further comprising determining the plurality of text fragment templates by:
   accessing additional text;
   forming, from the additional text, a first parse tree from a first question and a second parse tree from a second question;
   identifying, from the first parse tree, an entity;
   identifying, from the second parse tree, the entity;
   generalizing the first parse tree and the second parse tree into a generalized fragment comprising the entity; and
   adding the generalized fragment into the plurality of templates.

8. The computer-implemented method of claim 1, wherein the text is in a first domain, the method further comprising:
   generating, from an utterance, an additional communicative discourse tree;
   applying a classification model to the additional communicative discourse tree, wherein the classification model is trained with a plurality of questions and plurality of answers; and
   receiving, from the classification model, an indication of whether the utterance is in rhetoric agreement with a reference text, wherein the reference text is in a second domain.

9. A non-transitory computer-readable medium storing computer-executable program instructions that when executed by a processing device, cause the processing device to perform operations comprising:
   constructing, from text comprising fragments, a discourse tree that represents rhetorical relationships between the fragments, wherein the discourse tree comprises a plurality of nodes, each nonterminal node representing a rhetorical relationship between two of the fragments, and each terminal node of the nodes of the discourse tree is associated with one of the fragments;
   forming, from the discourse tree, a communicative discourse tree by matching each fragment of the discourse tree that has a verb to a verb signature, wherein the verb signature comprises the verb of the fragment and a sequence of thematic roles that describe a relationship between the verb and related words;
   identifying, from the discourse tree, a terminal node comprising a satellite elementary discourse unit, wherein the satellite elementary discourse unit is secondary to a corresponding nucleus elementary discourse unit;
   identifying, from the communicative discourse tree, a verb signature corresponding to the satellite elementary discourse unit;
   extracting, from the satellite elementary discourse unit, a question fragment that is located immediately following the verb signature;
   annotating the text by:
      inserting the question fragment into a location within the text, wherein the location is immediately preceding text that corresponds to the satellite elementary discourse unit; and
      labeling the satellite elementary discourse unit as an answer; and
   outputting the annotated text.

10. The non-transitory computer-readable medium of claim 9, wherein forming the question fragment comprises:
    identifying, within the satellite elementary discourse unit, a word that represents either (i) a noun, (ii) a verb, or (iii) adjective; and
    replacing the word with a question word, wherein a question word is one of (i) what, (ii) where, (iii) whom, (iv) who, or (v) how.

11. The non-transitory computer-readable medium of claim 10, wherein identifying a word comprises:
    constructing a parse tree from the satellite elementary discourse unit, wherein the parse tree comprises nodes; and
    selecting, from the nodes, a node that represents either (i) a noun, (ii) a verb, or (iii) adjective.

12. The non-transitory computer-readable medium of claim 9, wherein forming the question fragment comprises:
    identifying a level of similarity between the question fragment and a template of a plurality of text fragment templates; and
    determining that the level of similarity is greater than a threshold.

13. The non-transitory computer-readable medium of claim 12, wherein the operations further comprise determining the plurality of text fragment templates by:
    accessing additional text;
    forming, from the additional text, a first parse tree from a first question and a second parse tree from a second question;
    identifying, from the first parse tree, an entity;
    identifying, from the second parse tree, the entity;
    generalizing the first parse tree and the second parse tree into a generalized fragment comprising the entity; and
    adding the generalized fragment into the plurality of templates.

14. A system comprising:
    a non-transitory computer-readable medium storing computer-executable program instructions; and
    a processing device communicatively coupled to the computer-readable medium for executing the computer-executable program instructions, wherein executing the computer-executable program instructions configures the processing device to perform operations comprising:
    constructing, from text comprising fragments, a discourse tree that represents rhetorical relationships between the fragments, wherein the discourse tree comprises a plurality of nodes, each nonterminal node representing a rhetorical relationship between two of the fragments, and each terminal node of the nodes of the discourse tree is associated with one of the fragments;
    forming, from the discourse tree, a communicative discourse tree by matching each fragment of the discourse tree that has a verb to a verb signature, wherein the verb signature comprises the verb of the fragment and a sequence of thematic roles that describe a relationship between the verb and related words;
    identifying, from the discourse tree, a terminal node comprising a satellite elementary discourse unit, wherein the satellite elementary discourse unit is secondary to a corresponding nucleus elementary discourse unit;
    identifying, from the communicative discourse tree, a verb signature corresponding to the satellite elementary discourse unit;

extracting, from the satellite elementary discourse unit, a question fragment that is located immediately following the verb signature;

annotating the text by:
  inserting the question fragment into a location within the text, wherein the location is immediately preceding text that corresponds to the satellite elementary discourse unit; and
  labeling the satellite elementary discourse unit as an answer; and outputting the annotated text.

15. The system of claim 14, wherein forming the question fragment comprises:
  identifying, within the satellite elementary discourse unit, a word that represents either (i) a noun, (ii) a verb, or (iii) adjective; and
  replacing the word with a question word, wherein a question word is one of (i) what, (ii) where, (iii) whom, (iv) who, or (v) how.

16. The system of claim 15, wherein identifying a word comprises:
  constructing a parse tree from the satellite elementary discourse unit, wherein the parse tree comprises nodes; and
  selecting, from the nodes, a node that represents either (i) a noun, (ii) a verb, or (iii) adjective.

17. The system of claim 14, wherein forming the question fragment comprises:
  identifying a level of similarity between the question fragment and a template of a plurality of text fragment templates; and
  determining that the level of similarity is greater than a threshold.

18. The system of claim 14, wherein the text is in a first domain, the operations further comprising:
  generating, from an utterance, an additional communicative discourse tree;
  applying a classification model to the additional communicative discourse tree, wherein the classification model is trained with a plurality of questions a plurality of answers; and
  receiving, from the classification model, an indication of whether the utterance is in rhetoric agreement with a reference text, wherein the reference text is in a second domain.

* * * * *

UNITED STATES PATENT AND TRADEMARK OFFICE
CERTIFICATE OF CORRECTION

PATENT NO. : 11,586,827 B2
APPLICATION NO. : 16/789849
DATED : February 21, 2023
INVENTOR(S) : Boris Galitsky It is certified that error appears in the above-identified patent and that said Letters Patent is hereby corrected as shown below:

In the Specification

In Column 1, Line 13, after "in" insert -- co-pending --.

In Column 8, Line 29, delete "fright" and insert -- right --, therefor.

In Column 9, Line 28, delete "Hawaii" and insert -- Hawaii. --, therefor.

In Column 21, Line 32, delete "a an" and insert -- an --, therefor.

In Column 22, Line 31, delete "$action_{jk}$" and insert -- $action_j$ --, therefor.

In Column 30, Line 38, delete "beginner)" and insert -- beginner). --, therefor.

Signed and Sealed this
Second Day of January, 2024

Katherine Kelly Vidal
*Director of the United States Patent and Trademark Office*